United States Patent
Fujita et al.

(10) Patent No.: US 6,601,939 B2
(45) Date of Patent: Aug. 5, 2003

(54) PRINTING METHOD, PRINTING APPARATUS AND PRINTING SYSTEM

(75) Inventors: Miyuki Fujita, Suginami-ku (JP); Hiroshi Tajika, Yokohama (JP); Atsushi Ushiroda, Kanagawa (JP); Yuji Konno, Kawasaki (JP); Norihiro Kawatoko, Kawasaki (JP); Takayuki Ogasahara, Kawasaki (JP); Tetsuya Edamura, Kawasaki (JP); Tetsuhiro Maeda, Kawasaki (JP); Atsuhiko Masuyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/940,644

(22) Filed: Aug. 29, 2001

(65) Prior Publication Data

US 2002/0024558 A1 Feb. 28, 2002

(30) Foreign Application Priority Data

Aug. 30, 2000 (JP) ........................ 2000-261645
Jul. 16, 2001 (JP) ........................ 2001-215789

(51) Int. Cl.$^7$ ............................................. B41J 2/205
(52) U.S. Cl. ................................... 347/15; 347/41
(58) Field of Search ............................ 347/15, 43, 41, 347/16

(56) References Cited

U.S. PATENT DOCUMENTS

| | | | |
|---|---|---|---|
| 4,748,453 A | 5/1988 | Lin et al. ................ 347/41 |
| 4,920,355 A | 4/1990 | Katerberg ............... 347/41 |
| 6,102,537 A | 8/2000 | Kato et al. .............. 347/101 |
| 6,193,358 B1 | 2/2001 | Fujita et al. ............. 347/41 |
| 6,267,476 B1 | 7/2001 | Kato et al. .............. 347/100 |
| 6,322,197 B1 * | 11/2001 | Yanaka ................... 347/41 |
| 6,409,299 B1 * | 6/2002 | Aihara .................... 347/15 |

FOREIGN PATENT DOCUMENTS

| | | |
|---|---|---|
| JP | 58-194541 | 11/1983 |
| JP | 63-38309 | 2/1988 |
| JP | 5-31922 | 2/1993 |
| JP | 6-22106 | 1/1994 |
| JP | 6-336016 | 12/1994 |
| JP | 7-52390 | 2/1995 |
| JP | 7-52391 | 2/1995 |
| JP | 07/125311 | 5/1995 |
| JP | 7-242025 | 9/1995 |
| JP | 2622429 | 4/1997 |
| JP | 10-235852 | 9/1998 |
| JP | 10-329381 | 12/1998 |
| JP | 2000-252938 | 9/2000 |

\* cited by examiner

Primary Examiner—Lamson Nguyen
(74) Attorney, Agent, or Firm—Fitzpatrick, Cella, Harper & Scinto

(57) ABSTRACT

A color ink-jet head, having plural arrays of nozzles side by side in a main scan direction corresponding to different color inks, is moved to scan reciprocally. In a multi-pass recording for divided recording on an area by scanning at plural times with the head, an ink firstly landed on recording of the area determines a prioritized color influential on the color tone. Moreover, a printing medium is largely covered by the recording of first two passes. A harmful influence on a whole image by the color irregularity can reduced by suppressing the color irregularity in the two passes, therefore, the data recording ratio of the first pass to the area is set smaller than that of the second pass and thereafter. Further, for such the control, a pseudo periodical masking data arranging record prohibiting pixels and record permitting pixels in a visually agreeable state is introduced.

61 Claims, 55 Drawing Sheets

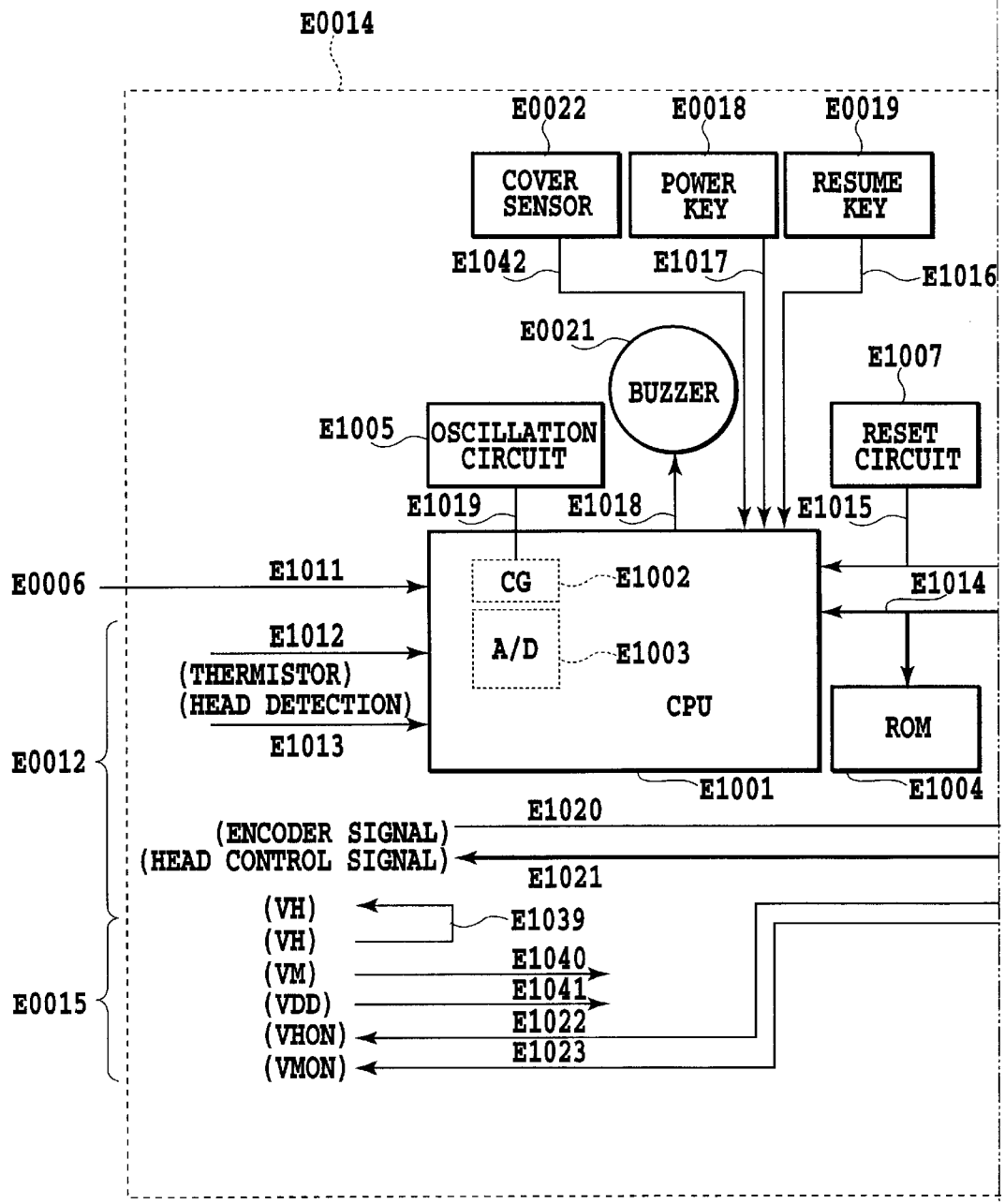

301

3201

3202

301　　　　　　　3301　　　　　　3302

301   3401   3402

301

3501

3502

| | | | | | |
|---|---|---|---|---|---|
| 1ST PASS DATA PRINTING RATIO (%) | 12.5 | 11 | 10 | 9 | 8 |
| 2ND PASS DATA PRINTING RATIO (%) | 12.5 | 14 | 15 | 16 | 17 |
| 1ST PASS DOT COVERING RATIO (CALCULATED) | 0.45 | 0.40 | 0.36 | 0.32 | 0.29 |
| 2ND PASS DOT COVERING RATIO (CALCULATED) | 0.25 | 0.30 | 0.34 | 0.37 | 0.41 |
| IMAGE EVALUATION RESULT | × | ○ | ◎ | ○ | △ |

FIG.35

| COLLECTIVE DOT | (pixel×pixel) | 1×1 | 4×1 | 4×2 | 4×4 | 10×10 |
|---|---|---|---|---|---|---|
| COLLECTIVE DOT AREA | ($\mu m^2$) | 1590 | 4724 | 7496 | 13148 | 67,367 |
| 1ST PASS PRINTING RATIO | (%) | 14 | 16 | 18 | 19 | 20 |
| 2ND PASS PRINTING RATIO | (%) | 36 | 34 | 32 | 31 | 30 |

FIG.38

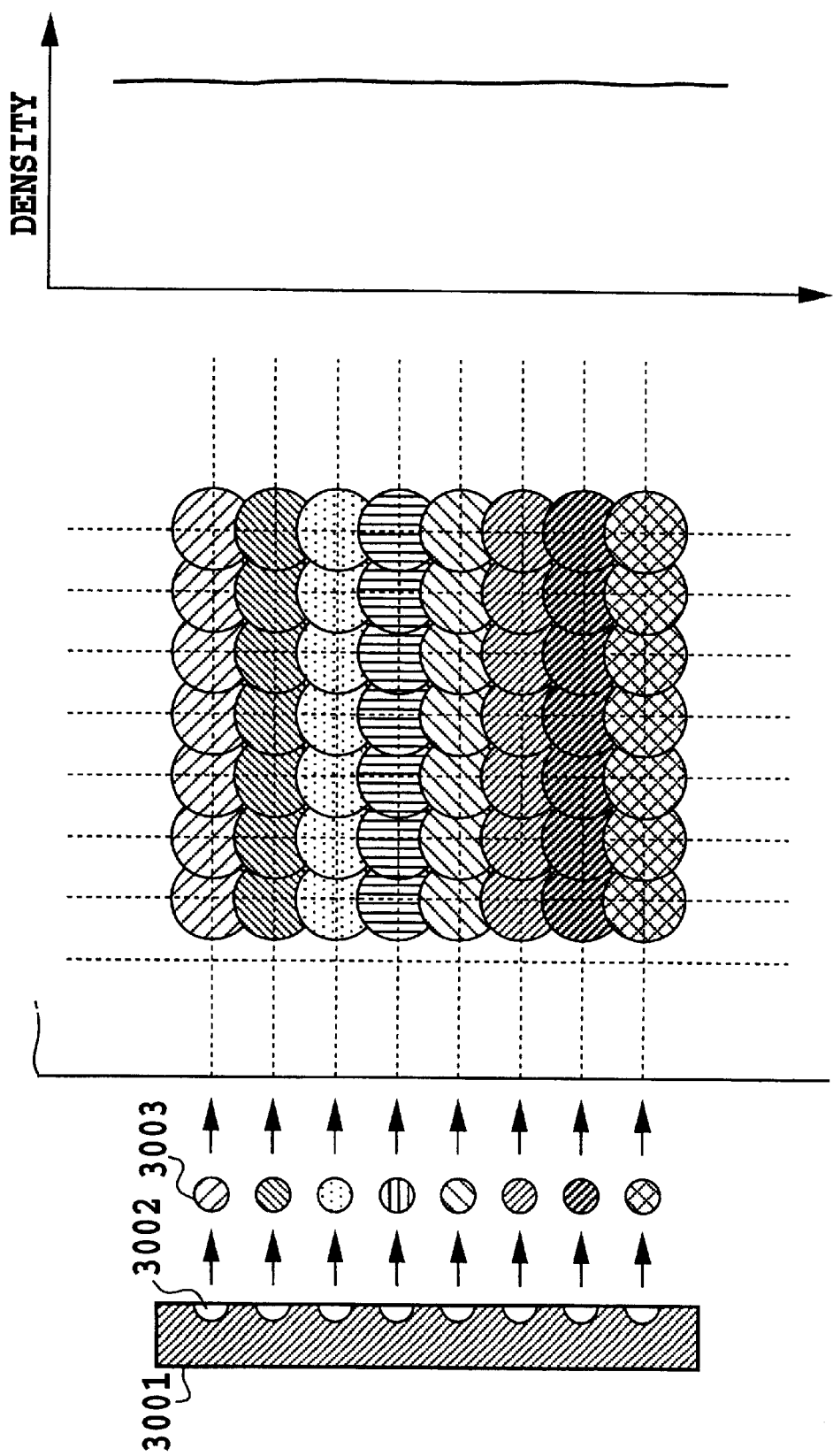

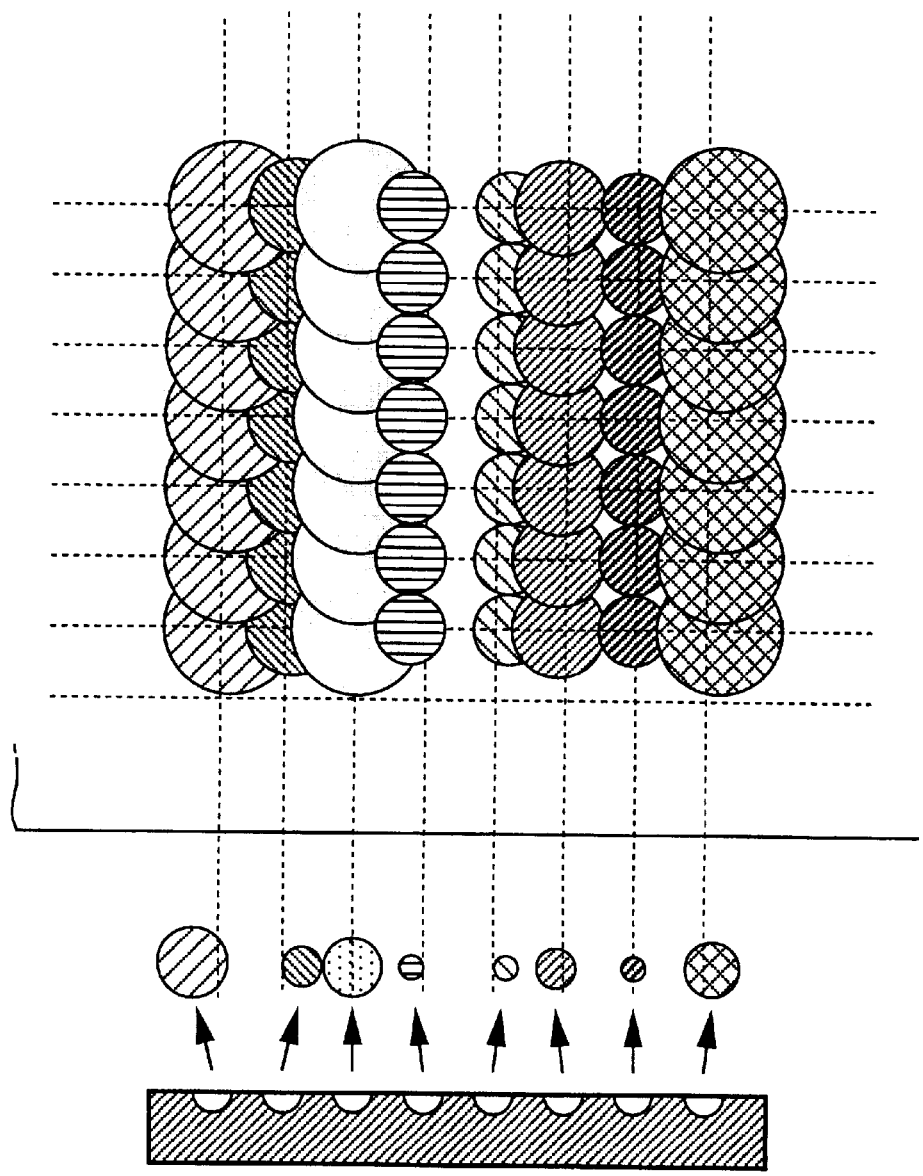
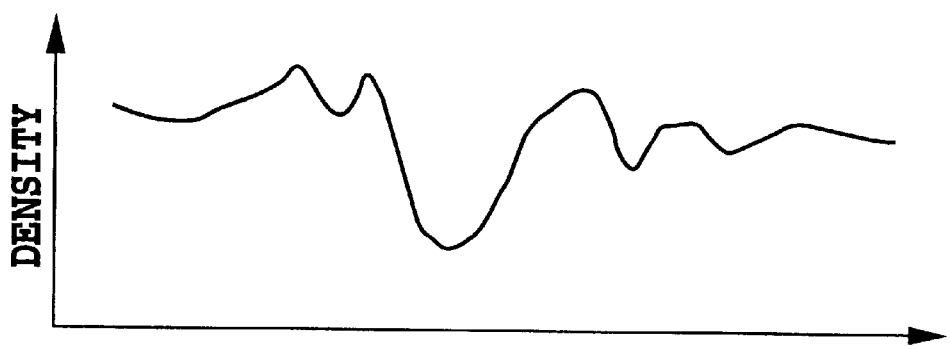
FIG.48A  FIG.48B  FIG.48C

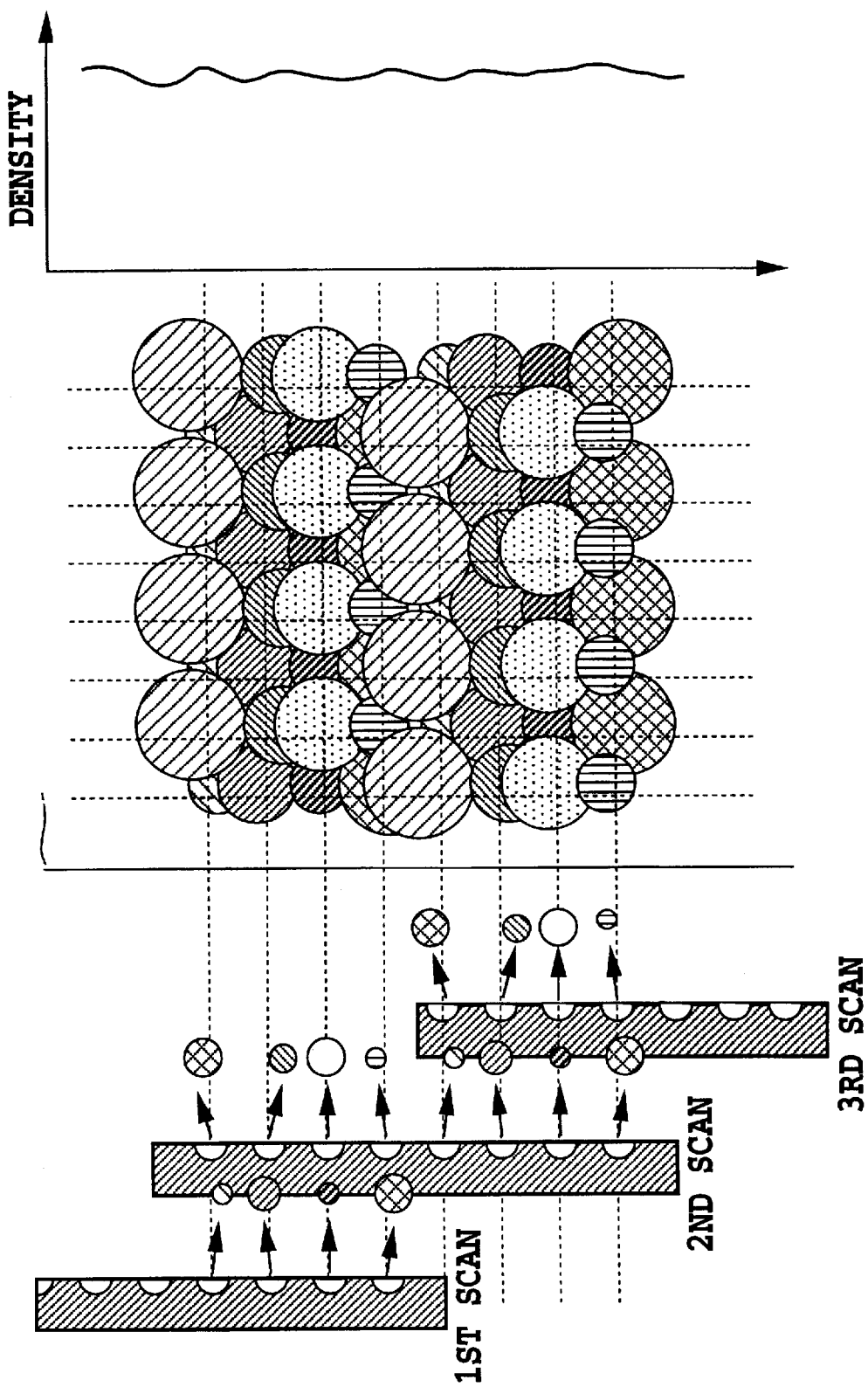

FIG.51A
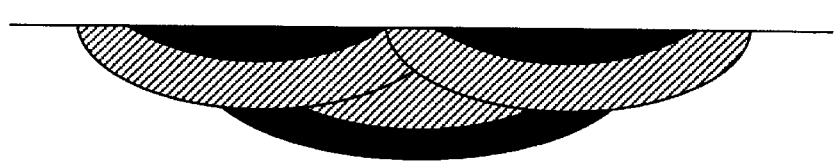
FIG.51B
FIG.51C
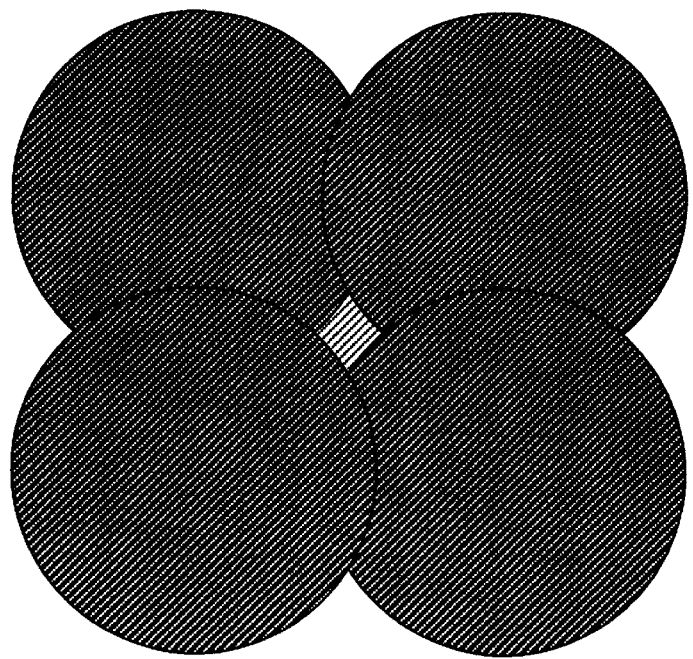

PRINTING METHOD, PRINTING APPARATUS AND PRINTING SYSTEM

This application is based on Patent Application Nos. 2000-261645 filed Aug. 30, 2000 and 2001-215789 filed Jul. 16, 2001 in Japan, the content of which is incorporated hereinto by reference.

BACKGROUND OF THE INVENTION

1. Field of the Invention

The present invention relates to a printing method and a printing apparatus, and is particularly suited for the application to a printing apparatus by the ink jet method. More particularly, the present invention intends to solve a granular impression of image and a color tone irregularity caused by the ejection order of color inks which are becoming problematic in case where the divided printing, for instance in a bi-directional printing, is performed applying a plurality of times of main scanning according to a pixel arrangement, in a complementary relation for a same image area in a so-called serial type color inkjet printing apparatus. In addition to general printing apparatus, the present invention can also be applied to copying machines, facsimiles with a communication system, word processors with a printer, and industrial printing apparatus combined with a variety of processing devices.

2. Description of the Related Art

An image printing apparatus of so-called serial scan type, which executes the print operation while scanning a print head, or a printing unit, over a print medium, has found a variety of image forming applications. The ink jet printing apparatus in particular has in recent years achieved high resolution and color printing, making a significant image quality improvement, which has resulted in a rapid spread of its use. Such an apparatus employs a so-called multi-nozzle head that has an array of densely arranged nozzles for ejecting ink droplets. Images with still higher resolution has now been made possible by increasing the nozzle density and reducing the amount of ink per dot. Further, to realize an image quality approaching that of silver salt picture, various technologies have been developed, including the use of pale or light color ink with reduced density in addition to four basic color inks (cyan, magenta, yellow and black). A print speed reduction problem, which is feared to arise as the picture quality advances, is dealt with by increasing the number of print elements, improving the drive frequency and employing a bi-directional printing technique, thus realizing a satisfactory throughput.

FIG. 45 schematically shows a general construction of a printer that uses the multi-nozzle for printing. In the figure, reference number 1901 represents head cartridges corresponding to four inks, black (K), cyan (C), magenta (M) and yellow (Y). Each head cartridge 1901 consists of an ink tank 1902T filled with a corresponding color ink and a head unit 1902H having an array of many nozzles for ejecting the ink supplied from the ink tank onto a print medium 1907.

FIG. 46 schematically shows the head unit 1902H in the Z direction for illustrating representing the nozzle array thereof. In this example, ejection openings 2001 are arrayed in one line.

In FIG. 45, designated 1903 is a paper feed roller which, in cooperation with an auxiliary roller 1904, clamps a print medium (print paper) 1907 and rotates in the direction of arrow in the figure to feed the print paper 1907 in the Y direction as required. Denoted 1905 is a pair of paper supply rollers that clamp the print paper 1907 and carries it toward the print position. The paper supply rollers 1905 also keep the print paper 1907 flat and tight between the supply rollers and the feed rollers 1903, 1904.

Designated 1906 is a carriage that supports the four head cartridges 1901 and moves them in a main scan direction during the print operation. When the printing is not performed or during an ink ejection performance recovery operation for the head unit 1902H, the carriage 1906 is set at a home position h indicated by a dotted line.

The carriage 1906, which was set at the home position h before the print operation, starts moving in the X direction upon reception of a print start command and at the same time the head unit 1902H ejects ink from a plurality of nozzles (n nozzles) formed therein according to print data to perform printing over a band of a width corresponding to the length of the nozzle array. When the printing is done up to the X-direction end of the print paper 1907, the carriage 1906 returns to the home position h in the case of one-way printing and resumes printing in the X direction. In the case of bi-directional printing, the carriage 1906 also performs printing while it is moving in a –X direction toward the home position h. In either case, after one print operation (one scan) in one direction has been finished before the next print operation is started, the paper feed roller 1903 is rotated a predetermined amount in the direction of arrow in the figure to feed the print paper 1907 in the Y direction a predetermined distance (corresponding to the length of the nozzle array). By repeating the one-scan print operation and the print paper feeding by a predetermined distance, data for one sheet of paper is printed.

Unlike a monochromatic printing that prints only characters such as letters, numbers and symbols, the color image printing must meet various requirements such as color development, grayscale characteristic and uniformity. As to the uniformity in particular, slight variations among individual nozzles that are produced during the manufacture of a multi-nozzle head formed integrally with many nozzles (in this specification the nozzle generally refers to an ejection opening, a liquid passage communicating with the ejection opening and an element for generating energy used to eject ink) influence the amounts of ink ejected from the individual nozzles and the directions of ink ejection during printing and eventually degrade the image quality in the form of density variations of the printed image.

Detailed examples will be explained by referring to FIGS. 47A–47C, 48A–48C and 49A–49C. In FIG. 47A, designated 3001 is a multi-nozzle head with a construction similar to the one shown in FIG. 46, which is shown to have only eight nozzles 3002 for simplicity. Denoted 3003 are ink droplets ejected from the nozzles 3002. It is ideal that the ink droplets are ejected in equal amounts and in the same direction. If ink ejection is done in this manner, ink dots of equal sizes land on the print medium, as shown in FIG. 47B, resulting in a uniform density distribution with no unevenness in density (FIG. 47C).

In reality, however, individual nozzles have their own variations and if the printing is done in a manner described above, the ink droplets ejected from individual nozzles vary in size and direction as shown in FIG. 48A, forming ink dots on the paper surface as shown in FIG. 48B. From this figure it is seen that a blank part appears cyclically in the head main scan direction, dots overlap excessively in other parts, or a white line occurs at the central part in the figure. The ink dots printed in this way produce a density distribution in the direction of nozzle arrangement or nozzle column as shown in FIG. 48C, which is perceived as unevenness in density by normal human eye.

To deal with the problem of the unevenness in density, the following method has been proposed.

This method will be explained by referring to FIGS. 49A to 49C. Although the head 3001 is scanned three times as shown in FIG. 14A to complete the print in an area similar to that shown in FIGS. 47A–47C and FIGS. 48A–48C, an area of four pixels, one-half the vertically arranged eight pixels, is completed with two scans (passes). In this case, the eight nozzles of the head 3001 is divided into two halves, upper four nozzles and lower four nozzles, and the number of dots formed by one nozzle in one scan is equal to the image data culled to one-half according to a predetermined image data arrangement. During the second scan, dots are embedded at the remaining half of the image data to complete the print in the four-pixel area. This method of printing is called a multi-pass printing method. With this printing method, if a print head similar to the one shown in FIG. 48A is used, the individual nozzle influence on the printed image is halved, so that the printed image will be as shown in FIG. 49B, rendering the white lines or dark lines shown in FIG. 48B less noticeable. Hence, the unevenness in density is significantly improved as shown in FIG. 49C when compared with FIG. 48C.

While the same print area has been described to be completed in two scans, the multi-pass printing improves the image quality as the number of passes increases. This however elongates the print time, which means that there is a trade-off relation between the image quality and the print time.

Under such a situation, there have already been various proposals for the purpose how speedily and beautifully an image can be outputted. Japanese Patent Application Laid-open No. 5-31922 (1993) discloses such contents that an image data arrangement by a tone production method such as a dither method are masked by applying a thinning pattern with dot arrangement asynchronous with the image data arrangement. According to this Application, a data printing ratio is made equal in plural passes as far as possible to obtain a smooth image by using a mask pattern which does not synchronized with a predetermined dither pattern. However, although this method has been able to cope with the predetermined dither pattern for the purpose, it has been difficult to equally cope with all the binarization methods.

Moreover, Japanese Patent Application Laid-open No. 7-52390 (1995) discloses a printing method using a mask pattern provided with randomness. According to this method, the principal object in a divided printing, i.e., improvement in unevenness of an image caused by connecting parts and variation in nozzles is possible to any binarization method.

However, it is difficult to configure a mask applied to a large range such as all over a printing medium without providing a considerable amount of memory; so in practice, it is general to apply a predetermined size of mask to the whole printing medium surface repeatedly. On the other hand, in a printing apparatus, a slight difference is generated for dot formation position between recording scans, as some mechanical errors appear for each recording scan. This slight difference makes the mask pattern applied to respective recording scan visible on the formed image, and sometimes deteriorated the image quality by a reiterative appearance of texture of a predetermined size. Therefore, a configuration for preventing a cyclic repetition of apparent random mask from occurring, by shifting the application start position of random mask having the aforementioned predetermined size for each recording scan, or by randomly changing the shifting amount has been proposed (Japanese Patent Application Laid-open No. 7-125311 (1995)). This makes difficult to recognize visually the deteriorated image quality, because, even if the pattern of the aforementioned predetermined size appears, it is not arranged regularly.

The above-mentioned divided printing has had a problem that time and cost required for printing a sheet of paper increases as the number of division increases, and the throughput of printing decreases. To improve this problem, reduction in printing time can be considered by carrying out printing in the process of reciprocal scanning of a carriage (bi-directional printing). According to this method, since all carriage scanning operations made to return to the home position without printing anything are omitted, a printing time for a sheet of paper can be reduced approximately by half. And, in practice, the bi-directional printing has frequently been adopted as a printing method of a monochrome image.

However, in a color ink-jet printing apparatus, it has been difficult to realize bi-directional printing due to the below described factors.

FIGS. 50A and 50B show a state in which dots of a printing ink widely used at present are landed on a printing medium (paper) P, and here, the figures show the case where ink dots of different colors are absorbed (printed) at almost adjoining positions at a time interval. Here, it should be noted that in the overlapped part of the two dots, the ink dot landed later penetrates and sinks into the paper deeper than the ink dot landed earlier. This fact is for the following reason. Namely, since bonding between the printing medium and a coloring matter is limited at the stage when the coloring matter such as dyestuff in the ejected ink is physically and chemically bonded to the printing medium, and the bonding between the coloring matter in the precedingly ejected ink and the printing medium is prioritized, the ink coloring matter remains on the surface of the printing medium more than the following one, so far as coloring matters do not differ much in the bonding strengths depending on the kinds. Consequently, it is thought that the ink coloring matter subsequently landed is hard to be bonded to the surface of the printing medium, and sinks in the paper in the depth direction to dye and bond it. In this case, even though two kinds of inks are landed at the same position, their colors are prioritized according to the landing order, and result in representing two different colors to visual characteristic of human eyes in case where there are pixels differentiated in the landing order of two kinds of ink even when a mixed color recording is performed with two kinds of ink.

In the construction shown in FIG. 45, the four color heads 1901, which are arranged in order of black (K), cyan (C), magenta (M), and yellow (Y) from the right in this figure, move to the right as shown by the x-coordinate from the printing start position shown in the figure in the forward scanning, and perform printing operation by ejecting each ink in the moving process. Since the order of printing on the paper is in accordance with that of the above-mentioned arrangement in this case, for example, when a signal of green (cyan+yellow) is inputted for a certain area, the inks are absorbed in each pixel in order of cyan and yellow. Therefore, the cyan absorbed precedently is the prioritized color in this scanning, and green dots with a cyan tone are formed. On the other hand, in the return or backward scanning after the paper has been fed in the direction of y-coordinate, the four color heads are positioned at the right side in the figure, and then perform printing operation while moving in the reverse direction of the forward way.

Therefore, the landing order is also inverted, and green dots with a yellow tone are formed in this scanning.

If scanning for printing is repeated as the above, a green dot area with a cyan tone and a green dot area with a yellow tone are alternately formed in the sub-scanning direction (y-direction) according to the forward and backward printings with the printing heads. Namely, if print-scanning is carries out without considering the divided printing and the paper is fed by an amount of the y-directional head width between the forward and backward scans, the green area with a cyan tone and the green area with a yellow tone are alternately repeated at each head width in the y direction, and this causes deterioration in quality of the green image which should be even.

However, it is possible to overcome this harmful influence a little by using the divided printing method already described above. Namely, although green dots with a cyan tone are printed in the forward scanning and green dots with a yellow tone are printed in the backward scanning, even if the divided printing is performed, the paper is fed by an amount smaller than the head width between the forward and backward scans, therefore, a color tone in a certain area contains a mixture of both tones of dots, and this relaxes unevenness of color.

These constructions and effects have already been disclosed in U.S. Pat. No. 4,748,453. This invention describes such effects that although a paper feed amount is not restricted, ink is prevented from beading on a medium such as a plastic sheet for an OHP by performing supplementary printing to the pixels alternately positioned in the horizontal and vertical directions in the printing area by printing divided into the first and second (or more) scans, and that when a color image is formed, color-banding (unevenness of color) can be prevented by inverting the landing order of the inks at mixed color pixels in the first and second scans (forward and backward printing). Since it is the principal object of the invention of the above-mentioned Patent to prevent beading between each pixel, it is characterized that each pixel printed in a single scanning is alternate in the horizontal and vertical directions (not adjoining each other).

On the other hand, according to Japanese Patent Application Laid-open No. 58-194541 (1983) applied by the applicant of the present invention, such a printing method is disclosed that when plural arrays of printing elements are arranged in parallel and main scanning of dot matrix printing is carried out by moving them forward and backward in the direction perpendicular to the array of printing elements, the duplicate printing dots by said plural arrays of printing elements have been made to differ in order of the duplicate printing on the forward and backward ways of said main scanning from each other, by intermittently printing the smaller number of dots than the entire dots to be printed at least in either of each row or column of the printing dot matrix in the forward main scanning, and intermittently printing the remaining dots in either of each row or column of the printing dot matrix in the backward main scanning. This Application does not describe either about restriction to reduce a paper feed amount smaller than a normal one as in the divided printing mentioned above, but describes, as an effect, about prevention of image deterioration caused by color tone irregularity (color banding) of a printed image based on the duplicate printing with the color inks. Moreover, since it is the principal object in the invention of the Application to prevent this color tone irregularity, no special restriction is described on dot positions to be printed in each scanning, but horizontal thinning in which dots are alternately printed only in the vertical direction and vertical thinning in which dots are printed alternately only horizontal direction are described, in addition to a checker pattern printing.

Moreover, the Japanese Patent Publication No. 63-38309 (1988) also discloses that, although this Publication is not restricted to a color printer, a construction for performing back-and-forward printing using a diced form (checker pattern) is disclosed. An object of the invention in the Publication is to prevent adjoining dots from being successively printed and to prevent dot-distortion from occurring by avoiding printing an adjacent dot before the printed dot is dried. Therefore, according to this invention, similarly to the above-mentioned U.S. Pat. No. 4,748,453, the thinning-out mask is restricted to a diced form (checker pattern).

However, even though the divided printing is performed according to the checker pattern disclosed in the Publication, the harmful influence of color irregularity is not completely solved yet.

The reason for the above will be explained below by referring to FIGS. 51A to 51C, and 52. Usually, an ink droplet quantity is designed so as to spread larger than an area given to each pixel on the paper. This is for the purpose of completely blinding a white part (ground of a printing medium) of the paper to an area of 100% data printing ratio. Therefore, when a two-divided printing is performed, a pixel itself is printed only 50% by a single scanning, but almost 100% area of the printing medium (printing paper) is covered.

FIGS. 51A and 51B show the cross sections in this case. Here, they show that the first pass (forward scanning) provides a checker pattern printing, and the second pass (backward scanning) provides an inverted checker pattern. FIG. 51A shows the appearances of inks directly after printing in the first pass (forward scanning), and the part fully painted out is printed with cyan ink, and the shaded portion is printed with yellow ink. Since the yellow ink is landed at the same position as the cyan ink at a slight time interval, when they are absorbed in the paper, the cyan ink blurs little and the density stays high, while the yellow ink goes under and around the cyan ink, to blur large, and the density becomes low. Moreover, the absorption of these inks extends to the adjacent pixels in this case, so that the paper surface is almost filled with the inks (FIG. 51A).

In the second pass printing (backward scanning) performed under this condition, the inks are landed on the spot where the adjoining inks are already absorbed. Since the second pass is a backward scanning, the yellow ink is landed before the cyan ink (FIG. 51B). When the inks are absorbed as they are, such an absorption state is brought as both colors does not appear much on the surface in the end as shown in FIG. 51C. And, as a finally completed image, the cyan density of the first printing is emphasized most strongly, and this printing area is provided with a green image with emphasis on cyan. Contrariwise, in the printing area provided with the first pass printing by the backward scanning and adjacent to the above-mentioned printing area, the cyan and the yellow are inverted, so that a green image is obtained with a yellow tone prioritized.

FIG. 52 shows the printed states of the above two printing areas, representing the case in which forward and backward printing was carried out by using a multi-nozzle head with 16 nozzles according to the method described in FIGS. 49A to 49C. From this figure, it can be seen that a precedent half of the head always determines a prioritized color for each area of an eight-dot width, and that the prioritized colors are inverted from each other in forward and backward scanning.

Although the description has been made here assuming that a checker patterned mask was applied, a random mask printing method disclosed in the before-mentioned Japanese Patent Application Laid-open No. 7-52390 (1995) has brought a similar result, and since two areas with different prioritized colors existed alternately, color irregularity has still appeared also in divided printing and deteriorated an image, and a bi-directional printing has been made difficult.

As a solution of the harmful effect of the above-described color irregularity, the invention disclosed in Japanese Patent Application Laid-open No. 6-22106 (1994) is mentioned. According to this invention, a group of m×n pieces of pixels (this group will be referred as a 'collective dot' or a 'collective pixel') is used as a unit for printing, and printing is performed by using an arranging matrix in which the groups are not adjacent to each other. The Application discloses such an effect as an amount swelling out to a blank paper area has been reduced by printing a batch of m×n pieces of pixels, and a difference between prioritized colors in forward and backward printings has been eliminated to reduce the harmful effect of color irregularity.

As mentioned above, the effect of multi-pass recording has been reflected on the image, by a technique for making the cyclicity of the random mask unobvious while applying the random mask method basically (Japanese Patent Application Laid-open No. 7-125311 (1995)), or a technique for taking a group of m×n pixels as recording unit, and recording by using an arrangement mask where groups are not adjacent each other.

However, the technique disclosed respectively in the above-described Japanese Patent Application Laid-open No. 7-125311 (1995), Japanese Patent Application Laid-open No. 6-22106 (1994) and Japanese Patent Application Laid-open No. 7-52391 (1995) were not sufficient for recording a high quality photographic tone image which is required in recent years.

Even when the technology disclosed in Japanese Patent Application Laid-open No. 7-125311 (1995) is applied, the presence of texture makes the difference from the silver salt photography evident in a picture composed using a trace of ink so small as several pl (pico-litters) as a unit which is required in recent years. Also, for Japanese Patent Application Laid-open No. 6-22106 (1994) and Japanese Patent Application Laid-open No. 7-52391 (1995), a batch of gathered dots unit for a sufficient effect of controlling color irregularity exceeds a degree of human visual resolution, so that a texture becomes visually conformable. Namely, although the invention has been able to fully cope with a desktop publishing, and a printing for images consist of graphics or text, it could be harmful to a photographic image quality which is in great demand in recent years. Therefore, under the existing circumstances, it is general to cope with the problem by applying a random mask printing method with increasing the number of divided recording, however, when bi-directional printing is carried out to increase the throughput, color irregularity still remains to some extent, the ink landing position deviation between the forward printing scan and the backward printing scan appears as texture, causing the deterioration of image quality.

Moreover, in the bi-directional printing, the deviation between a dot formation position (ink landing position) by the forward scan and a dot formation position by the backward scan is added as a new error factor, and the deterioration of image quality by this also thwarts the photographic image quality. A processing for dot formation position registration (bi-directional registration) of bi-directional scanning in the bi-directional printing can be performed, by applying a technology as described in Japanese Patent Application Laid-open No. 10-329381 (1998) when a user acquired a printing apparatus, or during the use thereafter.

However, even when the bi-directional registration processing is performed a phenomenon in which the print medium surface rises (called cockling, hereinafter) may appear depending on the ink amount afforded in an actual recording operation, and the adjustment appropriate value for the bi-directional registration may become locally different from the other areas. In such a case, the image may impress granular only in the cockled portion, and the granularity becomes all the more confirmable because it is partial. In addition, the state of cockling is also affected by the nature of printing medium, use environment and, further, recording data quantity, and its generation area is uncertain on the printing medium. There, the aforementioned texture appears irregularly in a part of the printing medium surface where there is much undulation, deteriorating the photographic image quality. That is, even the bi-directional registration processing can not cope with the generation of such cockling.

SUMMARY OF THE INVENTION

The present invention is made considering the above-mentioned problems, and its purpose is to make it possible to form a high quality image, namely, to make it possible to record images of a photographic quality without granularity nor color irregularity, in case where the divided printing is performed applying a plurality of times of main scanning according to a pixel arrangement in a complementary relation for a same image area.

In a first aspect of the present invention, there is provided a printing method using a print head on which a plurality of ejection openings for ejecting inks are arranged, the method comprising the steps of:

scanning the print head in a main scan direction different from the arranging direction of the plurality of ejection openings, also relatively transporting the printing medium in an sub scan direction perpendicular to the main scan direction by the quantities less than the arranging width of the plurality of ejection openings, and forming an image on the printing medium by a plural times of the main scans in accordance with pixel arrangements in a complementary relation to the same image area; and applying a mask having data arrangement of less low frequency components and high dispersion to the complementary pixel arrangement, the data arrangement having a visually agreeable arrangement of print permitting pixels and print prohibiting pixels in each of the plural times of main scans.

In a second aspect of the present invention, there is provided a printing apparatus using a print head on which a plurality of ejection openings for ejecting inks are arranged, said apparatus comprising:

means for scanning said print head in a main scan direction different from the arranging direction of said plurality of ejection openings, also relatively transporting said printing medium in an sub scan direction perpendicular to said main scan direction by the quantities less than the arranging width of said plurality of ejection openings, and forming an image on the printing medium by a plural times of said main scans in accordance with pixel arrangements in a complementary relation to the same image area; and means for applying a mask having data arrangement of less low frequency components and high dispersion to said complementary pixel arrangement, said data arrangement having a visually agreeable arrangement of print permitting pixels and print prohibiting pixels in each of said plural times of main scans.

In a third aspect of the present invention, there is provided a printing system comprising a printing apparatus using a print head on which a plurality of ejection openings for ejecting inks are arranged, and a host apparatus for supplying image data to the printing apparatus, the printing apparatus having:

means for scanning the print head in a main scan direction different from the arranging direction of the plurality of ejection openings, also relatively transporting the printing medium in an sub scan direction perpendicular to the main scan direction by the quantities less than the arranging width of the plurality of ejection openings, and forming an image on the printing medium by a plural times of the main scans in accordance with pixel arrangements in a complementary relation to the same image area; and means for applying a mask having data arrangement of less low frequency components and high dispersion to the complementary pixel arrangement, the data arrangement having a visually agreeable arrangement of print permitting pixels and print prohibiting pixels in each of the plural times of main scans.

In a fourth aspect of the present invention, there is provided a storage medium storing a control program for making a printing apparatus perform a printing method, the printing apparatus using a print head on which a plurality of ejection openings for ejecting inks are arranged, and the printing method comprising the steps of:

scanning the print head in a main scan direction different from the arranging direction of the plurality of ejection openings, also relatively transporting the printing medium in an sub scan direction perpendicular to the main scan direction by the quantities less than the arranging width of the plurality of ejection openings, and forming an image on the printing medium by a plural times of the main scans in accordance with pixel arrangements in a complementary relation to the same image area; and applying a mask having data arrangement of less low frequency components and high dispersion to the complementary pixel arrangement, the data arrangement having a visually agreeable arrangement of print permitting pixels and print prohibiting pixels in each of the plural times of main scans.

In a fifth aspect of the present invention, there is provided a control program for making a printing apparatus perform a printing method, the printing apparatus using a print head on which a plurality of ejection openings for ejecting inks are arranged, and the printing method comprising the steps of:

scanning the print head in a main scan direction different from the arranging direction of the plurality of ejection openings, also relatively transporting the printing medium in an sub scan direction perpendicular to the main scan direction by the quantities less than the arranging width of the plurality of ejection openings, and forming an image on the printing medium by a plural times of the main scans in accordance with pixel arrangements in a complementary relation to the same image area; and applying a mask having data arrangement of less low frequency components and high dispersion to the complementary pixel arrangement, the data arrangement having a visually agreeable arrangement of print permitting pixels and print prohibiting pixels in each of the plural times of main scans.

In any one of the above aspects, the mask may have a pseudo periodical data arrangement.

Here, a step of or means for generating the pseudo periodical data arrangement in a mask area having an extension of the predetermined number of pixels may be comprised, the generating step or means having a first step of or means for setting at random an initial print permitting pixel in the mask area; a second step of or means for affording a predetermined repulsive potential to all of set print permitting pixel positions; a third step of or means for setting the pixel on a position in the mask area where the sum of the potentials becomes minimum as a new printable pixel; and a fourth step of or means for reiterating the processing of the second step or means and the processing of the third or means step until pixels on all positions in the mask area become print permitting pixels.

Alternatively, a step of or means for generating the pseudo periodical data arrangement in a mask area having an extension of the predetermined number of pixels may be comprised, the generating step or means having a first step of or means for dividing the mask area into a plurality of areas in correspondence to the main scan to be performed the plurality of times; a second step of or means for setting at random at least one initial print permitting pixel in at least one the area; a third step of or means for setting pixel of the other area positionally corresponding to the set all print permitting pixels as print prohibiting pixel; a fourth step of or means for affording a predetermined repulsive potential to the positions of all of set print permitting pixels; a fifth step of or means for setting the pixels on a position in the mask area where the sum of the potentials becomes minimum as a new print permitting pixel, except for that set as the print prohibiting pixel; and a sixth step of or means for reiterating the processing of the third step or means to the processing of the fifth step or means until the quotient of the number of pixel in the mask area divided by the number of the areas become print permitting pixels.

The repulsive potential may be expressed by a function attenuating according to a distance from the print permitting pixel.

In any one of the first to fifth aspects, the data arrangement may have blue noise characteristics.

Further, in any one of the first to fifth aspects, the data arrangement applied at least to a first main scan among the plurality of times of main scans may be specified in a collective pixel having a size of m pixel(s) in the main scan direction and n pixel(s) in the sub scan direction (m and n are integrals. Provided that at least one of them is equal or superior to 2) as unit.

Here, the data arrangement may be a pseudo periodical data arrangement of the collective pixels.

The m may be an integer equal or superior to 2, and adjacent the collective pixels are arranged each other, so as to overlap in the sub scan direction in a range equal or superior to 1 pixel and less than m pixels.

Alternatively, the n may be an integer equal or superior to 2, and adjacent the collective pixels are arranged each other, so as to overlap in the main scan direction in a range equal or superior to 1 pixel and less than n pixels.

In any one of the first to fifth aspects, a plurality of the ejection openings may be arranged for a plurality of inks different in color tone, and the data arrangement applied to one time of the main scan may be differentiated according to the color tone.

In any one of the first to fifth aspects, at least two times of the main scan may be performed respectively in the forward and backward directions for the same image area, in the processing by the image formation step means, the sum of the data arrangements applied to the at least two times of main scan in the forward direction, and/or the sum of the mask arrangements applied to the at least two times of main scan in the backward direction may be also arrangements presenting little low frequency components and a high dispersion, and having a visually agreeable arrangement of print permitting pixels and print prohibiting pixels.

Alternatively, in any one of the first to fifth aspects, at least two times of the main scan may be performed respectively in the forward and backward directions for the same image area, in the processing by the image formation step means, the sum of the mask arrangements applied to the at least two times of main scan in the forward direction, and/or the sum of the mask arrangements applied to the at least two times of main scan in the backward direction may be pixel arrangements specified by a collective pixel having a size of m pixel(s) in the main scan direction and n pixel(s) in the sub scan direction (m and n are integrals. Provided that at least one of them is equal or superior to 2) as unit.

The sum of the data arrangements applied to the at least two times of main scan in the forward direction, and/or the sum of the data arrangements applied to the at least two times of main scan in the backward direction may be also arrangements presenting little low frequency components and a high dispersion, and having a visually agreeable arrangement of print permitting pixels and print prohibiting pixels.

In any one of the first to fifth aspects, data arrangement does not synchronize with a mask arrangement of the time when an image input as printing object may be binarized.

Further, in any one of the first to fifth aspects, the plurality of ejection openings may be arranged on the print head in the sub scan direction with an interval of the transport pitch multiplied by an integer, the image formation step or means may perform the image formation by performing the plurality of times of main scan and the transport, and the application step or means may apply a visually agreeable data arrangement of little low frequency components and high dispersion, to the pixel arrangement to be printed by one time of the main scan.

The invention according to any one of the above aspects may further comprises a step of or means for controlling, in the image formation, the sum of ratios of data print quantity in the main scan of odd-number of order among the plurality of main scans to the total data print quantity for the same image area be smaller than the sum of ratios of data print quantity in the main scan of even number of order among the plurality of main scans.

Here, the ratio of data print quantity in the first main scan among the plurality of main scans may be made smaller than the ratio of data print quantity in the second main scan.

The main scan may be performed three times or more for the same image area, the ratio of data print quantity in the third main scan and thereafter may be made larger than the ratio of data print quantity in the first main scan, and smaller than the ratio of data print quantity in the second main scan.

The sum of covering ratio of the print medium by dots formed in the first main scan and the second scan may be made larger than 50%.

The data arrangement applied at least to the first main scan among the plurality of times of main scan may be specified taking a collective pixel having a size of m pixel(s) in the main scan direction and n pixel(s) in the sub scan direction (m and n are integrals. Provided that at least one of them is equal or superior to 2) as unit.

In any one of the first to fifth aspects, further comprising the step of controlling, in the image formation, so that the sum of ratios of data print quantity in the first main scan among the plurality of main scans be smaller than the ratio of data print quantity in the second main scan, and the sum of covering ratio of the print medium by dots formed in the first main scan and the second scan be larger than 50%.

Here, the covering ratios of the print medium by dots formed in the first main scan and the second scan may be made approximately equal.

The invention according to any one of the above aspects may further comprises:
    a first control step of or mode for controlling, in the image formation, so that the sum of ratios of data print quantity in the main scan of odd number of order among the plurality of main scans to the total data print quantity for the same image area be smaller than the sum of ratios of data print quantity in the main scan of even number of order among the plurality of main scans; and
    a second control step of or mode for performing a control similar to the first control step or mode for a plurality of times of main scans less that the first control step, and specifying the arrangement pixel in at least the first main scan among the plurality of times of main scan taking a pixel group of m pixel(s) in the main scan direction and n pixel(s) in the sub scan direction (m and n are integrals. Provided that at least one of them is equal or superior to 2) as unit.

Here, the changeover selection of the first control step or mode and the second control step or mode may be made possible.

In any one of the above aspects, the plurality of times of main scan for forming an image on the print medium includes the main scan in the forward direction and the main scan in the backward direction.

Further, in any one of the above aspects, the print head may have a plurality of columns of the plurality of ejection openings, in correspondence to inks different in color tone, juxtaposed in the direction of the main scan.

Moreover, in any one of the above aspects, the print head may have heating elements to generate thermal energy for causing film boiling in ink as an energy for ejecting ink from the ejection openings.

According to the present invention, in a serial type ink jet printing apparatus using a print head where a plurality of ink ejection openings are arranged and completing an image on a printing medium by performing a bi-directional print scanning in a direction perpendicular to the arrangement direction of the plurality of ink ejection openings, while feeding paper successively in a direction parallel to said plurality of ink ejection openings, even when a longitudinal or transversal deviation of ink landing position occurs, a stable image without granular impression can be obtain, by applying a divided printing method for completing an image on a printing medium by a plurality of printing scans using a plurality of pixel arrangements where pixel arrangements made of print permitting pixels and print prohibiting pixels are in a mutual complementary relation, wherein the pixels arrangement printed on the print medium by a single print scan is made to become visually agreeable arrangements (for example, pseudo periodical arrangement).

Also, according to the present invention, it becomes possible to record rapidly an image with photographic quality exempt from irregularity of color by the bi-directional printing, by making the sum of proportion of data print amount in the scanning of odd number of order among said a plurality of forward and backward scans for the data print amount of the whole smaller than the sum of proportion of data print amount in the scanning of even number of order among said a plurality of forward and backward scans, or, by making the proportion of the data print amount in the first scan among said a plurality of forward and backward scans smaller than the proportion of the data print amount in the second scan. Further, a smoother print with less image perturbation becomes feasible, by introducing a pseudo periodical arrangement mask making the arrangement of print permitting pixels and print prohibiting pixels visually more preferable.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is a diagram showing the relation between FIGS. 8A and 8B,

FIGS. 8A and 8B being block diagrams representing an example inner configuration of a main printed circuit board (PCB) in the electric circuitry of FIG. 7;

FIG. 9 is a diagram showing the relation between FIGS. 9A and 9B,

FIG. 35 shows an evaluation result of color irregularity in the case of the experiment performed by varying a data printing ratio of the first and second passes in 1% steps according to a multi-pass printing method;

FIG. 38 shows a table for explaining the effect of the embodiment illustrated in FIG. 37;

FIGS. 47A to 47C are explanatory diagrams showing a state in which an ideal ink jet printing is performed;

FIGS. 48A to 48C are explanatory diagrams showing a state in which density unevenness occurs during the ink jet printing;

FIGS. 49A to 49C are explanatory diagrams showing a principle of a multi-pass printing for preventing density unevenness explained in FIG. 48;

FIGS. 51A to 51C are illustrations explaining the states of ink penetration into the printing medium in the case of carrying out bi-directional printing with the multi-pass printing method.

DESCRIPTION OF THE PREFERRED EMBODIMENTS

Embodiments of the printing apparatus according to the present invention will be described by referring to the accompanying drawings.

In the following description we take up as an example a printing apparatus using an ink jet printing system.

In this specification, a word "print" (or "record") refers to not only forming significant information, such as characters and figures, but also forming images, designs or patterns on printing medium and processing media, whether the information is significant or insignificant or whether it is visible so as to be perceived by humans.

The word "print medium" or "print sheet" include not only paper used in common printing apparatus, but cloth, plastic films, metal plates, glass, ceramics, wood, leather or any other material that can receive ink. This word will be also referred to "paper".

Further, the word "ink" (or "liquid") should be interpreted in its wide sense as with the word "print" and refers to liquid that is applied to the printing medium to form images, designs or patterns, process the printing medium or process ink (for example, coagulate or make insoluble a colorant in the ink applied to the printing medium).

1. Apparatus Body

Figure 1:
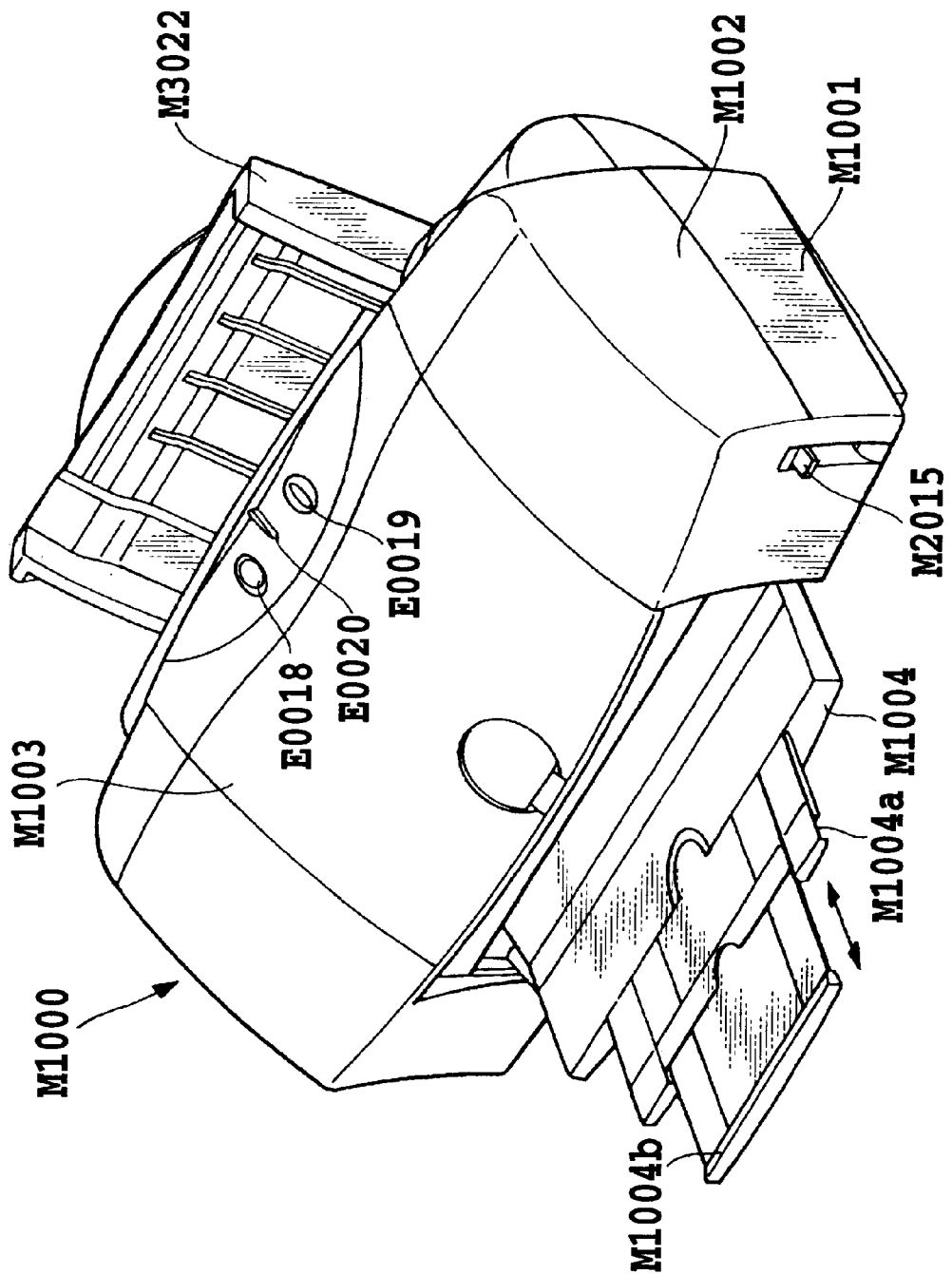
FIG. 1 is a perspective view showing an external construction of an ink jet printer as one embodiment of the present invention.
Figure 2:
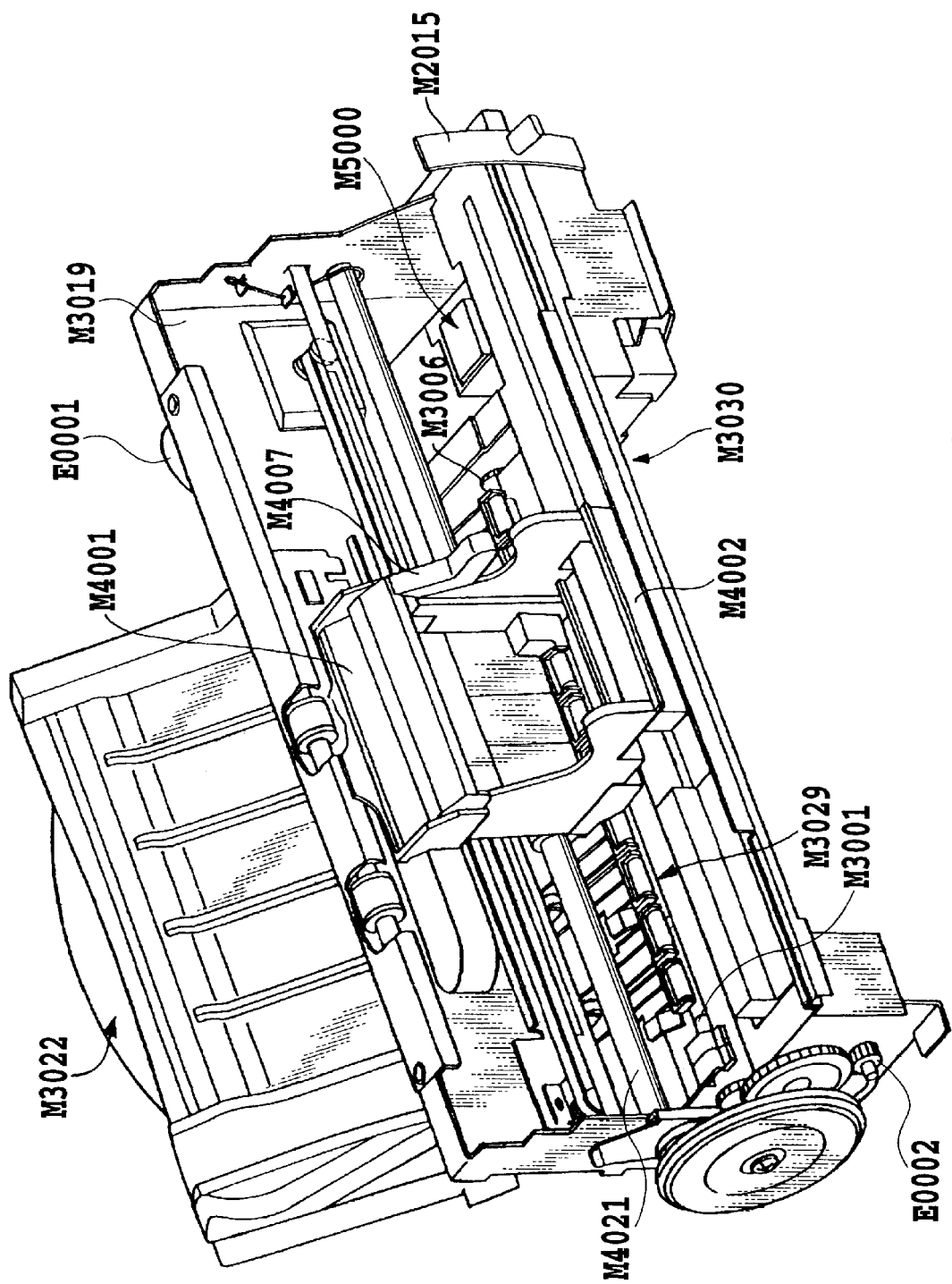
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chassis M3019 is made of a plurality of plate-like metal members with a predetermined rigidity to form a skeleton of the printing apparatus and holds various printing operation mechanisms described later.

The lower case M1001 forms roughly a lower half of the housing of the printer body M1000 and the upper case M1002 forms roughly an upper half of the printer body M1000. These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001. When the print operation is to be performed, the discharge tray M1004 is rotated forwardly to open the opening so that printed sheets can be discharged and successively stacked. The discharge tray M1004 accommodates two auxiliary trays M1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such as alerting the operator to printer troubles as by changing its blinking intervals and color. Further, a buzzer E0021 (FIG. 7) may be sounded. When the trouble is eliminated, the resume key E0019 is pressed to resume the printing.

2. Printing Operation Mechanism

Next, a printing operation mechanism installed and held in the printer body M1000 according to this embodiment will be explained.

The printing operation mechanism in this embodiment comprises: an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit to perform a desired printing on the print sheet carried to the print position; and an ejection performance recovery unit M5000 to recover the ink ejection performance of the print unit.

Here, the print unit will be described. The print unit comprises a carriage M4001 movably supported on a carriage shaft M4021 and a print head cartridge H1000 removably mounted on the carriage M4001.

2.1 Print Head Cartridge

First, the print head cartridge used in the print unit will be described with reference to FIGS. 3 to 5.

Figure 3:
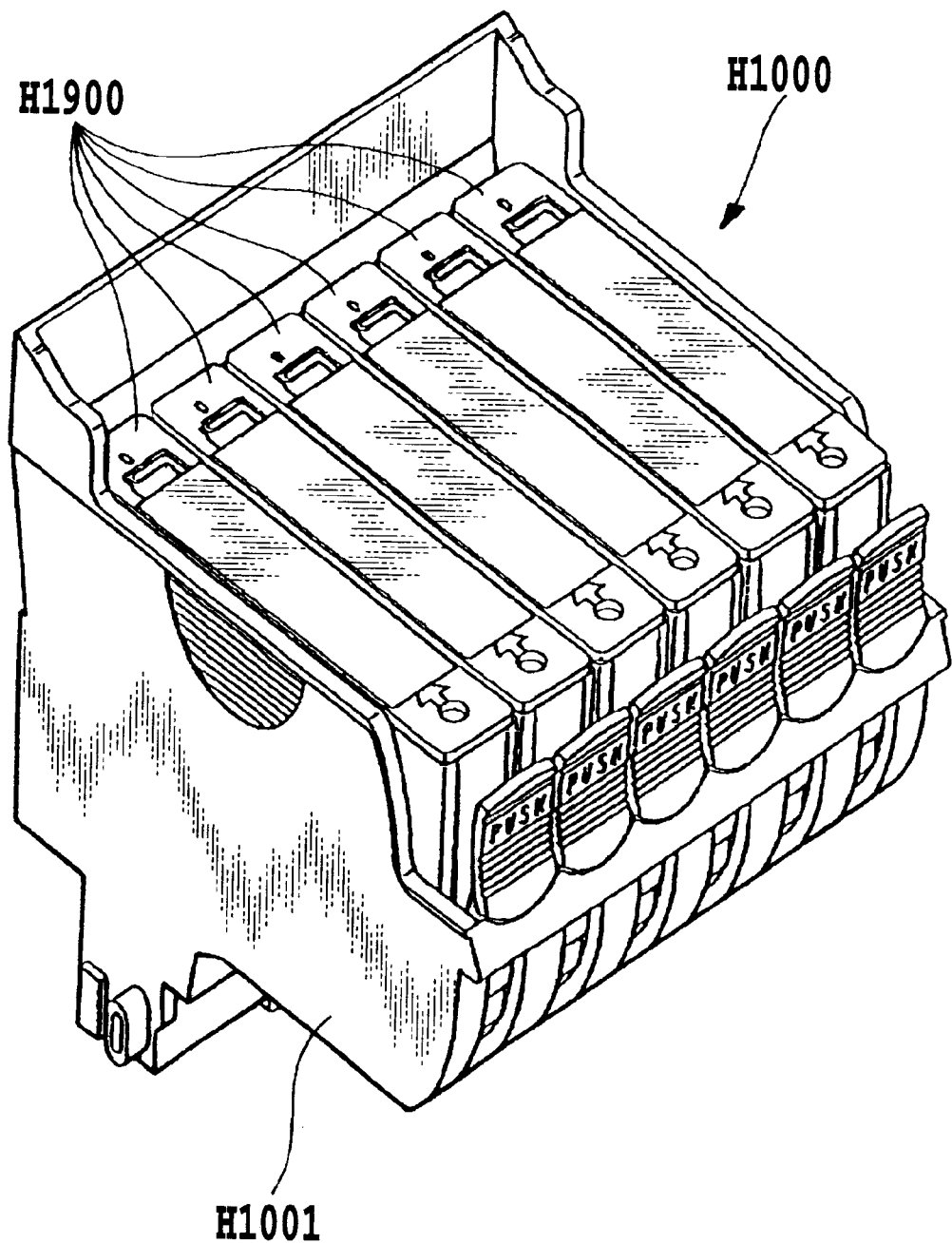
FIG. 3 is a perspective view showing an assembled print head cartridge used in the printer of one embodiment of the present invention.
Figure 4:
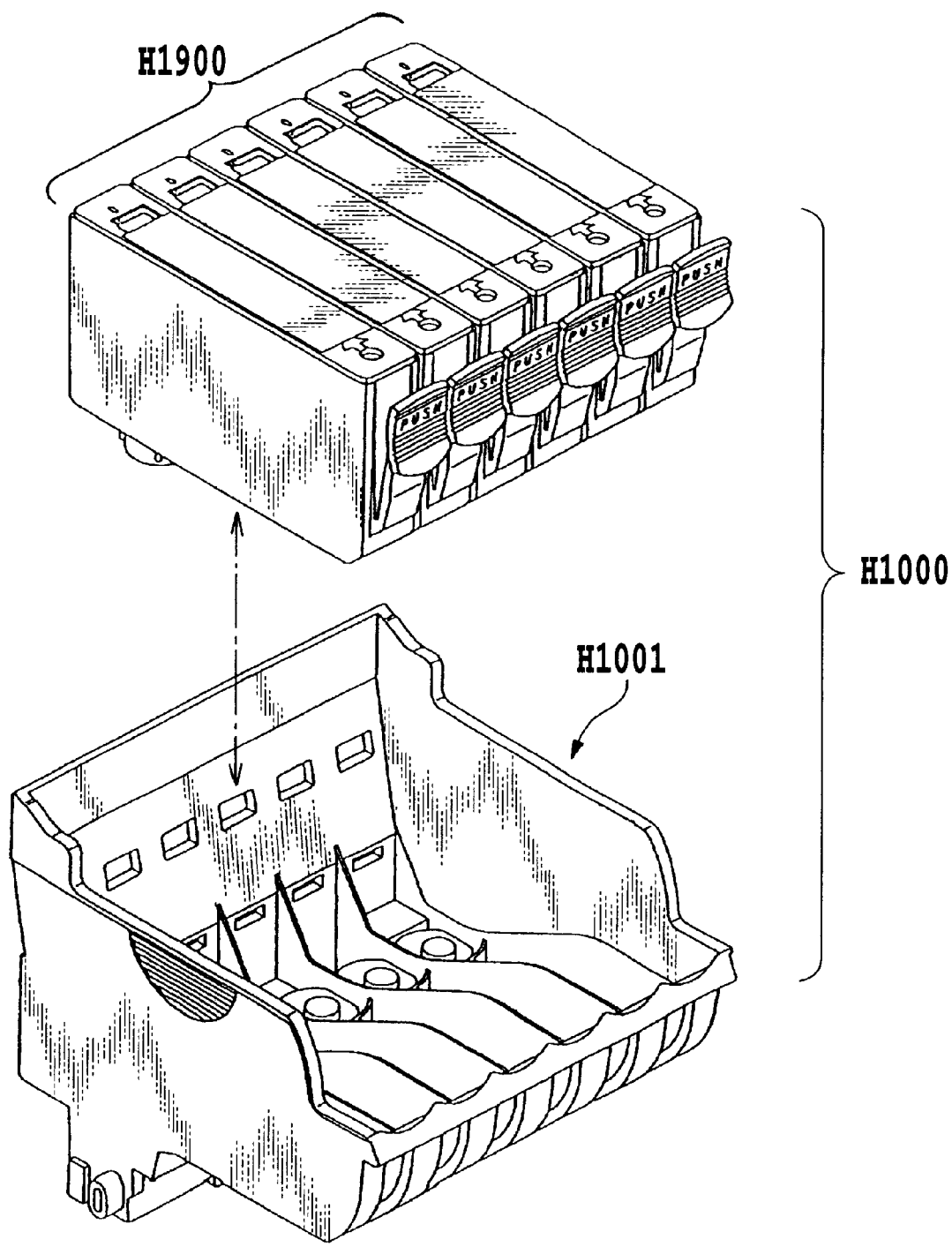
FIG. 4 is an exploded perspective view showing the print head cartridge of FIG. 3.

The print head cartridge H1000 in this embodiment, as shown in FIG. 3, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as photograph. As shown in FIG. 4, these individual ink tanks are removably mounted to the print head H1001.

Figure 5:
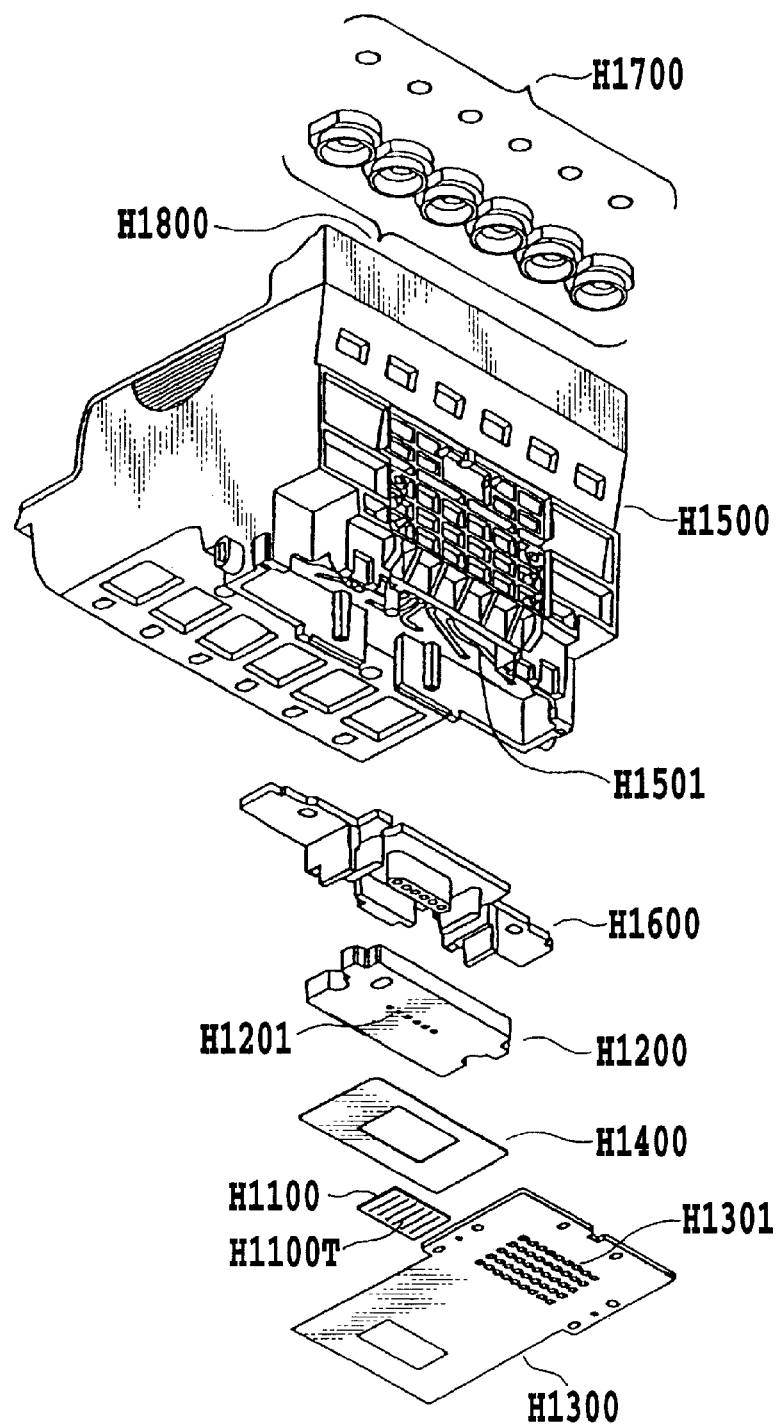
FIG. 5 is an exploded perspective view of the print head of FIG. 4 as seen diagonally below.

Then, the print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink and electric wires, such as aluminum, for supplying electricity to individual print elements. A plurality of ink passages and a plurality of nozzles H1100T, both corresponding to the print elements, are also formed by the photolithography technology. In the back of the print element substrate H1100, there are formed ink supply ports for supplying ink to the plurality of ink passages. The print element substrate H1100 is securely bonded to the first plate H1200 which is formed with ink supply ports H1201 for supplying ink to the print element substrate H1100. The first plate H1200 is securely bonded with the second plate H1400 having an opening. The second plate H1400 holds the electric wiring board H1300 to electrically connect the electric wiring board H1300 with the print element substrate H1100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals H1301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank side end of the ink passage H1501 that engages with the ink tank H1900, a filter H1700 is provided to prevent external dust from entering. A seal rubber H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the seal rubber H1800, and the print element unit, which includes the print element substrate H1100, the first plate H1200, the electric wiring board H1300 and the second plate H1400, are combined as by adhesives to form the print head H1001.

2.2 Carriage

Next, by referring to FIG. 2, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to set the print head H1001 at a predetermined mounting position.

That is, the head set lever M4007 is provided at the upper part of the carriage M4001 so as to be pivotable about a head set lever shaft. There is a spring-loaded head set plate (not shown) at an engagement portion where the carriage M4001 engages the print head H1001. With the spring force, the head set lever M4007 presses against the print head H1001 to mount it on the carriage M4001.

At another engagement portion of the carriage M4001 with the print head H1001, there is provided a contact flexible printed cable (see FIG. 7: simply referred to as a contact FPC hereinafter) E0011 whose contact portion electrically contacts a contact portion (external signal input terminals) H1301 provided in the print head H1001 to transfer various information for printing and supply electricity to the print head H1001.

Between the contract portion of the contact FPC E0011 and the carriage M4001 there is an elastic member not shown, such as rubber. The elastic force of the elastic member and the pressing force of the head set lever spring combine to ensure a reliable contact between the contact portion of the contact FPC E0011 and the carriage M4001. Further, the contact FPC E0011 is connected to a carriage substrate E0013 mounted at the back of the carriage M4001 (see FIG. 7).

3. Scanner

The printer of this embodiment can mount a scanner in the carriage M4001 in place of the print head cartridge H1000 and be used as a reading device.

The scanner moves together with the carriage M4001 in the main scan direction, and reads an image on a document fed instead of the printing medium as the scanner moves in the main scan direction. Alternating the scanner reading operation in the main scan direction and the document feed in the sub-scan direction enables one page of document image information to be read.

Figure 6B:
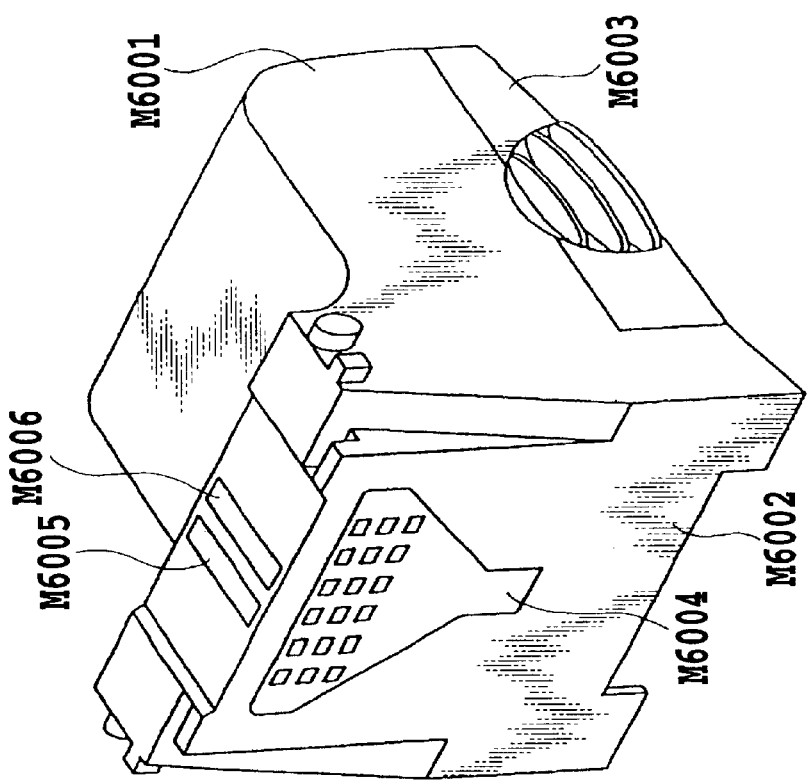
FIGS. 6A and 6B are perspective views showing a construction of a scanner cartridge upside down which can be mounted in the printer of one embodiment of the present invention instead of the print head cartridge of FIG. 3.
Figure 6A:
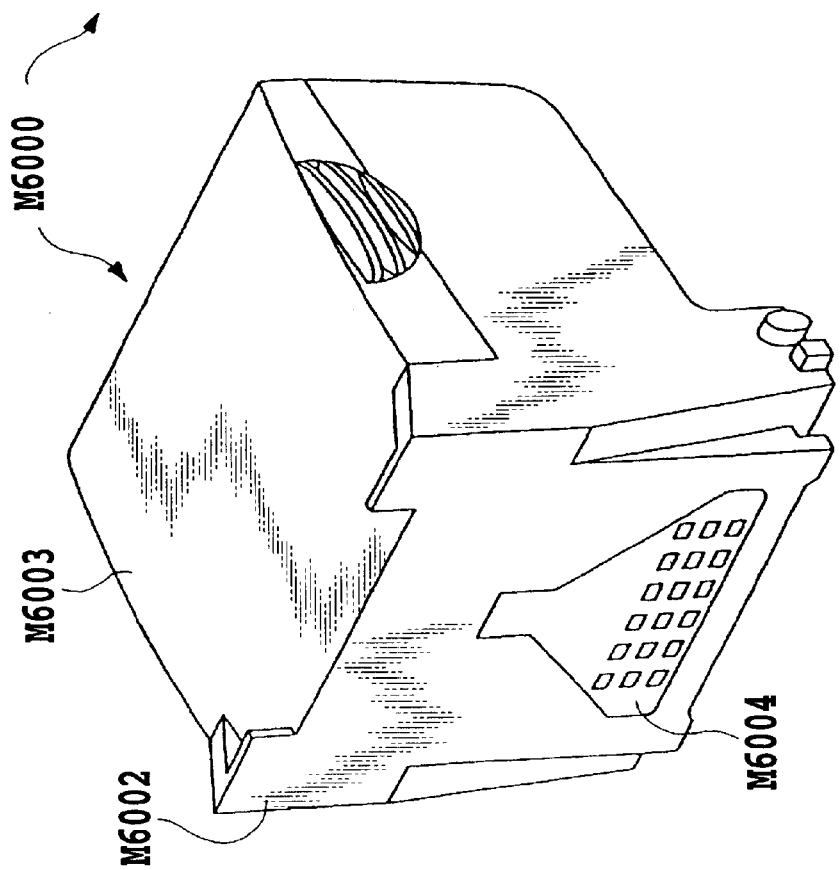

FIGS. 6A and 6B show the scanner M6000 upside down to explain about its outline construction.

As shown in the figure, a scanner holder M6001 is shaped like a box and contains an optical system and a processing circuit necessary for reading. A reading lens M6006 is provided at a portion that faces the surface of a document when the scanner M6000 is mounted on the carriage M4001. The lens M6006 focuses light reflected from the document surface onto a reading unit inside the scanner to read the document image. An illumination lens M6005 has a light source not shown inside the scanner. The light emitted from the light source is radiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the scanner M6000 is mounted on the carriage M4001, the scanner contact PCB M6004 contacts the contact FPC E0011 of the carriage M4001 to electrically connect the substrate to a control system on the printer body side through the carriage M4001.

4. Example Configuration of Printer Electric Circuit

Next, an electric circuit configuration in this embodiment of the invention will be explained.

Figure 7:
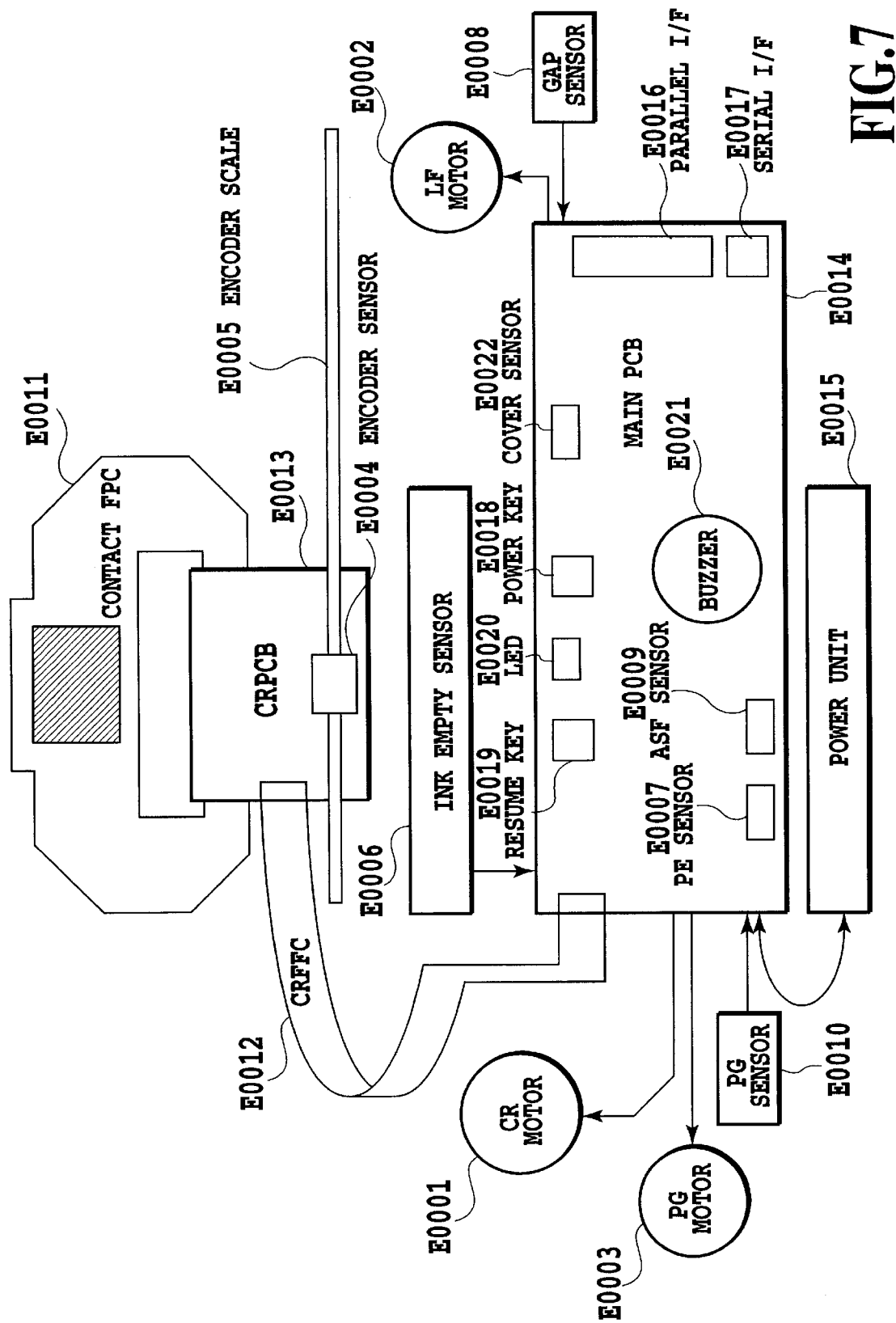
FIG. 7 is a block diagram schematically showing the overall configuration of an electric circuitry of the printer according to one embodiment of the present invention.

FIG. 7 schematically shows the overall configuration of the electric circuit in this embodiment.

The electric circuit in this embodiment comprises mainly a carriage substrate (CRPCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 as the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCB E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F) E0017, a resume key E0019, an LED E0020, a power key E0018 and a buzzer E0021. The main PCB E0014 is connected to and controls a motor (CR motor) E0001 that constitutes a drive source for moving the carriage M4001 in the main scan direction; a motor (LF motor) E0002 that constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E0008, a PG sensor E0010, the CRFFC E0012 and the power supply unit E0015.

Figure 8B:
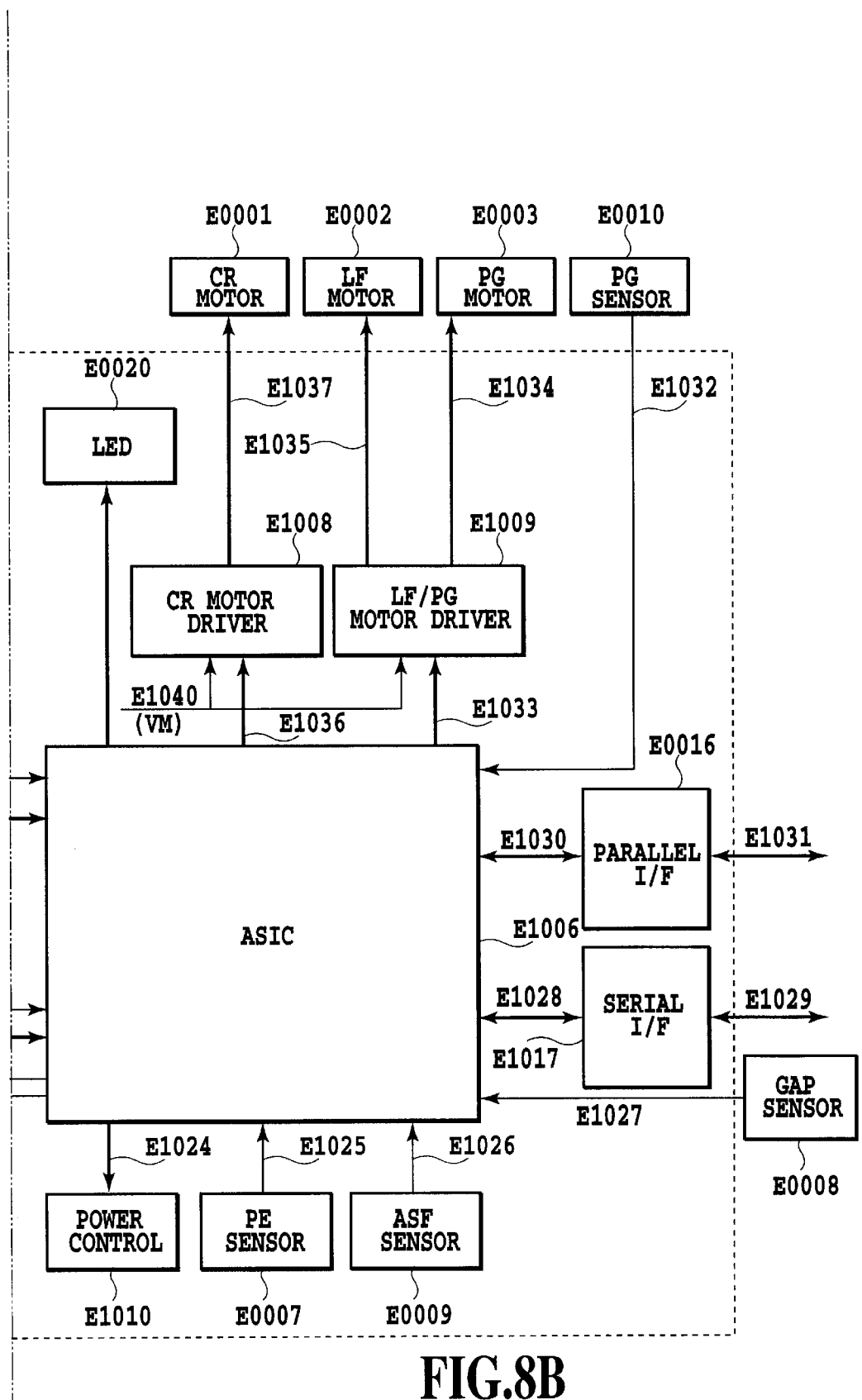

FIG. 8 is a diagram showing the relation between FIGS. 8A and 8B, and FIGS. 8A and 8B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus E1014. According to a program stored in the ROM E1004, the CPU E1001 controls the ASIC E1006, checks the status of an input signal E1017 from the power key, an input signal E1016 from the resume key, a cover detection signal E1042 and a head detection signal (HSENS) E1013, drives the buzzer E0021 according to a buzzer signal (BUZ) E1018, and checks the status of an ink empty detection signal (INKS) E1011 connected to a built-in A/D converter E1003 and of a temperature detection signal (TH) E1012 from a thermistor. The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

Designated E1010 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E1006. The serial I/F E0017 transfers a serial I/F signal E1028 from the ASIC E1006 to a serial I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by a circuit of the main PCB E0014 and then sent out to the flexible flat cable E0011 to be used for driving the print head cartridge H1000. E1007 denotes a reset circuit which detects a reduction in the logic power signal E1041 and sends a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition, the ASIC E1006 detects the status of a PE detection signal (PES) E1025 from the PE sensor E0007, an ASF detection signal (ASFS) E1026 from the ASF sensor E0009, a gap detection signal (GAPS) E1027 from the GAP sensor E0008 for detecting a gap between the print head and the printing medium, and a PG detection signal (PGS) E1032 from the PG sensor E0010, and sends data representing the statuses of these signals to the CPU E1001 through the control bus E1014. Based on the data received, the CPU E1001 controls the operation of an LED drive signal E1038 to turn on or off the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 9A:
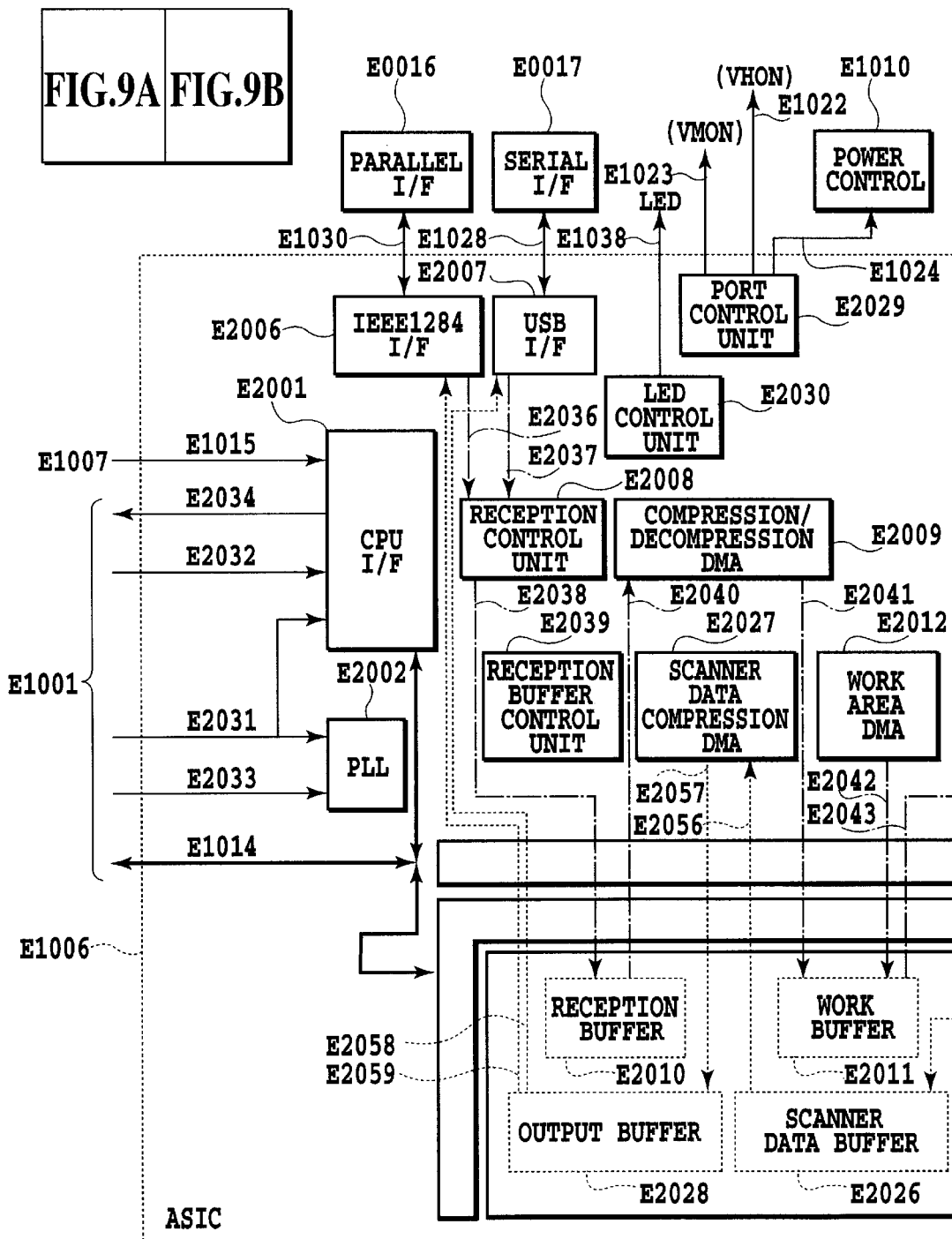
FIGS. 9A and 9B being block diagrams representing an example inner configuration of an application specific integrated circuit (ASIC) in the main PCB of FIGS. 8A and 8B.
Figure 9B:
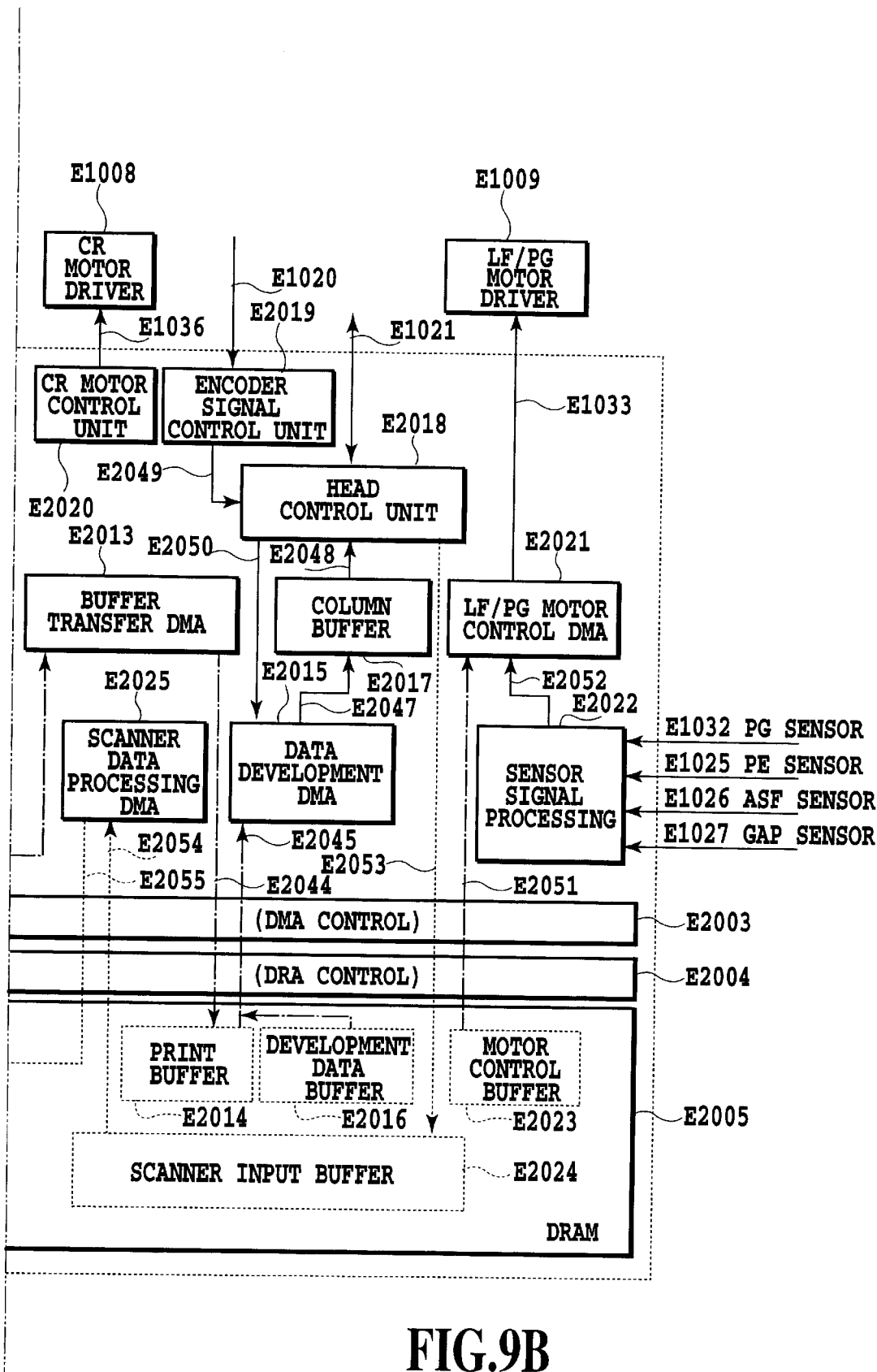

FIG. 9 is a diagram showing the relation between FIGS. 9A and 9B, and FIGS. 9A and 9B are block diagrams showing an example internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001, generates a clock (not shown) to be supplied to the most part of the ASIC E1006.

Denoted E2001 is a CPU interface (CPU I/F) E2001, which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 then outputs an interrupt signal (INT) E2034 to the CPU E1001 to inform it of the occurrence of an interrupt within the ASIC E1006.

E2005 denotes a DRAM which has various areas for storing print data, such as a reception buffer E2010, a work buffer E2011, a print buffer E2014 and a development data buffer E2016. The DRAM E2005 also has a motor control buffer E2023 for motor control and, as buffers used instead of the above print data buffers during the scanner operation mode, a scanner input buffer E2024, a scanner data buffer E2026 and an output buffer E2028.

The DRAM E2005 is also used as a work area by the CPU E1001 for its own operation. Designated E2004 is a DRAM control unit E2004 which performs read/write operations on the DRAM E2005 by switching between the DRAM access from the CPU E1001 through the control bus and the DRAM access from a DMA control unit E2003 described later.

The DMA control unit E2003 accepts request signals (not shown) from various blocks and outputs address signals and control signals (not shown) and, in the case of write operation, write data E2038, E2041, E2044, E2053, E2055, E2057 etc. to the DRAM control unit to make DRAM accesses. In the case of read operation, the DMA control unit E2003 transfers the read data E2040, E2043, E2045, E2051, E2054, E2056, E2058, E2059 from the DRAM control unit E2004 to the requesting blocks.

Denoted E2006 is an IEEE 1284 I/F which functions as a bi-directional communication interface with external host devices, not shown, through the parallel I/F E0016 and is controlled by the CPU E1001 via CPU I/F E2001. During the printing operation, the IEEE 1284 I/F E2006 transfers the receive data (PIF receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2028 in the DRAM E2005 to the parallel I/F E0016 by the DMA processing.

Designated E2007 is a universal serial bus (USB) I/F which offers a bi-directional communication interface with external host devices, not shown, through the serial I/F E0017 and is controlled by the CPU E1001 through the CPU I/F E2001. During the printing operation, the universal serial bus (USB) I/F E2007 transfers received data (USB receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 in the DRAM E2005 to the serial I/F E0017 by the DMA processing. The reception control unit E2008 writes data (WDIF E2038) received from the 1284 I/F E2006 or universal serial bus (USB) I/F E2007, whichever is selected, into a reception buffer write address managed by a reception buffer control unit E2039.

Designated E2009 is a compression/decompression DMA controller which is controlled by the CPU E1001 through the CPU I/F E2001 to read received data (raster data) stored in a reception buffer E2010 from a reception buffer read address managed by the reception buffer control unit E2039, compress or decompress the data (RDWK) E2040 according to a specified mode, and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP E2044). Reference number E2012 denotes a work area DMA controller which is controlled by the CPU E1001 through the CPU I/F E2001 to repetitively write specified work fill data (WDWF) E2042 into the area of the work buffer whose data transfer by the print buffer transfer DMA controller E2013 has been completed.

Designated E2015 is a print data development DMA controller E2015, which is controlled by the CPU E1001 through the CPU I/F E2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 as the head control signal E1021.

In the scanner reading mode, the head control unit E2018 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2005.

Designated E2027 is a scanner data compression DMA controller which is controlled by the CPU E1001 through the CPU I/F E2001 to read processed data (RDYC) E2056 on the scanner data buffer E2026, perform data compression, and write the compressed data (WDYC) E2057 into the output buffer E2028 for transfer.

Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1001. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers these sensor information to the CPU E1001 according to the mode determined by the CPU E1001. The sensor signal processing unit E2022 also outputs a sensor detection signal E2052 to a DMA controller E2021 for controlling LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1001 through the CPU I/F E2001 to output the head power ON signal E1022, the motor power ON signal E1023 and the power supply control signal E1024.

5. Operation of Printer

Figure 10:
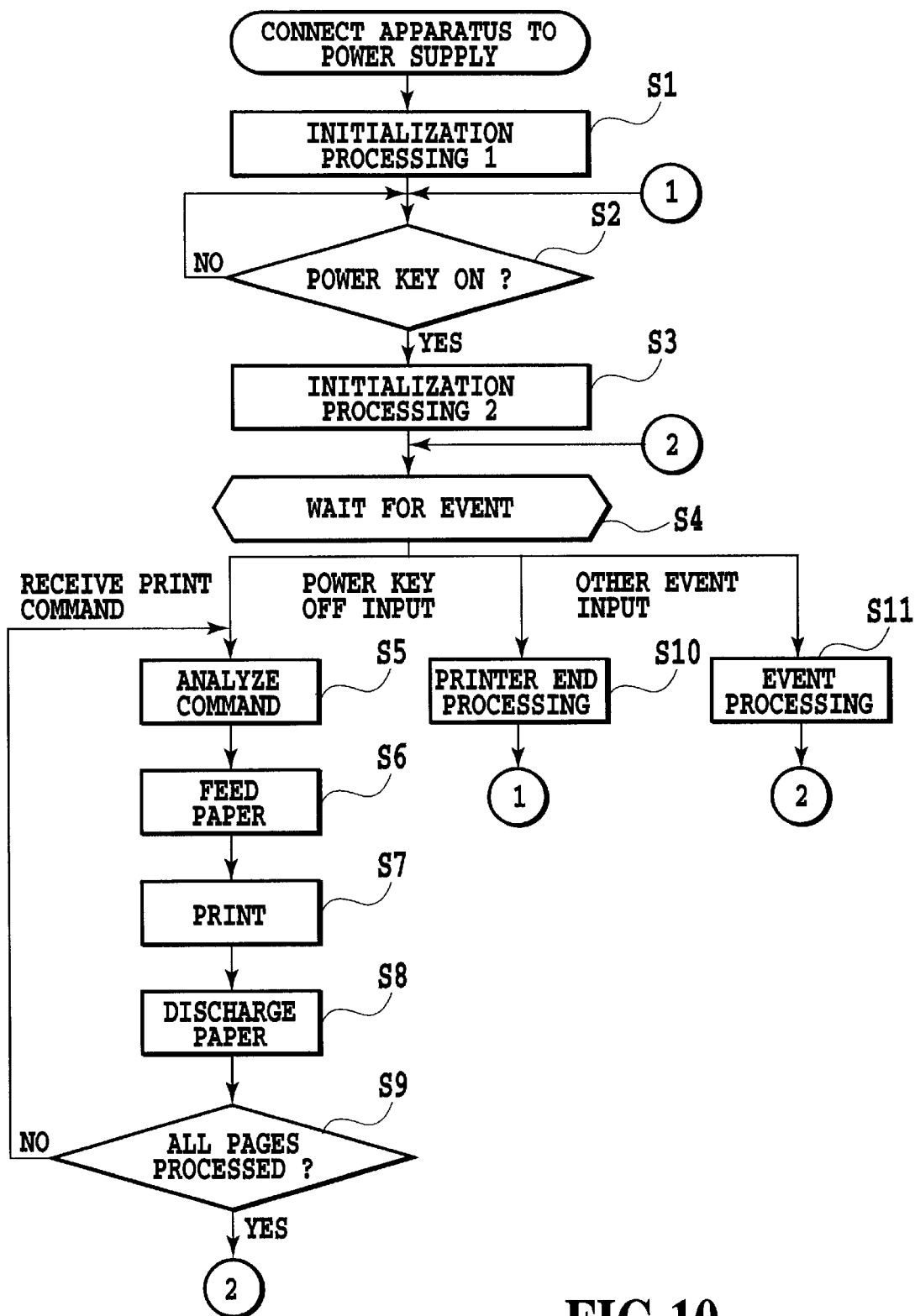
FIG. 10 is a flow chart showing an example of operation of the printer as one embodiment of the present invention.

Next, the operation of the ink jet printing apparatus in this embodiment of the invention with the above configuration will be explained by referring to the flow chart of FIG. 10.

When the printer body M1000 is connected to an AC power supply, a first initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, steps S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and others, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer. Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the sub-scanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn off various motors and print head, this step renders the apparatus ready to be cut off from power supply and then turns off power, before moving to step S4 waiting for the next event.

Step S11 performs other event processing. For example, this step performs processing corresponding to the ejection performance recovery command from various panel keys or external I/F and the ejection performance recovery event that occurs internally. After the recovery processing is finished, the printer operation moves to step S4 waiting for the next event.

6. Head Configuration

The construction and arrangement of nozzles in the print head H1001 used in this embodiment will be described.

Figure 11:
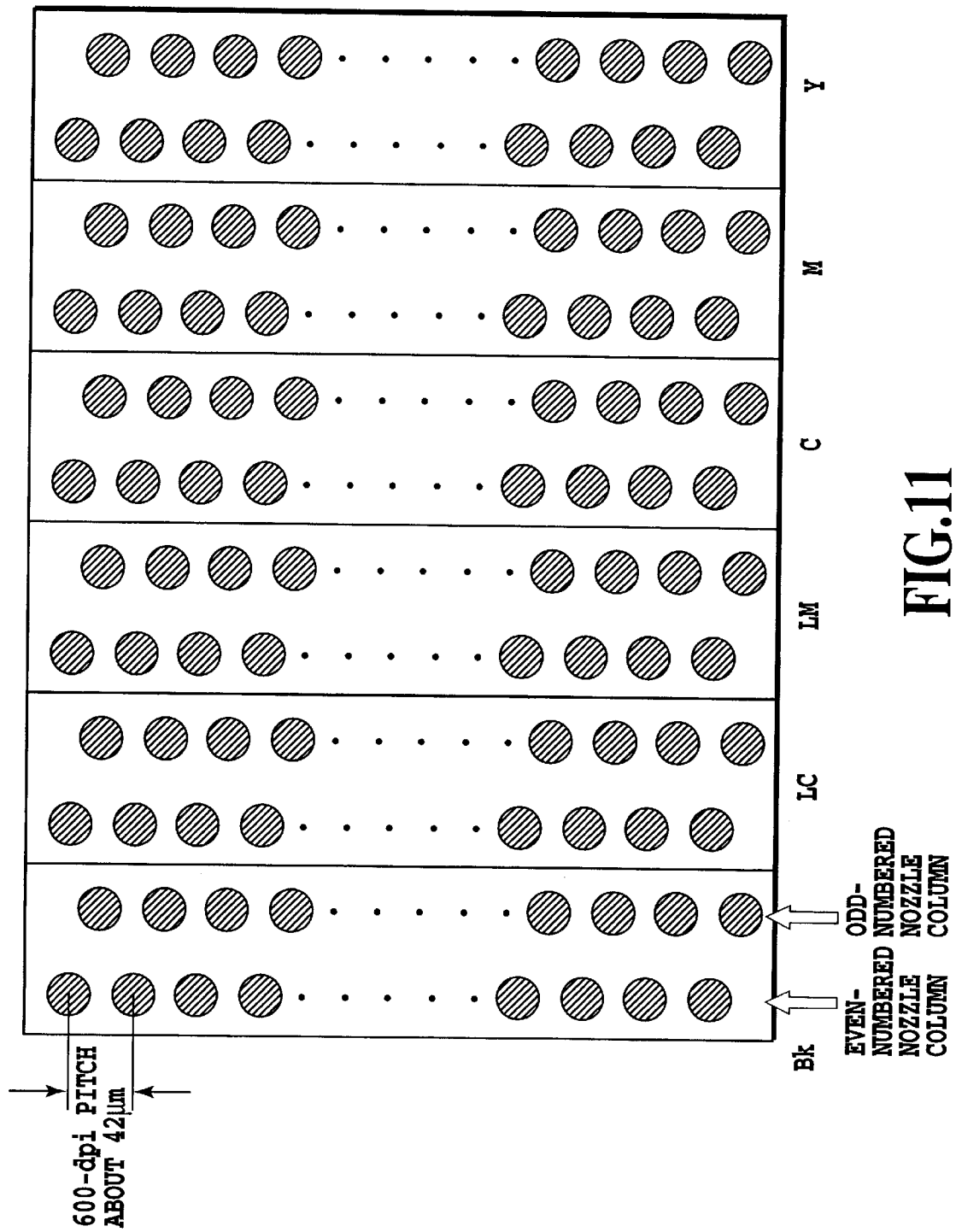
FIG. 11 is a schematic diagram showing an example of nozzle arrangement on the print head used in one embodiment of the present invention.

FIG. 11 is a schematic front view of the head used in this embodiment to realize high resolution printing. In this example, two parallel columns each having 128 nozzles are spaced from each other in the main scan direction (carriage scan direction) and staggered or shifted by about 21 $\mu$m from each other in the sub-scan direction (paper feed direction), with the 128 nozzles in each column arranged at a 600-DPI pitch (about 42 $\mu$m pitch). These two nozzle columns are used for each color and therefore a total of 256 nozzles are used to achieve a 1200 DPI resolution for each color. Further, in the example shown, the print head has 12 such nozzle columns integrally arranged side by side in the main scan direction to produce six colors with the 1200 DPI resolution. In the process of manufacture, the columns of two adjoining colors are fabricated simultaneously in one chip and then three such chips are bonded side by side. Hence, the nozzle columns of two adjoining colors in each chip (a set of black (Bk) and light cyan (LC), a set of light magenta (LM) and cyan (C) and a set of magenta (M) and yellow (Y)) have more similar driving conditions than other colors. With this construction, simply adjusting the ejection timings of the two adjoining colors can realize the 1200 DPI printing resolution.

In the case of the head with 1200 DPI resolution shown in FIG. 11, one pixel has an area 21 $\mu$m square on the paper, but one drop used in this embodiment has about 4 pl and forms a circular dot of about a 45 $\mu$m diameter on the paper. In this case, one dot has an area of 1570 $\mu m^2$, and this is much larger than the one pixel area of $21 \times 21 = 441$ $\mu m^2$.

7. Mask with Pseudo Periodical Data Arrangement

Now, a recording method using a mask with pseudo periodical data arrangement (the mask will be also referred as a 'pseudo periodical mask) which is a premise for achieving the intended object of the present invention, using recording apparatus and head of the configuration as mentioned above will be described. The recording method is the one that can be reflected during the recording operation (step S7) or others in the procedures of FIG. 10.

In the random mask method described in the aforementioned Japanese Patent Application Laid-open No. 7-52390 (1995), unevenness in density due to the ejection characteristics of the recording head, or unevenness in density provoked by the difference of recording dot number for each nozzle are solved by the random mask pattern; however, sometimes, a reiterative pattern has appeared in the output image by the cycle of the whole mask, or the granularity has increased by the low spatial frequency component of random digits, in case when the mask pattern of a predetermined size was applied reiteratively due to the limitation of memory capacity. Especially, in a bi-directional printing, the precision of landing position deviation in the forward and backward directions is severe, and even a slight deviation has sometimes generated a rough image or a periodical irregularity. The pseudo periodical mask described below can reduce the generation of reiterative pattern or the increase of granularity, and further, improve the image quality, compared to such random mask.

7.1 Construction of Ink Jet Printer for Applying the Pseudo Periodical Mask Now, an example of construction for applying a pseudo periodical mask will be described.

Figure 12:
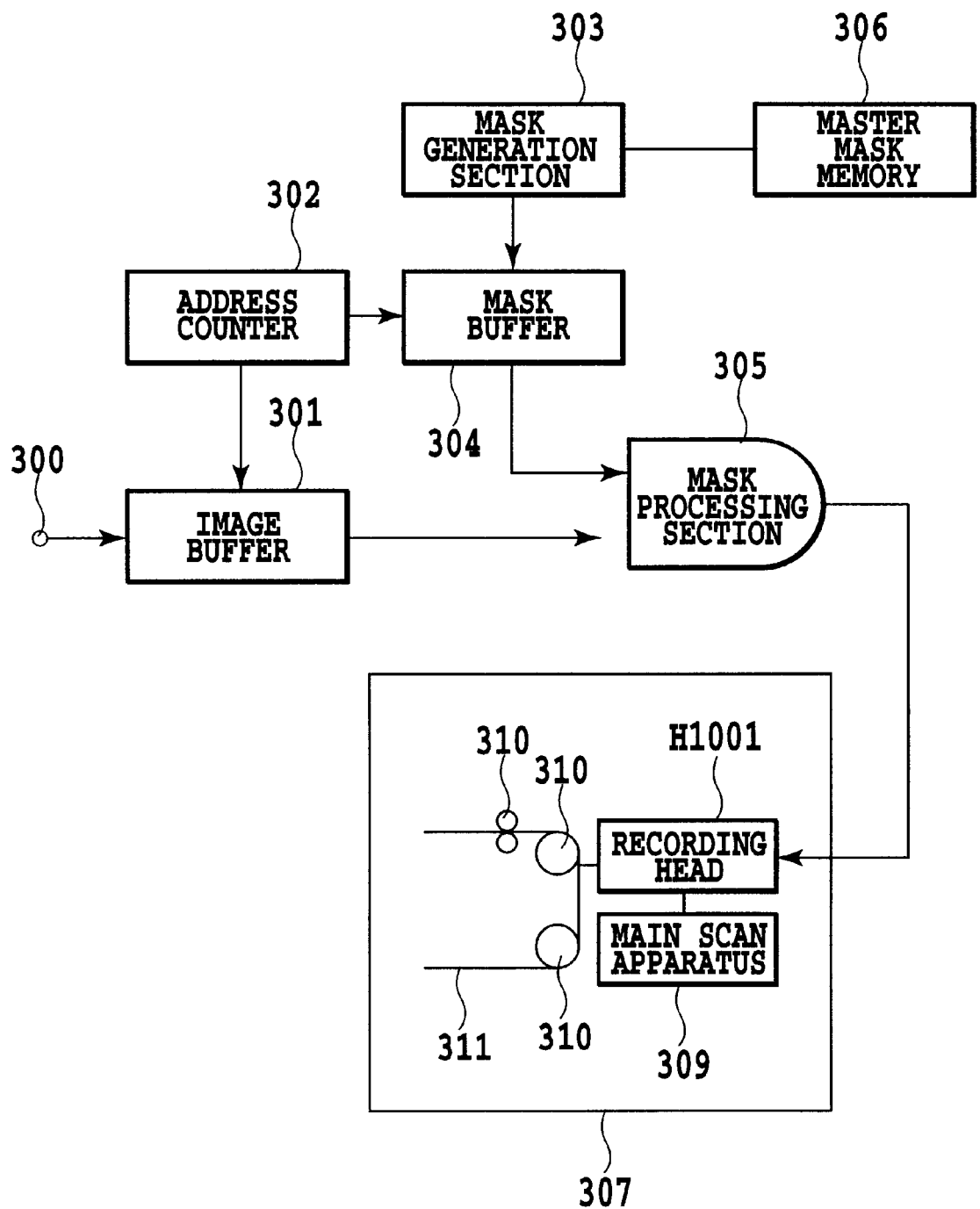
FIG. 12 is a diagram showing simply and schematically the ink jet printer for illustrating a construction for applying a mask with pseudo periodical data arrangement according to a first embodiment of the present invention.

FIG. 12 is a diagram showing simply and schematically the ink jet printer for illustrating a construction for applying a pseudo periodical mask according to this embodiment. The construction of the drawing comprises an image data input terminal 300, an image buffer 301, an address counter 302, a mask generation section 303 as mask generation means and thinning means, a mask buffer 304, a masking processing section 305, a master mask memory 306 including a ROM and a printer body 307.

Here, an image data, object of printing by the ink jet printer of this embodiment, is input in the image data input terminal 300. The image buffer 301 is a buffer for accumulating image data to be printed by a single scan (pass). The address counter 302 is a counter for synchronizing the image data with the mask data. The mask generation section 303 generate the mask data for thinning the image data. The mask buffer 304 is a buffer for storing the mask data. The masking processing section 305 generates head driving signals from the image data and the mask data. The master mask memory 306 is a memory for storing master mask data generated previously by the other apparatus. These respective sections shown in FIG. 12 are represented functionally and, concretely, they can be installed as a part of an electric circuit construction shown in FIG. 7 to FIG. 9. For example, the image buffer 301 may be the one corresponding to the print buffer E2014.

The printer body 307 is the one for forming an image on a recording medium according to the head driving signal and, concretely, is the one comprising the mechanical configuration shown in FIG. 1 to FIG. 6. That is, it includes a main scanning apparatus 309 containing the carriage M4001 or others for main scanning the recording head H1001 or the recording head cartridge H1000 in respect to a recording medium 311, and a transport apparatus 310 having rollers of respective section for conveying the recording medium 311 in the sub scan direction, and forms an image on the recording medium 311, by performing relative main scanning and sub scanning of the recording head H1001 in respect to the recording medium 311 by these apparatuses. Here, the recording head H1001 includes a plurality of print elements (nozzles), and an image is formed by 256 nozzles for respective colors as mentioned above: however, in order to simplify the explanation of the pseudo periodical mask, it is supposed that a recording head arranging 16 nozzles for one color in a single column in the sub scanning direction is used, and an image is completed by 4-pass printing.

FIGS. 13A to 13C, FIGS. 14A to 14C, FIGS. 15A to 15C and FIGS. 16A to 16C are diagrams for describing procedures for generating recording head control signals from the image buffer 301 and the mask buffer 304 by the masking processing section 305. In these drawings, each of FIGS. 13A to 16A the section of (a) represents the structure and the contents of the image buffer 301. The image buffer 301 of this embodiment corresponds, in the transversal direction, to as much pixels as pixels that can be printed in the main scan direction of the recording medium 311, and corresponds, in the longitudinal direction, to as much pixels as nozzles in the sub scan direction of the recording head H1001. That is, though the number of pixels in the transversal direction (main scan direction) is 16 pixels to simplify the description, in the example of FIG. 13 to FIG. 16, the number of pixels in the transversal direction of a real image buffer 301 is 9600 pixels, for example, if the transversal width of the recordable area on the recording medium 311 is 8 inches (about 203.2 mm), and the resolution of the printer body 307 is 1200 DPI (dots/inch). For the size of the mask buffer 304 also, similarly as the image buffer 301, 16 pixels are supposed in the transversal direction, and 16 pixels in the longitudinal direction equally to the recording elements of the recording head in this description.

Besides, in FIGS. 13A to 16C, each square corresponds to a pixel, and the white square of respective FIGS. 13A to 16A corresponding to the image data represents an non-recording pixel, while the black square represents a recording pixel. In addition, the white square of respective FIGS. 13B to 16B corresponding to the mask pattern represents a pixel for prohibiting the recording (namely, pixel for masking independently of the image data of that pixel, called record prohibiting pixel hereinafter), while the black square represents a pixel for permitting the recording (namely, pixel where a dot is formed according to the image data of that pixel, called record permitting pixel hereinafter). Moreover, the white square of respective FIGS. 13C to 16C corresponding to the head driving signals represents a unrecorded pixel, while the black square represents a pixel where the recording is performed actually.

Figure 13A:
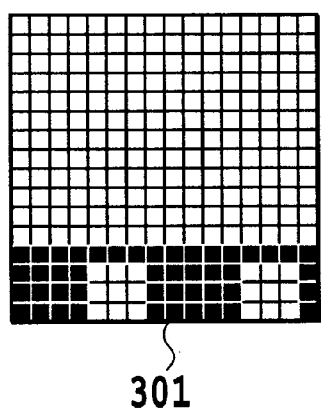
FIGS. 13A to 13C are diagrams for describing procedures for generating recording head control signals from the image buffer and the mask buffer by the masking processing section in FIG. 12, and illustrate the masking processing for generating the recording head control signals in a first scan (first pass)
Figure 13B:
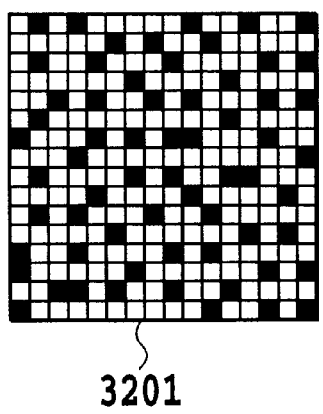
Figure 13C:
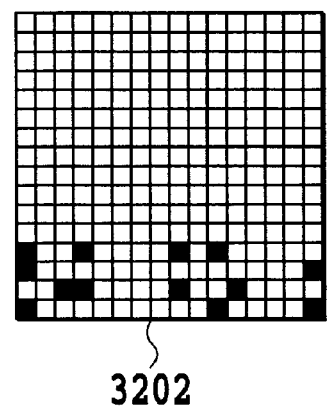

FIGS. 13A to 13C illustrate the masking processing for generating recording head control signals in the first scan. First, image data of four pixels from the top end of an input image is stored in an area of bottom four pixels of the image buffer 301 in the first scan (FIG. 13A). Next, the logical product of a first mask pattern 3201 (FIG. 13B) generated by the mask generation section 303 according to the procedures mentioned below and the image buffer 301 is determined for each pixel, for generating the head driving signals 3202 (FIG. 13C). That is, only the recording element is driven, which corresponds to a pixel in recording state in the image buffer 301 and to a pixel in recording state in the mask pattern 3201.

Figure 14A:
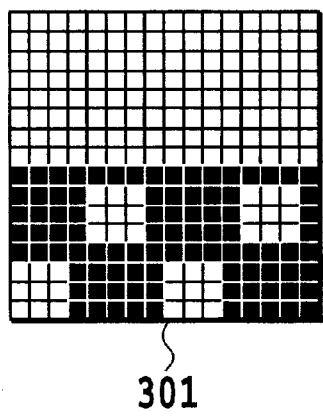
FIGS. 14A to 14C are diagrams for describing procedures for generating recording head control signals from the image buffer and the mask buffer by the masking processing section in FIG. 12, and illustrate the masking processing for generating the recording head control signals in a second scan (second pass)
Figure 14B:
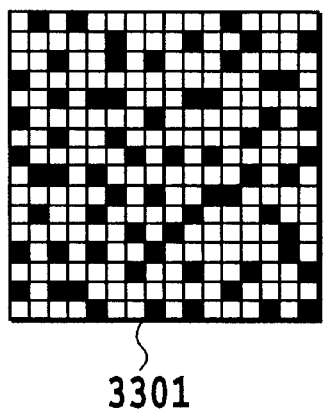
Figure 14C:
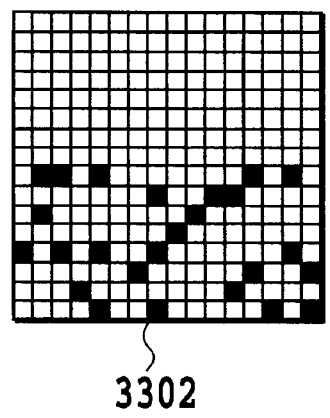

FIGS. 14A to 14C illustrate the masking processing for generating the recording head control signals in the second scan. After the completion of the first scan, the transport apparatus 310 of the printer body 307 feeds the paper by ¼ of the number of recording elements (that is, 16/4=4) of the recording head H1001 in this description. Consequently, the contents of the image buffer 301 shift upward as much, the following data is obtained from an image data input terminal 300 and stored in the image buffer 301 (FIG. 14A). Though the image data is represented as if moving, in FIG. 13A to FIG. 16C, for the convenience of explanation, the movement of image data in the buffer can by processed simply only by changing the designation contents of the address counter 302, if the image buffer 301 is configured as a ring buffer. Next, the AND operation of a second mask pattern 3301 (FIG. 14B) generated from the mask generation section 303 according to the procedures mentioned below and respective pixel of the image buffer 301 is performed, for generating the head driving signals 3302 (FIG. 14C).

Figure 15A:
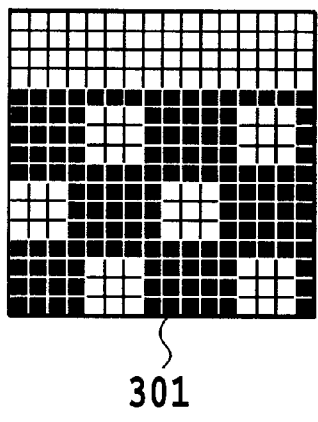
FIGS. 15A to 15C are diagrams for describing procedures for generating recording head control signals from the image buffer and the mask buffer by the masking processing section in FIG. 12, and illustrate the masking processing for generating the recording head control signals in a third scan (third pass)
Figure 15B:
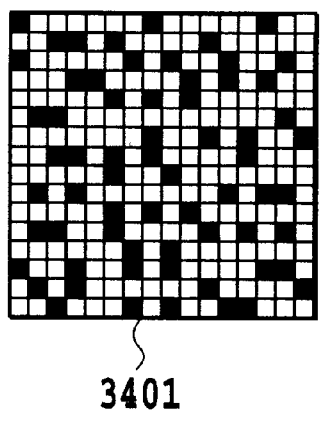
Figure 15C:
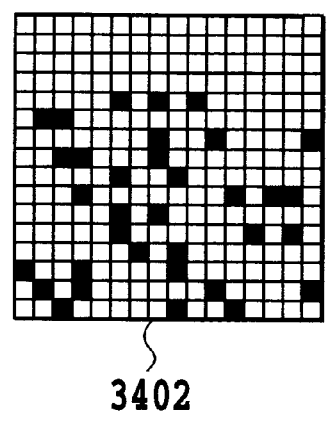

FIGS. 15A to 15C illustrate the masking processing for generating the recording head control signals in the third scan. After the completion of the second scan, the transport apparatus 310 of the printer body 307 feeds the paper by ¼ of the number of recording elements (that is, 16/4=4) of the recording head H1001 in this description. Consequently, the contents of the image buffer 301 shift upward as much, the following data is obtained from the image data input terminal 300 and stored in the image buffer 301 (FIG. 15A). Next, the AND operation of a third mask pattern 3401 (FIG. 15B) generated from the mask generation section 303 according to the procedures mentioned below and respective pixel of the image buffer 301 is performed, for generating the head driving signal 3402 (FIG. 15C).

Figure 16A:
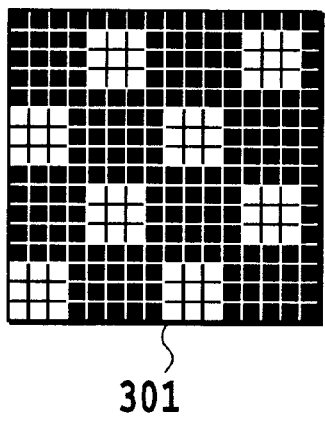
FIGS. 16A to 16C are diagrams for describing procedures for generating recording head control signal from the image buffer and the mask buffer by the masking processing section in FIG. 12, and illustrate the masking processing for generating the recording head control signals in a fourth scan (fourth pass)
Figure 16B:
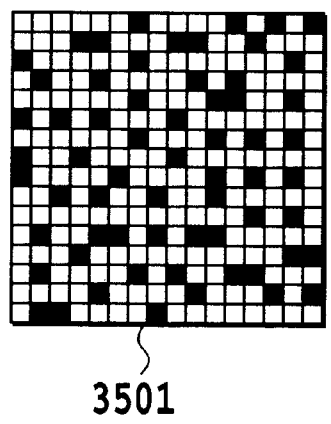
Figure 16C:
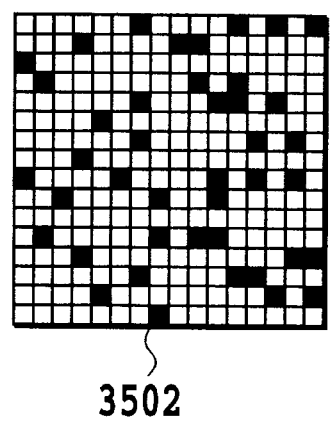

FIGS. 16A to 16C illustrate the masking processing for generating the recording head control signals in the fourth scan. After the completion of the third, the transport apparatus 310 of the printer body 307 feeds the paper by ¼ of the number of recording elements (that is, 16/4=4) of the recording head H1001 in this description. Consequently, the contents of the image buffer 301 shift upward as much, the following data is obtained from the image data input terminal 300 and stored in the image buffer 301 (FIG. 16A). Next, the AND operation of a fourth mask pattern 3501 (FIG. 16B) generated from the mask generation section 303 according to the procedures mentioned below and respective pixel of the image buffer 301 is performed, for generating the head driving signal 3502 (FIG. 16C).

An image for the portion correspond to the head top end section of one fourth of the total nozzle number is completed first, by the aforementioned four scans (45 passes). The print processing of the whole image is performed, by reiterating a similar processing thereafter.

It should be appreciated that, in the fifth scan, as the printing of the image top end section is completed, the data of image data top end portion can be discarded, and data of the following pixels may be stored in a newly created vacant area.

7.2 Generation of Pseudo Periodical Mask

This embodiment uses a pseudo periodical mask having less low frequency component and presenting a high dispersion as mask pattern for thinning recording data in each pass, in place of the random mask pattern as described in Japanese Patent Application Laid-open No. 7-52390 (1995). Such a pseudo periodical mask pattern will be described, with the generation technique thereof.

First, as a first example of the generation technique, a processing wherein a master mask as a reference for generating a pseudo periodical mask is established and the pseudo periodical mask is generated by expanding this master mask, will be described.

Figure 17:
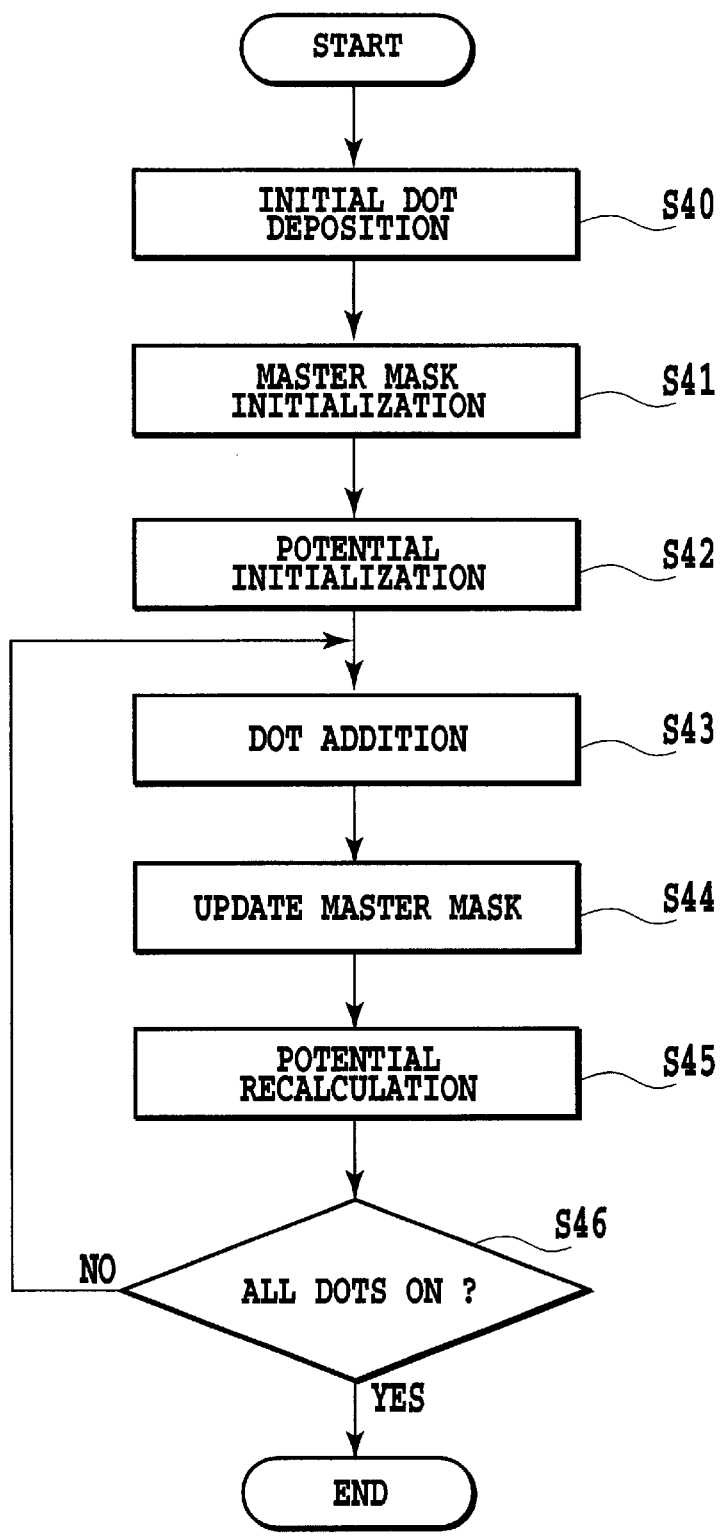
FIG. 17 is a flow chart showing an example of establishment procedures of master mask data in one embodiment of the present invention.

FIG. 17 shows an example of establishment procedures of the master mask. It is supposed that the size of the master mask or mask area has dimensions of 16 pixels respectively in the longitudinal direction (sub scan direction) and the transversal direction (main scan direction).

First, in an area of 16×16=256 pixels of the master mask, a first dot position is determined at random (step S40). Here, the first dot position is supposed to be (x0, y0). Next, data in the master mask are initialized (step S41). Here, the mask value of the first dot position (x0, y0) is supposed to be "254", and the other mask value "255". Next, the potential is initialized (step S42). The potential is given for example by the following function f(r) for a distance r from the dot position.

$$f(r) = -0.41r + 1.21 (r<2)$$

$$f(r) = 2.76 exp(-r) (2 \leq r < 10)$$

$$f(r) = 0 (r \geq 10) \quad (1)$$

As the distance r from the dot position (x0, y0) to an arbitrary position (x, y) is expressed by:

$$r = \{(x-x0)^2 + (y-y0)^2\}^{1/2}$$

the potential P (x, y) for the arbitrary mask position (x, y) by the dot position (x0, y0) may be determined by applying the function of the expression (1), for instance, in a range of:

$$x0-10<x<x0+10, y0-10<y<y0+10$$

Figure 18:
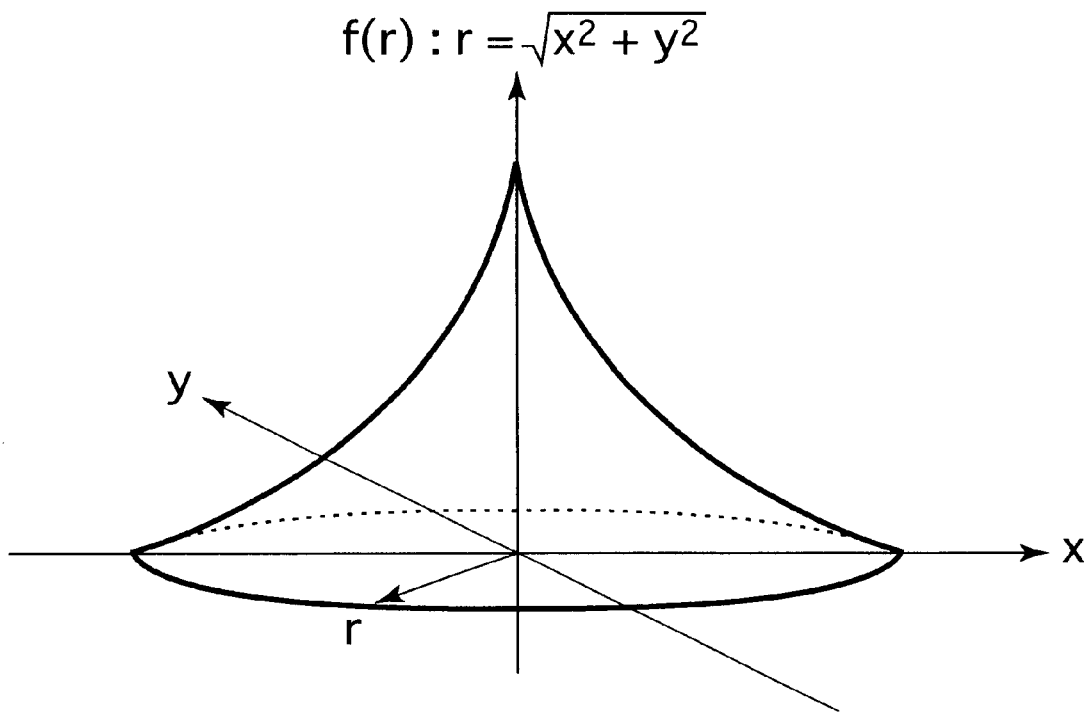
FIG. 18 shows an example of potential for the mask position applied for the establishment of master mask data.
Figure 19:
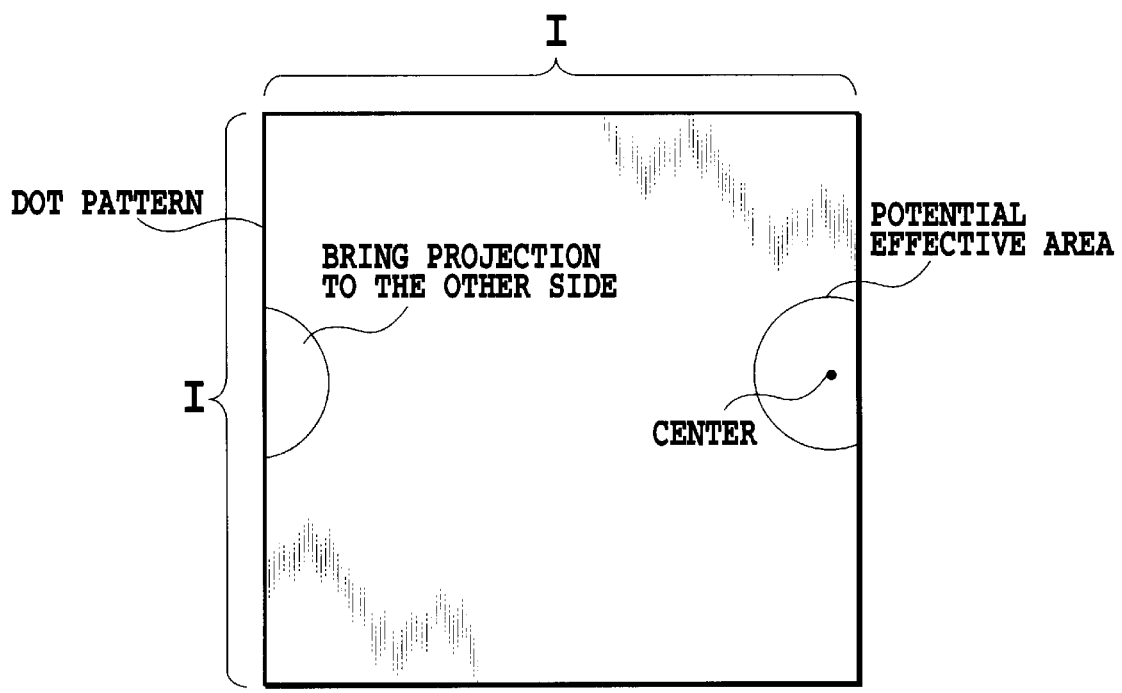
FIG. 19 is an illustrative drawing showing a computation method in case where the potential edge exceeds the area of mask.

FIG. 18 shows an example of potential shape. Such potential is of the repulsion type, and new dots are prevented from being arranged near already arranged dots, by applying an repulsion type potential to the following dot arrangement processing. Here, if the potential edge exceeds the mask area, it is calculated by folding to the opposite side of the mask area as shown in FIG. 19. This is for preventing the generation of dot arrangement discontinuity at the mask boundary.

Next, a position of lowest potential is searched, on the master mask, and a dot is added to that position (step S43). If there are several positions having the minimum potential value, a position is selected as random. Next, the data in the master mask is updated, by reducing by one the mask value corresponding to the position of all already arranged dots, including newly arranged dot (step S44). Suppose the position of the dot added by the processing performed immediately after the start of these procedures be (x1, y1), its mask value is reduced from "255" to "254", and the mask value for the initially arranged dot position (x0, y0) results to be reduced from "254" to "253".

Next, the potential for an arbitrary position (x, y) by the newly added dot is computed, and added to the potential for the arbitrary position (x, y) by the already arranged dot position (step S45). That is, as the distance r from the new dot position (x1, y1) added at first to the arbitrary position (x, y) is expressed by:

$$r=\{(x-x1)^2+(y-y1)^2\}^{1/2}$$

similarly as before, the potential P (x, y) for the arbitrary position (x, y) by the dot position (x1, y1) is determined by applying the function of the expression (1), in a range of:

$$x1-10<x<x1+10, y1-10<y<y1+10$$

and this potential is added to the potential for the mask position (x, y) by the initially arranged dot position (x0, y0), immediately after the start of these procedures. Then, it is judged if dots are added to all positions on the master mask (step S46). Here, if the judgment is negative, it returns to the step S43, and a new dot is added to the position having the minimum value of the summed potential. Thereafter, the step S43, step S44 and step S45 are repeated until dots are added to all positions of the master mask.

In the state where these procedures are completed, mask values "0" to "255" are arranged in the master mask memory 360 of FIG. 12 in a evenly distributed state. Then, a visually agreeable pseudo periodical mask pattern can be generated, using data of this master mask.

Figure 20:
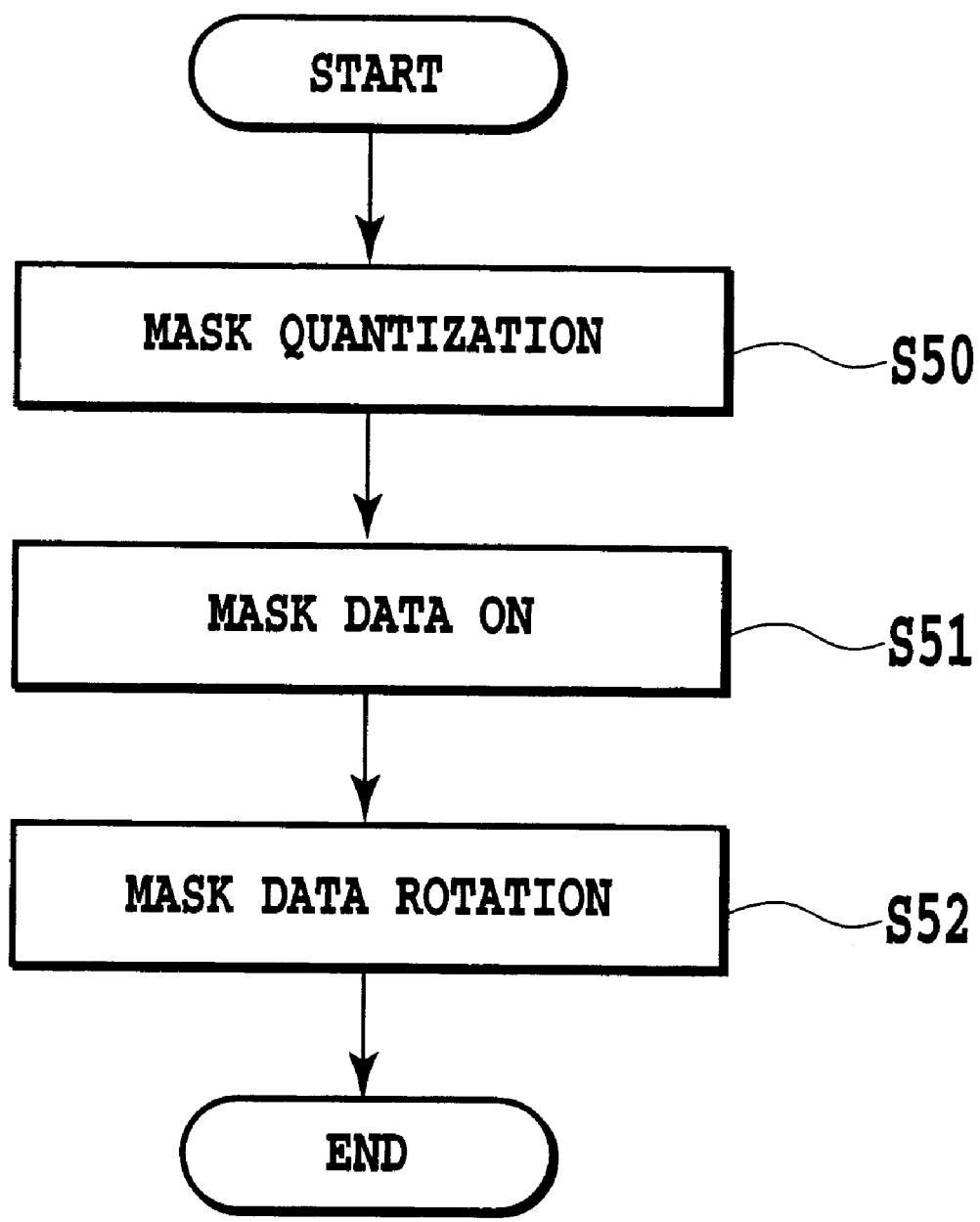
FIG. 20 is a flow chart showing an example of generation procedures of mask data to be stored in the mask buffer by the masking processing section of FIG. 14.

FIG. 20 shows an example of generation procedures of the aforementioned mask data (mask pattern) 3201, 3301, 3401 and 3501 to be stored in the mask buffer 304 by the masking processing section 303 of FIG. 12.

First, a master mask data having longitudinally 16 pixels and transversally 16 pixels and where respective mask value has a value from "0" to "255" is quantized according to the number of times of scan of the multi-pass (step S50). As this example is a multi-pass print by four times of scanning, and the number of record permitting pixel in respective recording scan is equalized, for four times of pass for a certain recording area, the mask values "0" to "63" are allocated to the first pass, the mask values "64" to "127" to the second pass, the mask values "128" to "191" to the third pass, and the mask values "192" to "255" to the fourth path.

Next, a processing for turning on the record permitting pixel of the mask data corresponding to respective scan (step S51). That is, the pixels of the positions allocated to the first pass of a certain recording area, on the first mask pattern 3201 are turned on, and the pixels of the positions allocated to the second pass of the recording area, on the second mask pattern 3301 are turned on. Similarly, the pixels of the positions allocated respectively to the third pass and the fourth pass of the recording area, on the third mask pattern 3401 and the fourth mask pattern 3501 are turned on.

Then, the mask data is rotated, in correspondence to the printing medium transport amount between respective scans (step S52). Namely, data on the mask pattern 3301 is rotated upward by 4 pixels, data on the mask pattern 3401 upward by 8 pixels, and data on the mask pattern 3501 upward by 12 pixels.

In the embodiment mentioned above, as the mask generation section 303 is configured to generate a mask pattern from a pseudo periodical data arrangement presenting a high dot dispersion making the arrangement of record permitting pixel and non record admitted pixel visually agreeable when binarized at an arbitrary level, as thinning pattern in the multi-pass printing method, the following functions and effects are expected. That is, in the aforementioned configuration, as the master mask data having pseudo periodical data arrangement has less low frequency component compared to the even random digits, it works to prevent the generation of repeated pattern or the increase of granularity. In other word, the generation of repeated pattern in case of using random digits of short cycle, and the increase of granularity in case of using a mask by the uniform random digits are prevented by using the master mask data of pseudo periodical data arrangement presenting a high dot dispersion.

It should be noted that means for generating master mask is not necessarily integrated previously in the printer of this embodiment, but the master mask data may be generated beforehand by a separate master mask generation apparatus, and only the resulting master mask data may be stored in the master mask memory 306 of the printer of this embodiment. It applies similarly to the embodiment mentioned below.

7.3 Another Example of Generation of Pseudo Periodical Mask

Though in the aforementioned embodiment, the master mask data with pseudo periodical data arrangement is established by using especially the aforementioned expression (1), the mask with pseudo periodical data arrangement applicable to the present invention is not limited to obtain from the aforementioned expression. In other word, the master mask with pseudo periodical arrangement is generated by reiterating the processings for determining at random the initial record permitting pixel position, affording a predetermined repulsive potential to all determined record permitting pixel positions, and setting a new record permitting pixel at a pixel position where the sum of the potentials becomes minimum, until all pixels become record permitting pixels. The repulsion potential may be expressed by a function attenuating according to the position from the record permitting pixel, and is not limited to the function indicated by the aforementioned expression (1).

In addition, in the aforementioned embodiment, the pseudo periodical mask applied to respective scan is generated upon establishment of the master mask data. This has an advantage of being able to cope immediately with the establishment of a mask according to the number of pass even when the number of pass of the multi-pass print is modified, once the master mask has been established.

On the other hand, a pseudo periodical mask applied to an area having a certain extension may be generated directly, and this embodiment shall be explained below. In this embodiment, a new mask shall be established according to the modification of the number of pass, and contribute to the throughput of the printing, because it is unnecessary to change the mask applied to respective scan (that is, respective four kinds shown in (b) of FIG. 13 to FIG. 16 are applied to the respective scan in case of 4-pass printing) as in the aforementioned embodiment.

Figure 22:
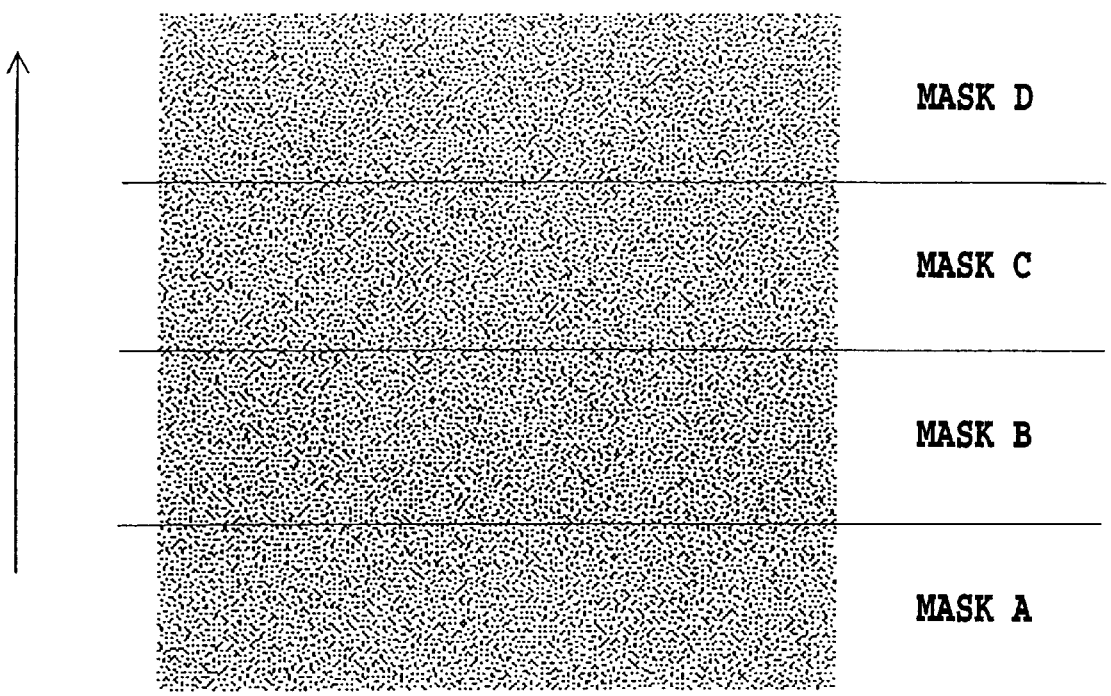
FIG. 22 shows a mask with pseudo periodical data arrangement established by the procedures of FIG. 21.

FIG. 22 shows an example of pseudo periodical mask to be applied to this embodiment, and the size of its mask area corresponds to a length of 256 pixels respectively in the longitudinal (sub scan) direction and the transversal (main scan) direction. The longitudinal length agrees with the number of nozzles on the head shown in FIG. 11, and the mask is fixed all the times in respect to the recording head. In addition, a four pass printing shall be executed, and the recording paper is transported in the arrow direction by a range (for 64 nozzles) divided by transversal lines in FIG. 22 between respective main scans.

For a same printing area on the paper face, the image of the area is always completed only when the recording is performed in the order of forward print to which a mask A is applied (first pass), backward print to which a mask B is applied (second pass), forward print to which a mask C is applied (third pass), and backward print to which a mask D is applied (fourth pass), passing through the four times of recoding scans. Besides, the mask A to the mask D are in a relation complementary to 100% of recording data, in case of this embodiment, each presents a recording rate of 25% respectively.

Here, the configuration of the control system for establishing or applying the mask of this embodiment may be approximately similar to the one shown in FIG. 12, and a functional block performing the following establishment processing or the like may be adopted, in place of blocks 303 and 306 in FIG. 12. In addition, in place of generating a mask for recording, a plurality of masks corresponding to the kinds of multi-pass printing generated previously by the printer of this embodiment or by a separate mask generation means (for example, host computer) may be stored, and a mask coping with the number of passes of the multi-pass printing to be executed may be selected conveniently for the recording. Further, it may also be composed to accept a mask corresponding to the designation of the number of passes when an image data is received from the host computer, and used for the recording.

Figure 21:
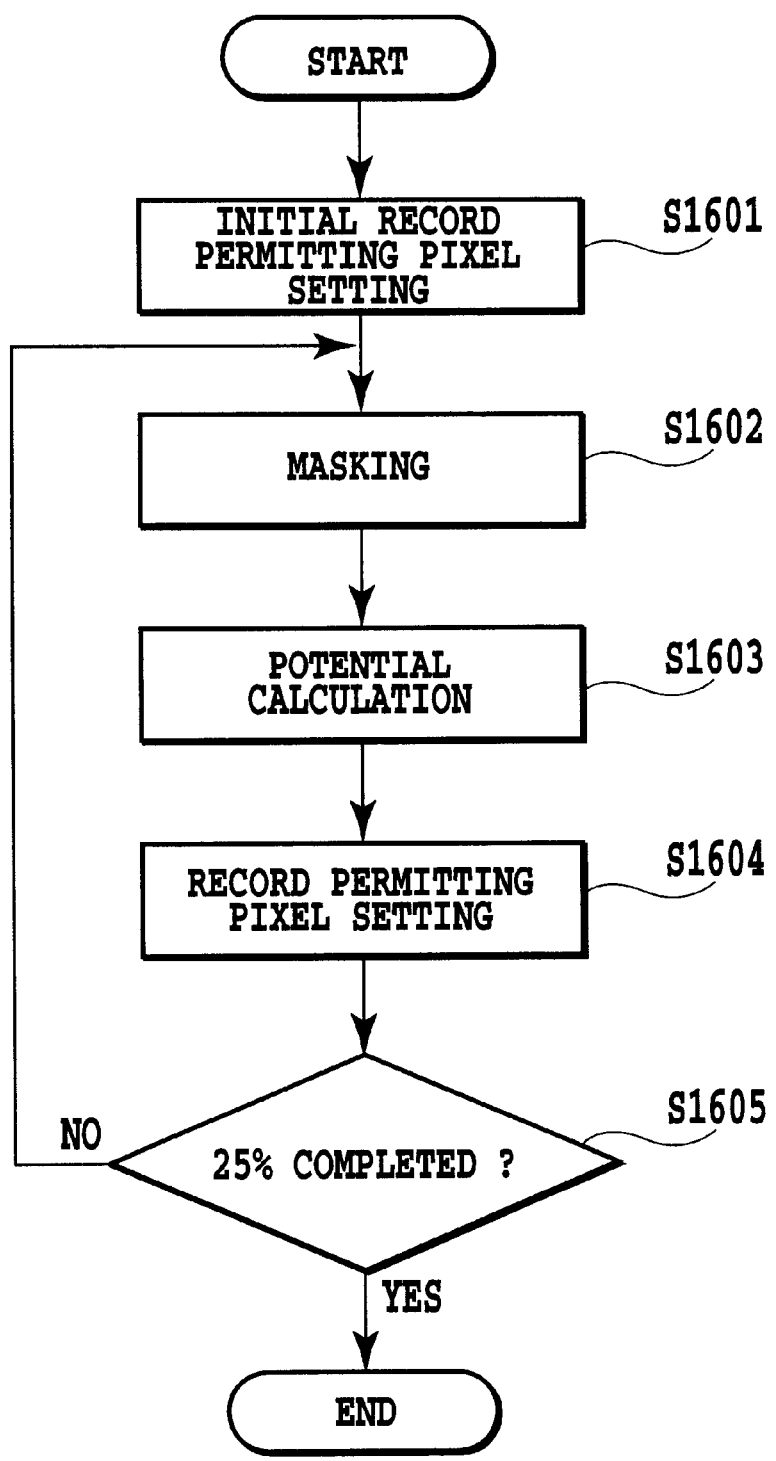
FIG. 21 is a flow chart showing an example of establishment procedures of mask data in another embodiment of the present invention.

FIG. 21 shows an example of mask data establishment procedures by this embodiment. First, an area of 64 pixels long×256 pixels wide in the upper most section, in the mask area D of 64 pixels long×256 pixels wide, is divided into 16 blocks each having a size of 64 pixels long×16 pixels wide. Then, a first record permitting pixel is respectively decided at random for each block (step S1601). These pixels are decided as the mask initial pixels of this embodiment. At the same time, pixels in the mask areas A, B and C corresponding to these initial pixels in terms of position are masked for preventing the dot formation (step S1602). Obviously, the number of initial pixels and the selected area are not limited to them, but they may be defined conveniently. From the following pixel, the record permitting pixel will be determined using the repulsive potential (step S1603). The potential to be defined in this embodiment may be given by the function indicated by the expression (1) similarly as the aforementioned example.

There, the sum of potentials obtained from a plurality of record permitting pixels (16 pixels immediately after the start of these procedures) becomes the potential of the remarked pixel. Further, as the mask of 256 pixels long×256 pixels wide is applied repeatedly in the longitudinal direction and the transversal direction, the sum of potentials is calculated considering the effect from adjacent areas (the lowermost section of the mask area A in respect to the top section of the mask area D, for example in the longitudinal direction). Among thus determined potentials of respective pixels, one having the minimum value is determined as the next record permitting pixel (seventeenth record permitting pixel immediately after the start of these procedures) (step S1604). Already masked pixels shall be excluded from this processing. Besides, in case where a plurality of pixels have the minimum value, a single record permitting pixel is decided at random among them.

Further, among the mask areas A to D, pixels of the corresponding positions in areas other than the area where this record permitting pixel exists are masked, and again, the potentials for all pixel positions are calculated. Thereafter, the processing of steps S1602 to S1604 is repeated until 25% of pixels of all mask areas become record permitting pixels (here, 16384 pixels) (step S1605).

Figure 23:
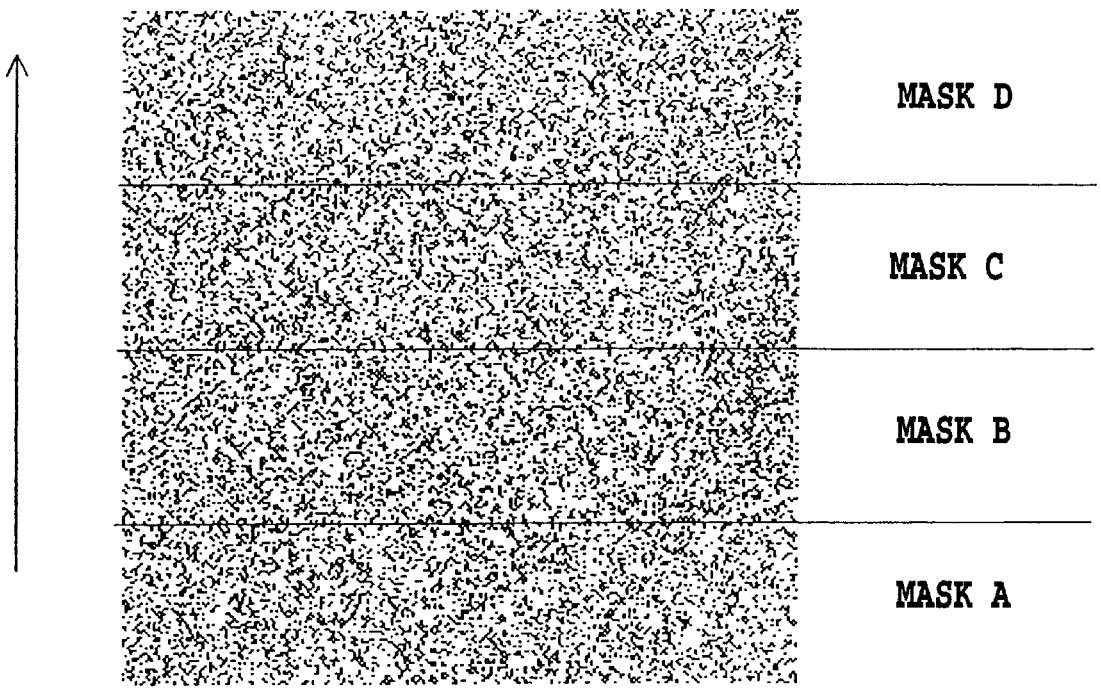
FIG. 23 shows a random mask as a comparative example of FIG. 22.

The mask established by such a processing is the one shown in FIG. 22. The comparison of the drawing with FIG. 23 showing a random mask based on the one disclosed in Japanese Patent Application Laid-open No. 7-052390 (1995) allows to confirm a visual difference. The difference of the both consists in the dot dispersion. That is, the mask of FIG. 22 has less low frequency component and a higher dispersion than the mask of FIG. 23. So, it impressed visually less granularity.

Figure 24:
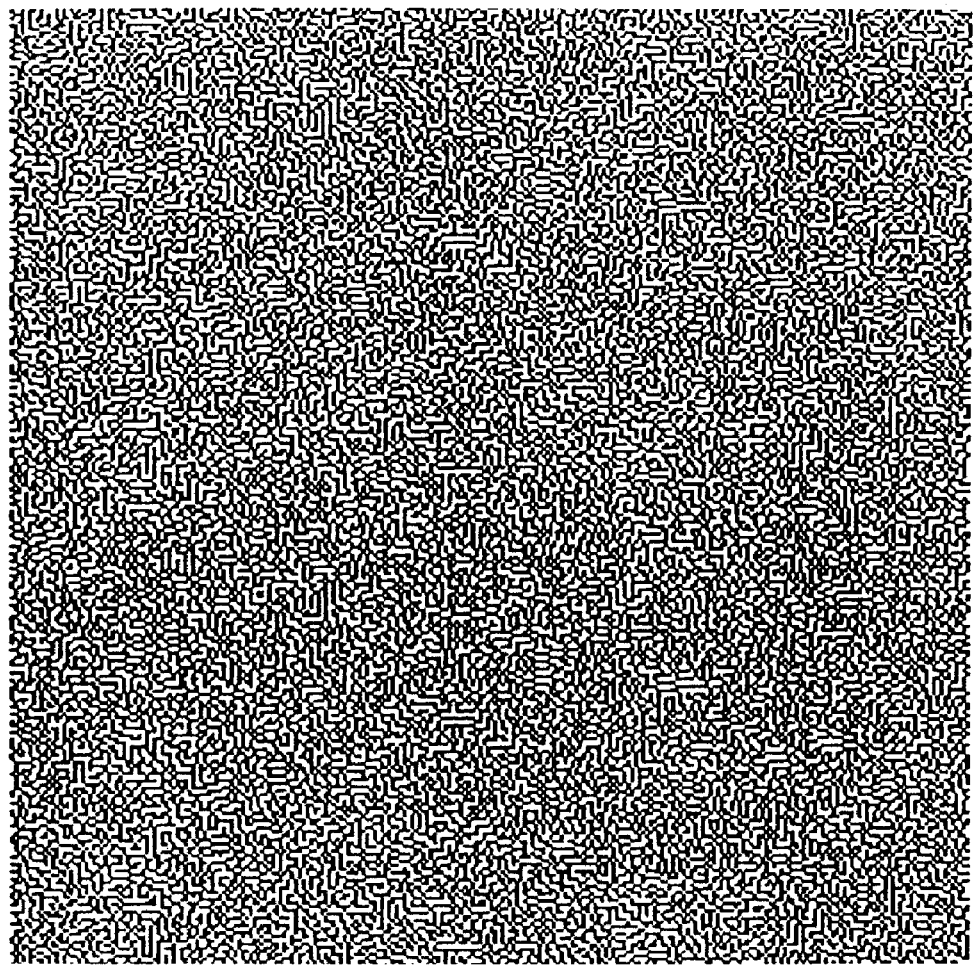
FIG. 24 shows the sum of mask data only for the forward printing in case of performing the bi-directional printing using the mask of FIG. 22.
Figure 25:
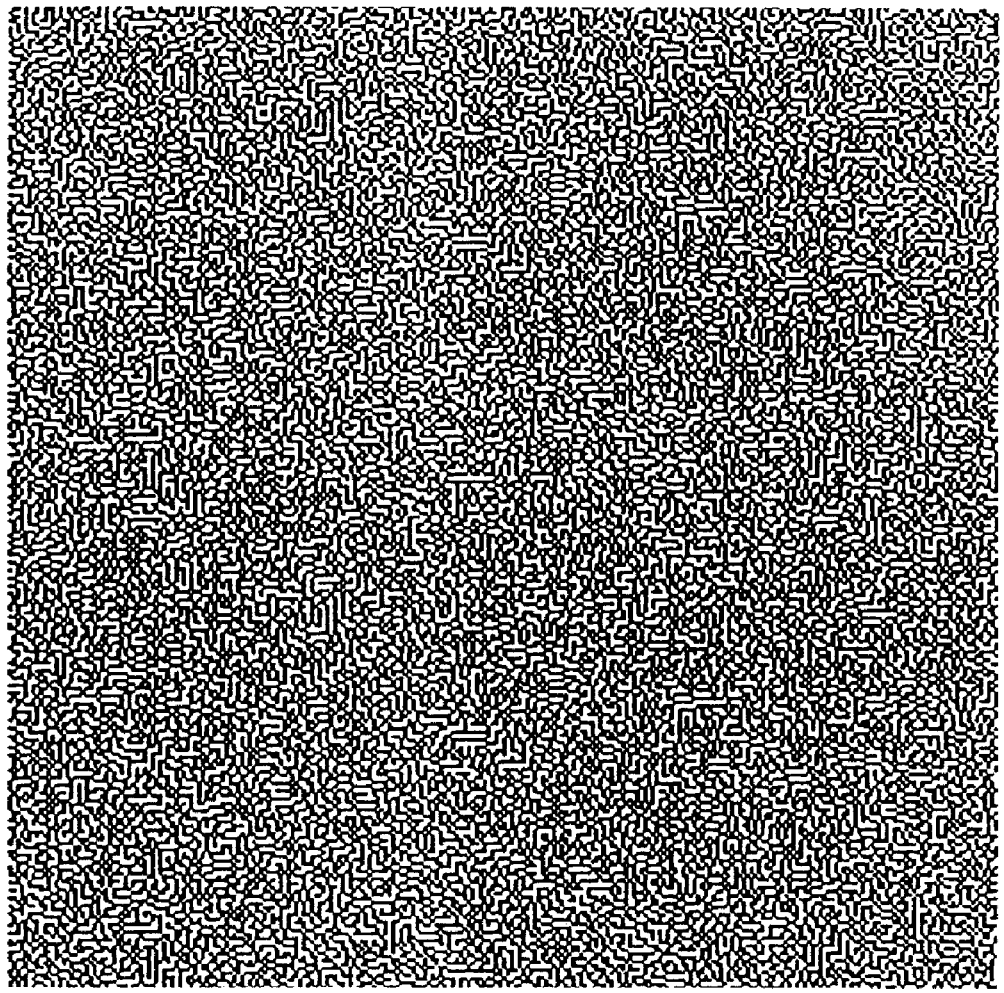
FIG. 25 shows the sum of mask data only for the backward printing in case of performing the bi-directional printing using the mask of FIG. 22.

FIG. 24 shows the sum of mask data of the forward printing (pass of odd number) of FIG. 22, while FIG. 25 shows the sum of mask data of the backward printing (pass of even number). The characteristic of this embodiment consists in a pseudo periodical arrangement with high dispersion for the mask of respective recording scan, and also in that the sum of forward prints and the sum of backward prints present respectively a similar pseudo periodical arrangement mask, as evident from these drawings.

It is one object of the present invention to provide a mask for divided thinning where image perturbations are not visually perceived, for an error of dot formation position for each recording scan. As the deviation of dot formation position for each recording scan appears as manifestation of the shape of the used mask on the image and therefor, if the mask data arrangement for each recording scan is in a visually agreeable state, the deviation is hard to be perceived, on the image. It is similar for the deviation of dot formation position during the bi-directional printing. If the mask for the forward printing and the mask for the backward printing are respectively in a visually agreeable state, the deviation is hard to be perceived, on the image.

Figure 26:
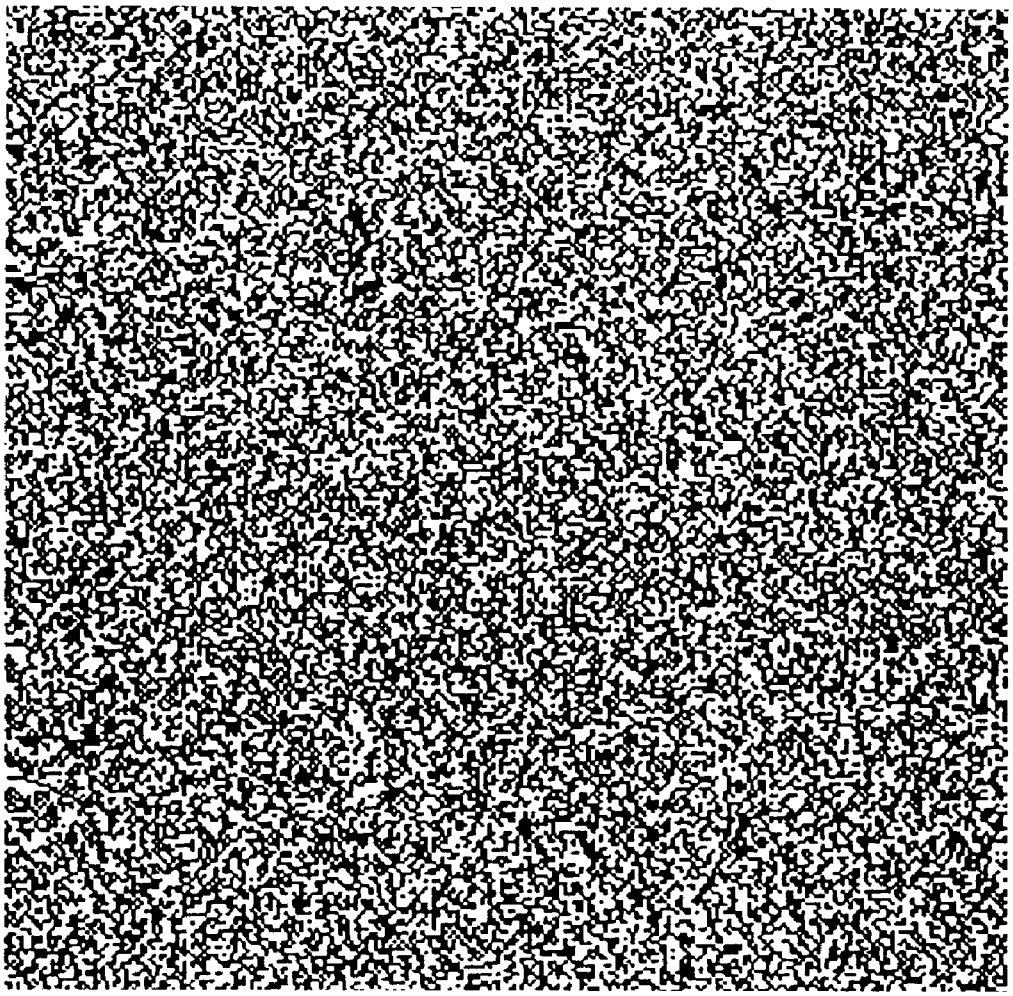
FIG. 26 shows the sum of mask data only for the forward printing in case of performing the bi-directional printing using the mask of FIG. 23.
Figure 27:
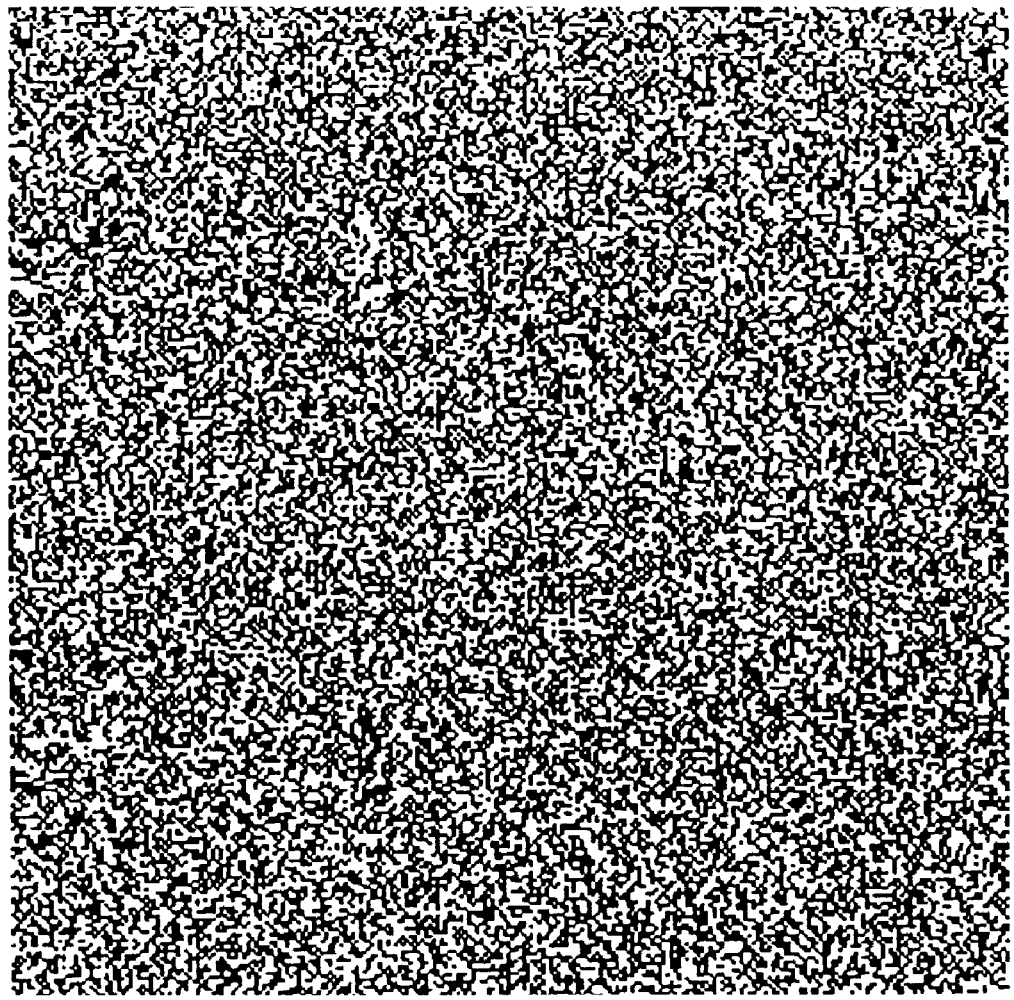
FIG. 27 shows the sum of mask data only for the backward printing in case of performing the bi-directional printing using the mask of FIG. 23.

FIG. 26 shows the sum of mask data of the forward printing (pass of odd number) of FIG. 23, while FIG. 27 shows the sum of mask data of the backward printing (pass of even number). The comparison of these drawings with FIG. 24 and FIG. 25 allows to confirm the difference between them.

Though different according to the quantization technique, in general, the arrangement of dots to be recorded is disposed not to spoil the view as much as possible. It is believed that the binarization method using an error diffusion method or the blue noise mask described in U.S. Pat. No. 2,622,429 is preferable for obtaining a photographic image quality especially desired recently because an image smoothness is pursued. Consequently, the binarized original image per se is often in a state of less low frequency components. However, the inherent preferable arrangement is deteriorated, if the deviation of dot formation position (deviation of ink landing position for the ink jet print method) appears among the recording scans during the multi-pass printing. Therefore, by making the thinning arrangement (mask pattern) itself for each recording scan visually agreeable, an image that would not spoil the view, namely a less granularity image is obtained, even if a deviation is generated.

Here, it should be noted that a mask with visually agreeable dot arrangement does not totally nor partially synchronize (not to be the same arrangement), with a visually agreeable dot arrangement after the quantization (binarized image data input for the print, or mask arrangement for binarization processing). If they become a same arrangement, the divided recording is not performed only for that portion, and the object of the multi-pass per se can not be achieved. The mask data arrangement of this embodiment obtains preferable effects, by the divided printing of data equally (by 25% of recorded image) for respective recording scan, without synchronizing with the dot arrangement after the binarization.

If the bi-directional dot formation position deviates all the times, a granular impression is generated all over the image. A pseudo periodical mask as this embodiment make the image less granularity, as the texture manifesting due to the deviation is not outstanding. Even if a pseudo periodical mask is not applied, the generation of granularity can be prevent by performing a dot formation position alignment (registration) processing as described in Japanese Patent Application Laid-open No. 10-329381 (1998). However, in the ink jet printing method for printing by affording ink which is a liquid, the paper surface may rise partially due to the effect of cockling, and the adjustment appropriate value for registration may become locally different from the other areas. In such a case, the image make granular impression on human eyes only for the cockling portion, and the granularity is all the more apparent as partial.

In a pseudo periodical mask as this embodiment, the texture manifesting on the image is not outstanding inherently even if a dot formation position deviation of bi-directional printing is generated, and the effect of the irregularity provoked by the cockling or the like appears hardly, as the difference between the area where the dot formation position deviation occurs locally, and the area exempt from deviation is not visually perceptible.

It has been described that the pseudo periodical mask as this embodiment is effective for suppressing a general deviation of dot formation position of bi-directional printing, or the irregularity due to a local deviation provoked by the cockling or others, but it is also effective against the deviation by the other factors.

Figure 45:
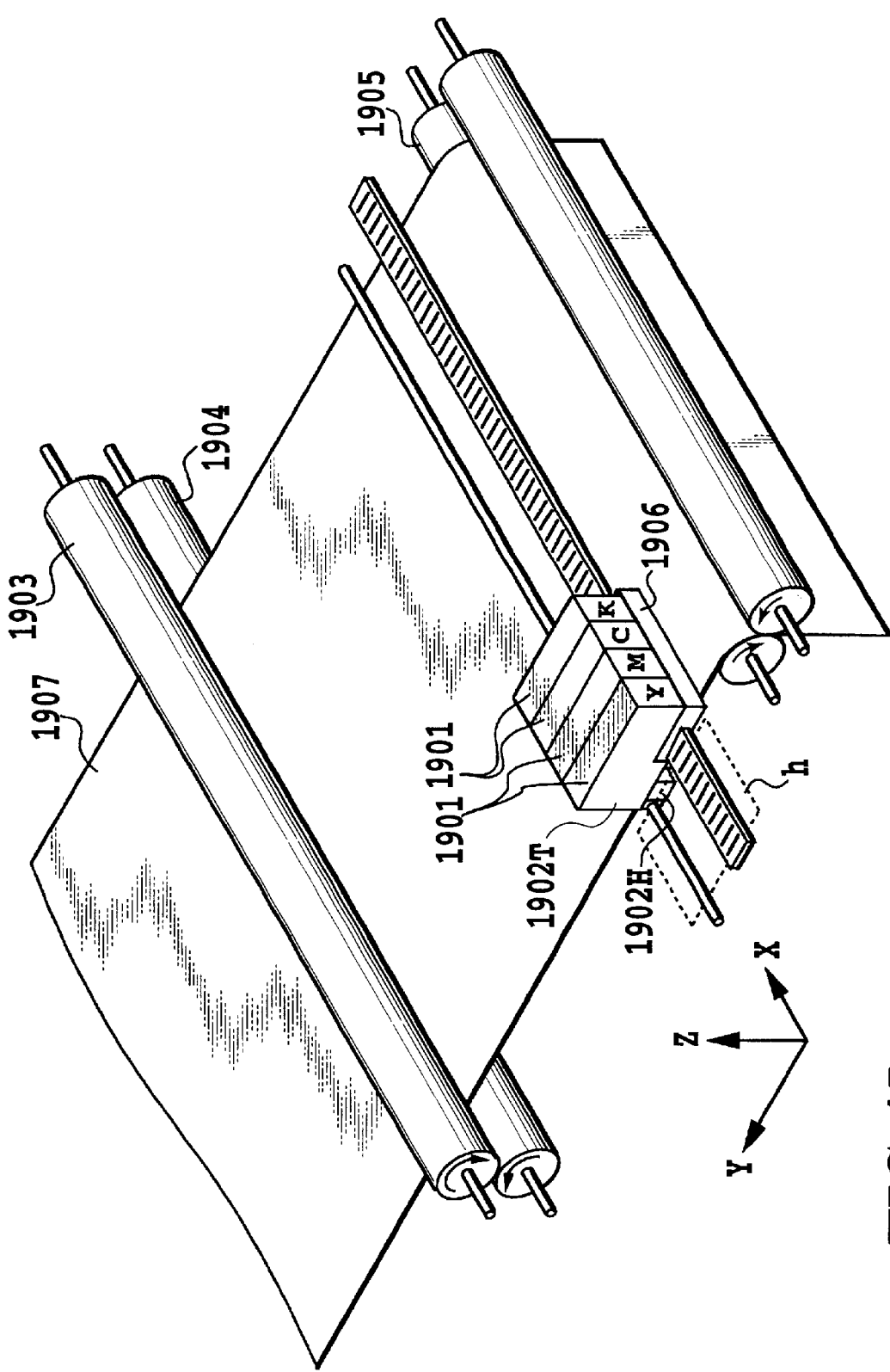
FIG. 45 is a perspective view showing simplified serial type color printer.
Figure 46:
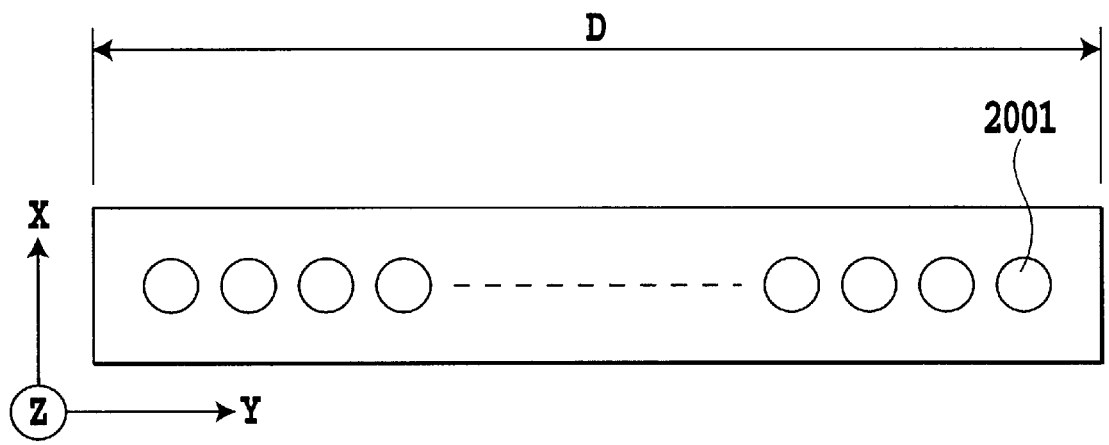
FIG. 46 schematically shows a nozzle arrangement of a print head applicable to the printer illustrated in FIG. 45.
Figure 50A:
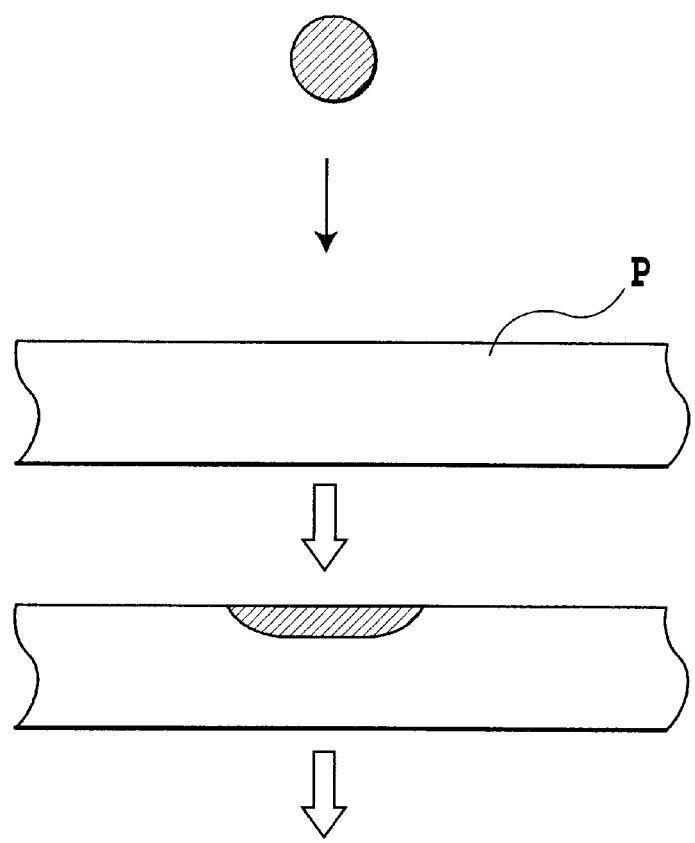
FIGS. 50A and 50B are illustrations explaining the case wherein two different color ink dots are absorbed (printed) at almost adjoining positions at a time interval.
Figure 50B:
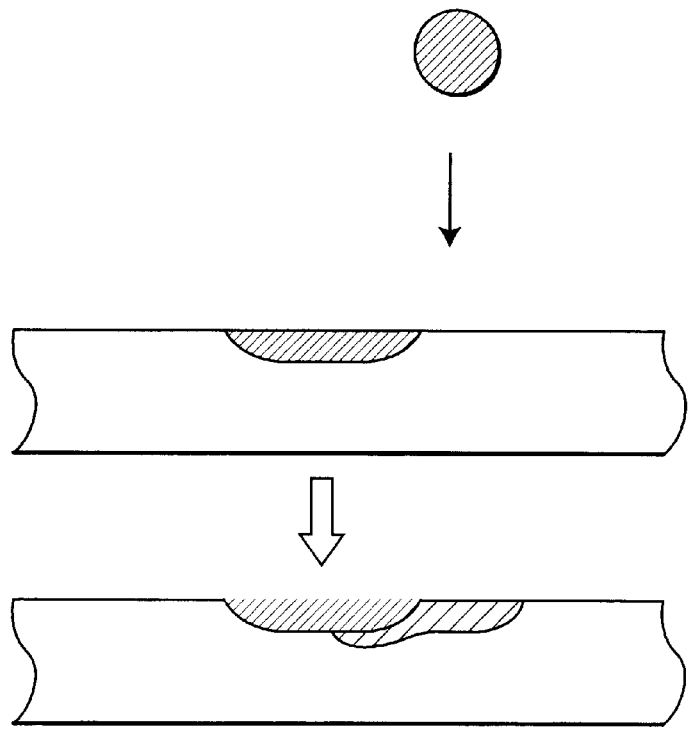
Figure 52:
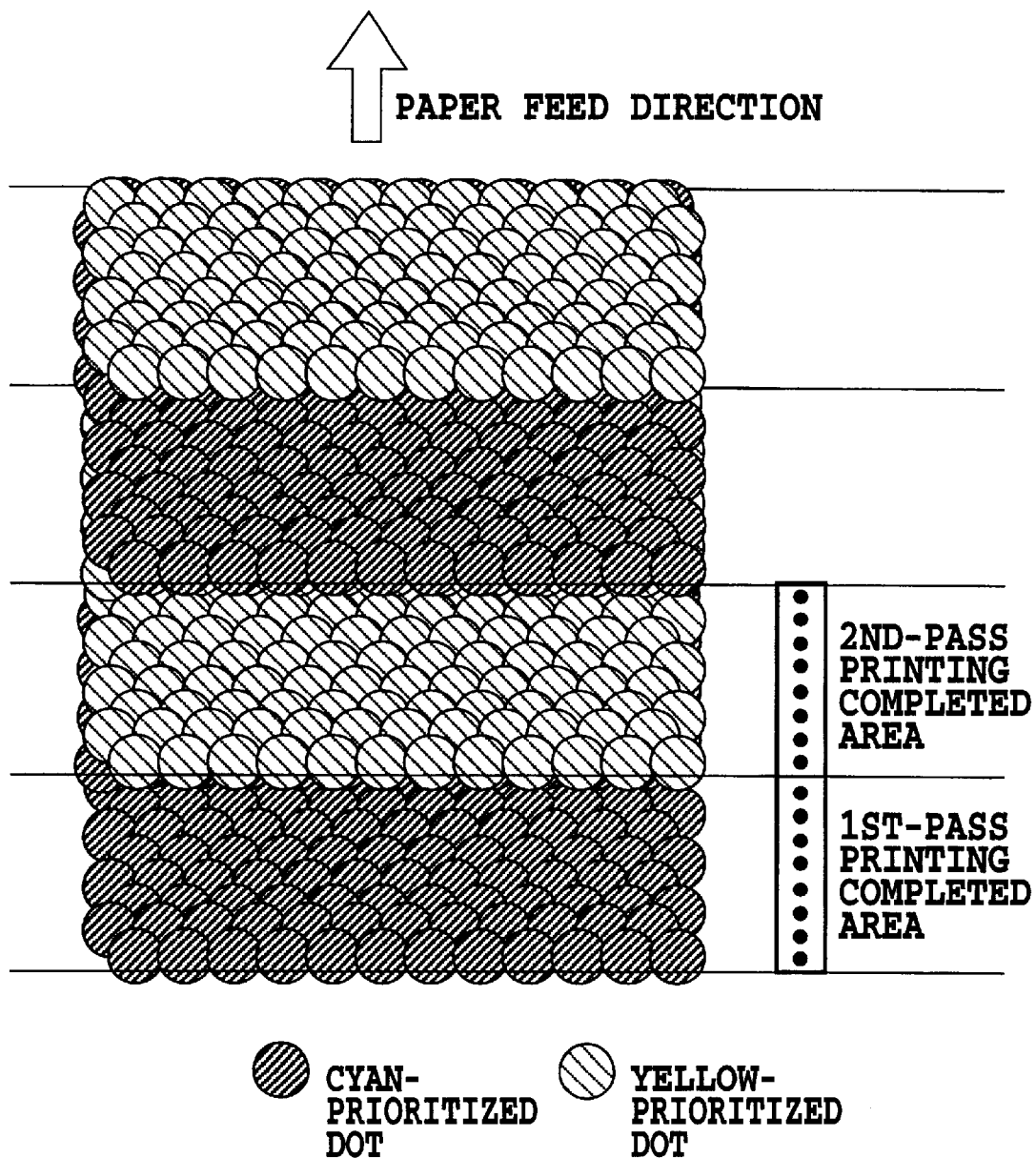
FIG. 52 is a schematic top view for explaining a state printed on a printing medium when the bi-directional printing is carried out with the multi-pass printing method.

For instance, errors between respective recording scans in the serial printing method are classified into errors in the main scan direction and errors in the sub scan direction. The errors in the main scan direction includes also carriage speed irregularity or others depending on the accuracy of the carriage scan system (an electric motor as driving source or a transmission mechanism or the like) or the scan control system (encoder for movement detection or others), in addition to already described bi-directional dot formation position deviation or local irregularity due to the cockling. On the other hand, the errors in the sub scan direction includes mainly those provoked by the dispersion of transport amount between each recording scans, and the paper rising. Especially, the dispersion of transport amount and the paper rising often occur at the point where the paper retention is unstable, like a state where the printing medium is not supported completely by the transport member (for example, until the print medium top portion is pinched by the pair of feed rollers, or after the release of the end portion from the pair of paper supply rollers, shown in FIG. 45). The pseudo periodical mask as shown in this embodiment is a mask that cope effectively with such errors in the sub scan direction, as it has less low frequency components in the two-dimensional direction and presents a high dispersion.

According to this embodiment, it becomes possible to control the image quality deterioration to the minimum, even when the dot formation position deviation occurs totally or partially due the error in the main scan direction and the sub scan direction for each recording scan, as the mask data arrangement for each recording scan is a visually agreeable pseudo periodical mask. In addition, as the mask data arrangement configured of the sum of odd pass (or sum of even pass) is also a visually agreeable pseudo periodical mask, a printing method further effective for controlling the deviation of bi-directional registration or the cockling irregularity.

7.4 Other Embodiments of Mask

In the foregoing embodiment, a pseudo periodical mask established by using a repulsive potential has been described as a dot arrangement pattern for making the arrangement of print permitting pixels and print prohibiting pixels visually agreeable, that is, a mask having a dot arrangement pattern of less low frequency components and high dispersion. However, masks of the other embodiment may be used, provided that similar effects can be obtained. For instance, an arrangement data after binarization having the blue noise characteristics as described in U.S. Pat. No. 2,622,429 may be set as a mask for thinning for the divided recording.

Also, an offset may be applied to the mask for each recording scan, as the one described in Japanese Patent Application Laid-open No. 7-125311 (1995) applied to the random mask.

These are similar for the following embodiments.

8. Application of Pseudo Periodical Data Arrangement to Collective Pixel Mask

Next, another embodiment of the present invention will be described. A 4-pass bi-directional print is performed in this embodiment, and here, taking the effect of the collective pixel mask described in the aforementioned Japanese Patent Application Laid-open No. 6-22106 (1994), and using a mask of pseudo periodical data arrangement by a unit of collective pixel made of 4 pixels in length×1 pixel in width.

Figure 28:
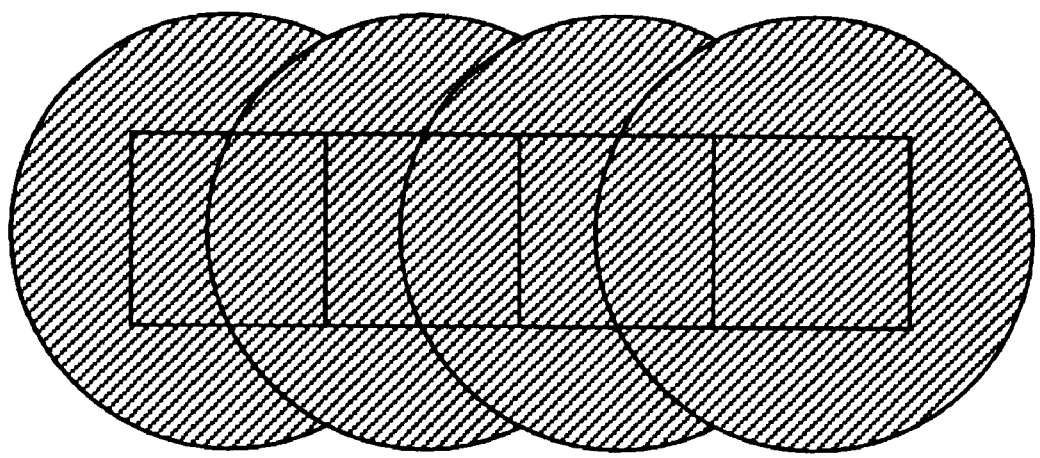
FIG. 28 illustrates a configuration unit of collective dot used in still another embodiment of the present invention.

FIG. 28 illustrates a collective dot used in this embodiment, and the recording is performed with a pixel arrangement by a constitution unit of 4 dots in transversal direction and 1 dot in longitudinal direction. In case of establishing a pseudo periodical mask, the mask area also is divided into a lattice by unit of 4 pixels in length×1 pixel in width. The mask is established by potential for each lattice, supposing that one lattice has one potential. In addition, in this embodiment, for the mask established in these conditions, a random deviation is produced in the main scan direction (transversal direction).

Figure 29:
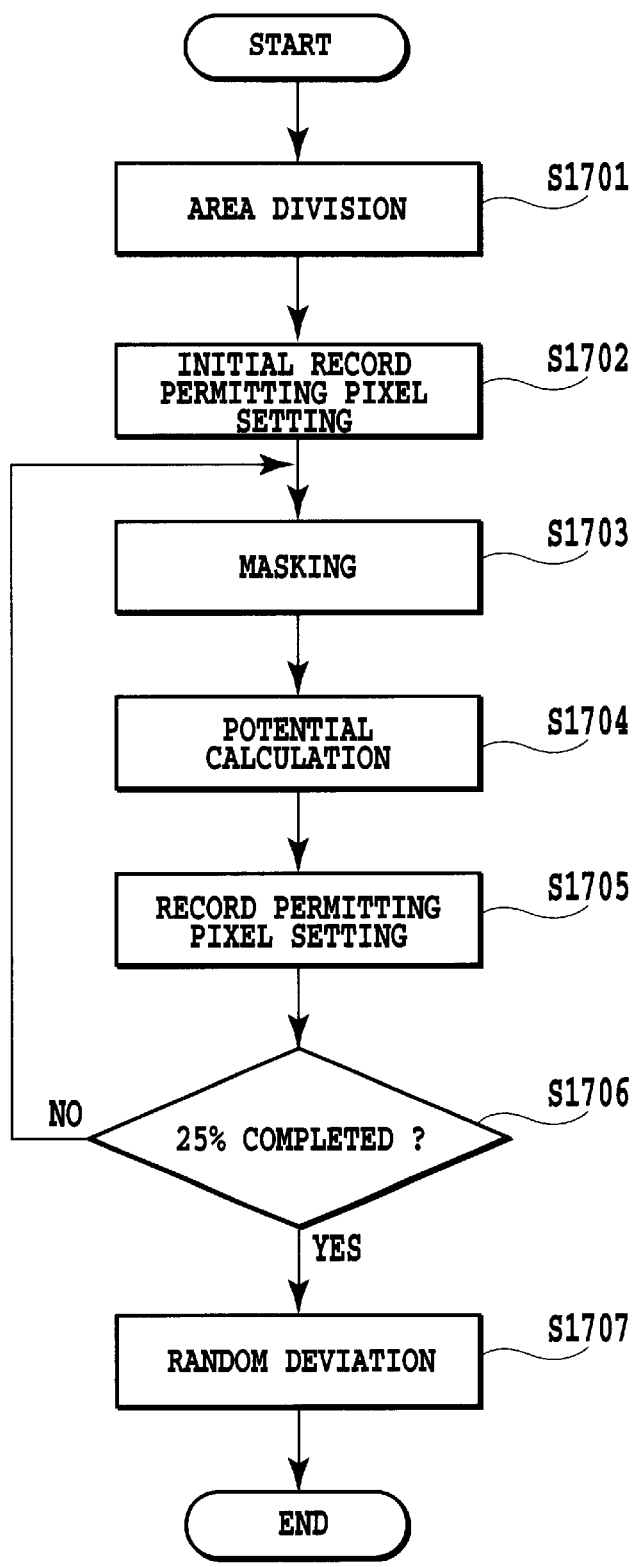
FIG. 29 is a flow chart showing an example of mask establishment procedures to be used in an embodiment where a mask with pseudo periodical data arrangement is applied to the collective pixel mask.

FIG. 29 is a flow chart showing an example of mask establishment procedures to be used in this embodiment. Adopting the collective pixel made of 4 pixels in length×1 pixel in width, first of all, all areas are divided by a unit of 4×1, in this embodiment (step S1701). Thereafter, the determination of record permitting pixel or masking are set with this unit. In the following step S1702, the initial record admitted collective pixel is determined at random in the area D approximately similarly to the processing of FIG. 22, and the same collective pixel positions in the areas A to C are masked (step S1703). Thereafter, the repulsive potential is calculated similarly to the aforementioned embodiment, for all collective pixel positions (step S1704). A computation formula similar to the first embodiment is also used here, and as the recorded/non recorded state is always decided by the unit of the collective pixel made of 4×1 pixels, the potential of the record admitted collective pixel is also determined by the sum of 4 pixels. Among thus determined potential of respective collective pixels, the collective pixel position having the smallest summing potentials is determined as the following record admitted collective pixel (step S1705). For this processing, the collective pixel of already masked positions is excluded. If there are several collective pixels having the minimum value, one of them is decided at random.

Further, among mask areas A to D, collective pixels of the corresponding position in the area other than that where this record admitted collective pixel exists are masked, and again, the potentials are calculated for all collective pixel positions. Thereafter, the processing of steps S1703 to S1705 is repeated until 25% of collective pixels in all masked areas become record admitted collective pixel (here, 4096 collective pixels) (step S1706).

Further, in this embodiment, 256 rasters of the completed mask are shifted mutually horizontally at random (step S1707).

Figure 30:
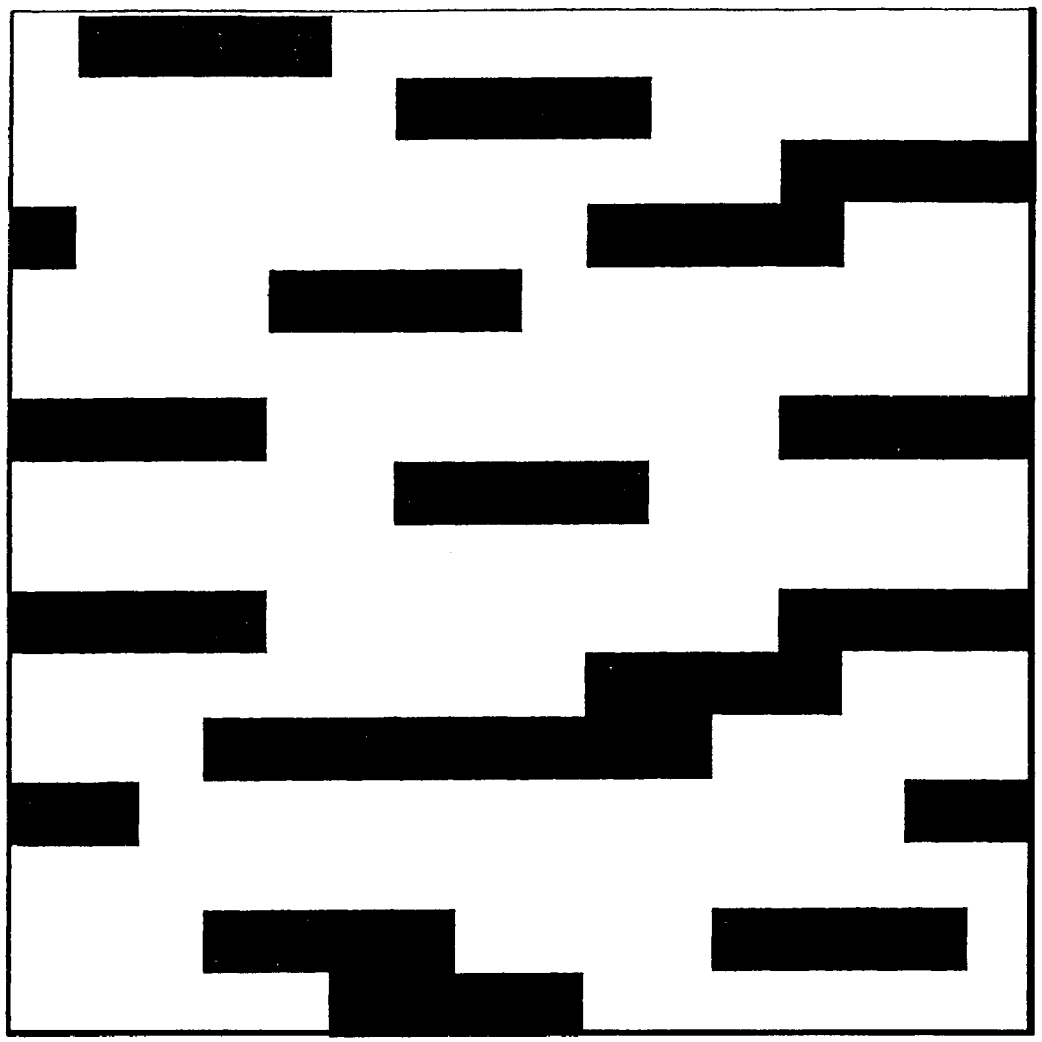
FIG. 30 is an enlarged view of the mask established by the procedures of FIG. 29.
Figure 31:
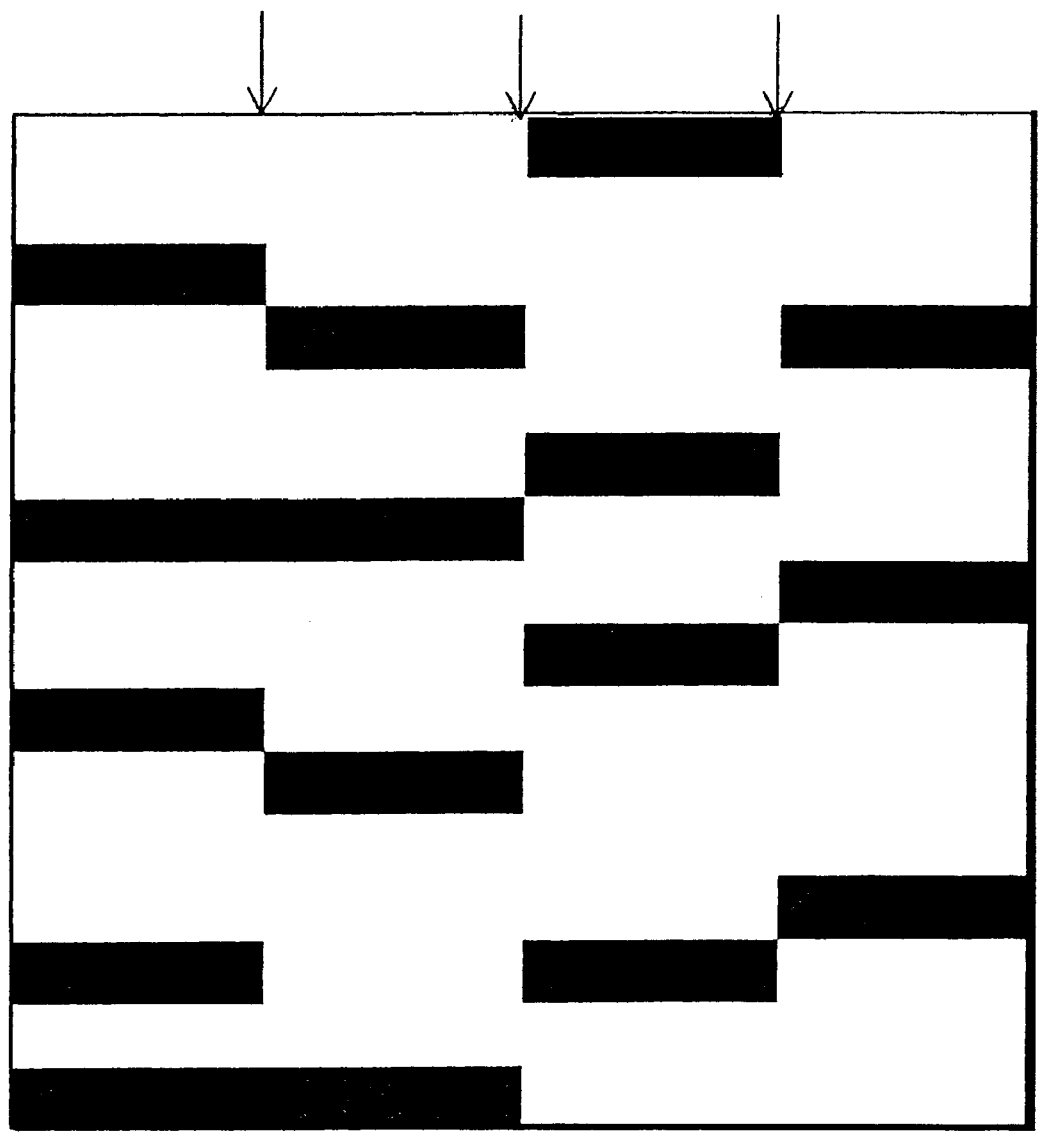
FIG. 31 is an enlarged view of a mask established by omitting the shifting processing, among the procedures of FIG. 29.

FIG. 30 is an enlarged view of the mask established by the foregoing procedures. Besides, FIG. 31 is an enlarged view of a mask established by omitting the processing of the step S1707 and not generating a random deviation, all the way obtaining the collective pixel of 4×1 by the procedures up to the step S1706. As it is obvious from these drawings, 4×1 collective pixels are not adjacent by the unit of 1 pixel mutually in the longitudinal direction and the transversal direction in FIG. 31, while they are arranged in a mutual contact by several pixels in the longitudinal direction in FIG. 30. The arrangement of FIG. 30 is effective not only for the dot formation position deviation of the bi-directional printing, but also for the dot formation position deviation in the transversal direction by any factor in respective recording scan. That is, some mutual deviation may appear between respective recording scans, even when there is no cockling nor dot formation position deviation in the bi-directional printing; however, this embodiment prevents more positively the perturbation of image quality deterioration by the dot formation position deviation especially in the main scan direction.

This embodiment is provided with effects described in Japanese Patent Application Laid-open No. 6-336016 (1994) and, at the same time, effects of the case where the pseudo periodical mask described for the aforementioned embodiment is applied.

Error for each recording scan appears as overlapping or separation of dots each other formed between different recording scans, and not between dots formed in the same recording scan. Consequently, the number of areas affected by the deviation for each recording scan (called error points, hereinafter) is reduced by enlarging the collective pixel. In this embodiment, a collective pixel of 4×1 long in the transversal direction, taking especially the prevention of error in the main scan direction. This limits the number of error points to ¼ compared to the aforementioned embodiment where the collective pixel is not applied.

Here, both arrangements of FIG. 30 and FIG. 31 can certainly reduce the number of error points. However, if they are present on the same line in a direction shown by each arrows, their errors is rather enhanced, and outstanding. Hence, in this embodiment, error points are dispersed for each raster by deviating the collective pixel at random as shown in FIG. 30.

In the foregoing, an example where a collective pixel which is long in the transversal direction is used, and shifted in the transversal direction for coping with the transversal direction error (noise) has been explained. However, this embodiment is not limited to this. In other words, if it is essential to be resistant to the longitudinal noise, the effect of this embodiment is obtained sufficiently, by using a collective pixel which is long in the longitudinal direction, and shifting the collective pixel in the longitudinal direction.

Figure 32:
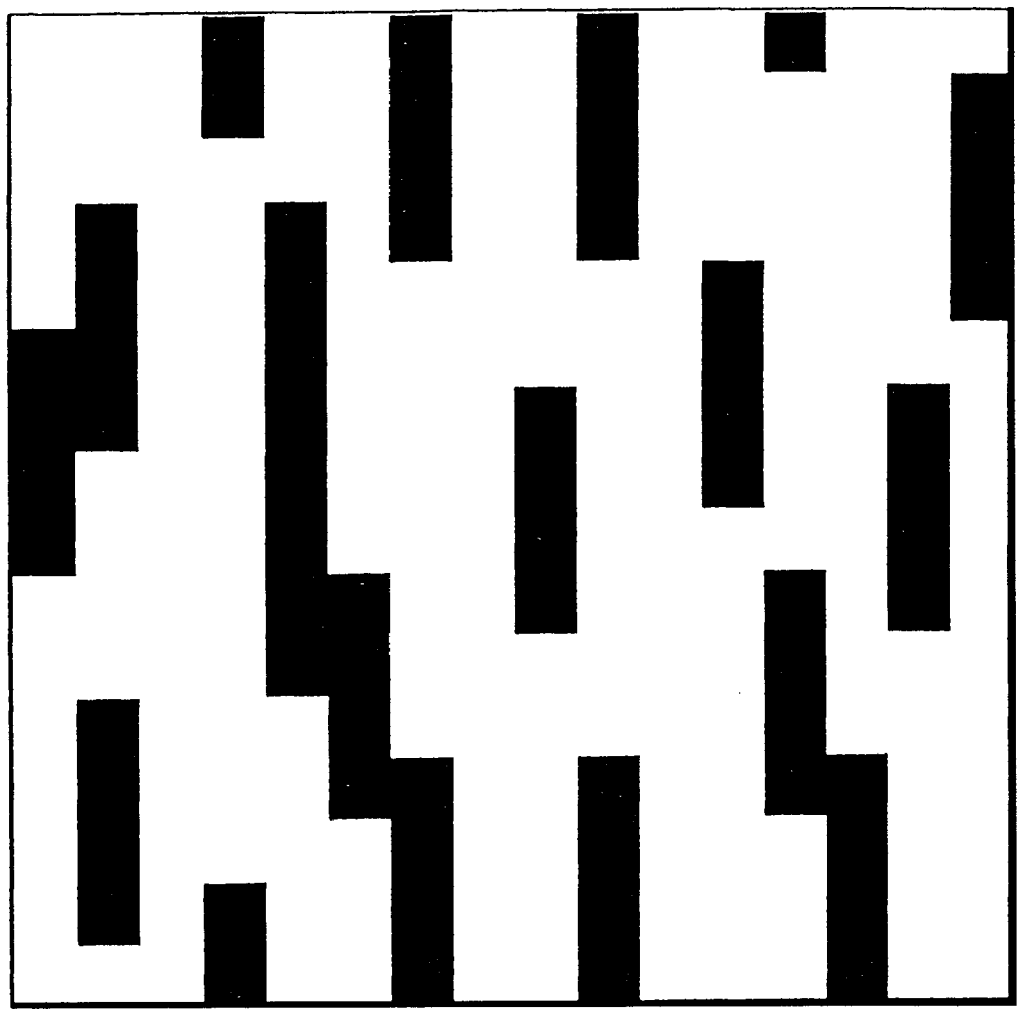
FIG. 32 is a partially enlarged view of a mask where a mask with pseudo periodical data arrangement is applied to a collective dot mask by several dots adjacent in the sub scanning direction, and collective dots are arranged by shifting at random in a sub-scanning direction.

An example thereof is shown in FIG. 32. This is a partially enlarged view of a mask for 4-pass print where a collective pixel of 1×4 is shifted in the longitudinal direction. Similarly to FIG. 30, as error points are dispersed, their portion is not outstanding.

Further, the mask to be applied may be changed according to the portion on the print medium, in case where a transport error countermeasure is desired for the front end portion and the rear end portion of the aforementioned printing medium, and a main scan direction error countermeasure is required for the other area. Besides, as the error appears extremely differently according to the nature of the printing medium, masks may be changed according to the printing medium to be printed.

Besides, similarly to the aforementioned embodiment, this embodiment may also be configured to make the dot arrangement of the sum of mask data applied to the forward print (or sum of mask data applied to the backward print) a visually agreeable pseudo periodical arrangement by the unit of 4×1. This has an effect of coping more effectively with the bi-directional dot formation position deviation, similarly to the aforementioned embodiment.

As still another configuration, a configuration where the sum of mask data applied to the forward print (or sum of mask data applied to the backward print) forms an arrangement of collective pixel of 8×1. By doing this, error points in the forward print and backward print are reduced to the half, and an effect to the bi-directional deviation is expected from an different angle.

According to the foregoing embodiments, it became possible to realize a divided thinning resistant to the error in the main scan direction or in the sub scan direction, by establishing a mask of visually agreeable pseudo periodical arrangement by the unit of m×n collective pixel, and arranging by shifting respective collective pixels at random in the transversal direction or longitudinal direction.

Now, an embodiment reducing color irregularity or perturbation by the bi-directional printing, through the improvement of the technology disclosed in Japanese Patent Application Laid-open No. 6-22106 (1994) or Japanese Patent Application Laid-open No. 10-235852 (1998) explained for the related art.

As already mentioned, the color irregularity is reduced by increasing the collective dot size of m×n, but a relatively large collective dot is necessary for expecting this effect, and inappropriate for the photographic image quality. However, here also, Inventors have confirmed that the image perturbations is reduced, by arranging mask data according to the visually agreeable pseudo periodical arrangement.

Figure 33:
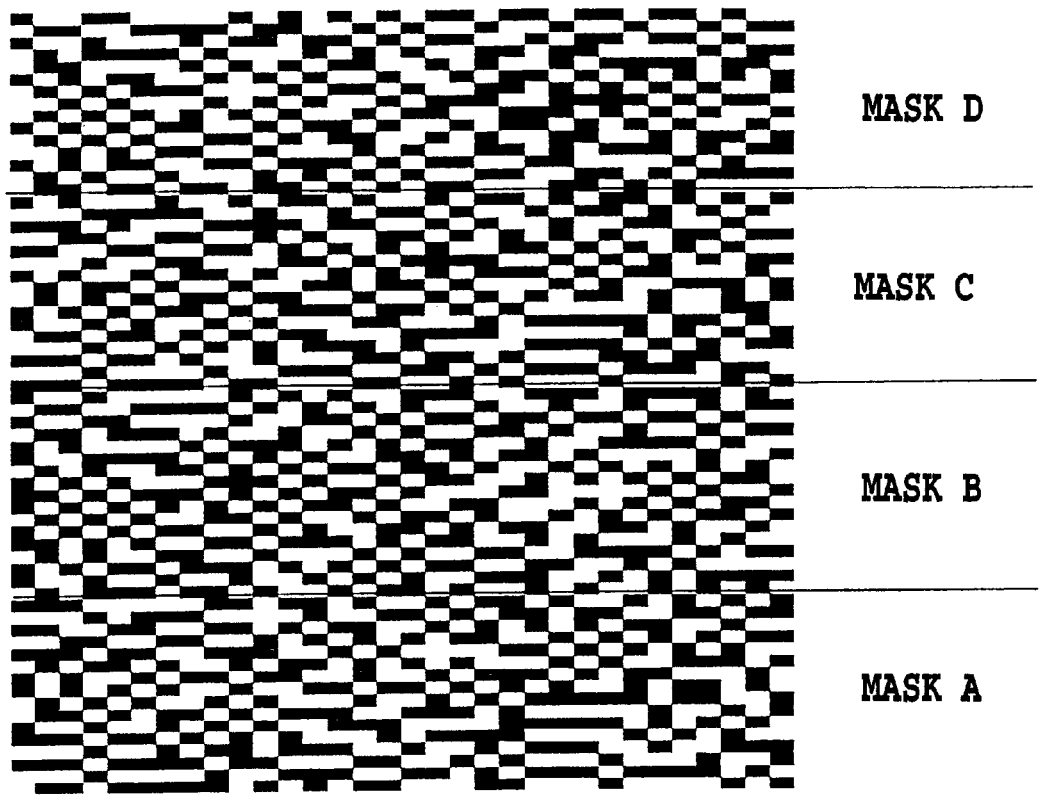
FIG. 33 shows a mask of an embodiment where a mask with pseudo periodical data arrangement is applied to a collective dot having a relatively large size.

FIG. 33 shows a pseudo periodical mask of this embodiment using the collective dot of 8×4. Though the size is so big as 8×4, they are visually agreeable because they are arranged globally dispersed.

Figure 34:
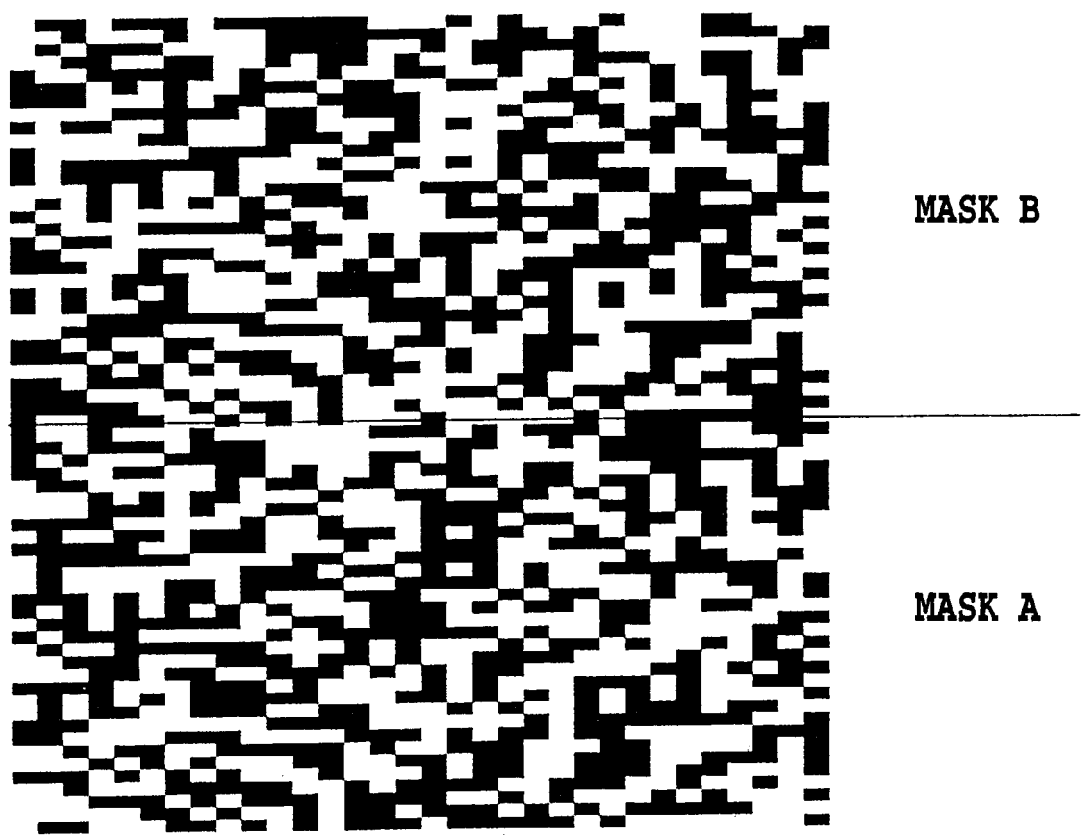
FIG. 34 shows a mask where collective dots of the same size as the one shown in FIG. 33 are arranged at random.

FIG. 34 shows an example of random arrangement of the same collective dots. Here, as the dispersion of the collective dots is not enough rather than the collective dot size is so big as 8×4, the difference between portions of concentrated and gathered arrangement and portions that are not so arranged is abrupt, and feels rough. On the contrary, in FIG. 33, as collective dots of 8×4 are arranged relatively equidistantly, there is no portion where the density is especially locally high or low. As this embodiment perform the bi-directional printing, the black portion and the remaining white portion shown here are recorded respectively with the color of the forward direction and the color of the backward direction. As mentioned above, a slight difference exist between the color of the forward direction and the color of the backward direction. Admitting this, if respective colors are arranged as shown in this drawing, evidently, the granularity reduces by applying the mask of FIG. 33. That is, the perturbation due to a large size collective dot can be mitigated by using a pseudo periodical arrangement mask. In other words, a better effect is deployed against the color irregularity generated during the bi-directional printing, because the size of collective dot can be made still larger, so long as the granularity permits.

9. Application to the Control of Recording Data Number in Multi-Pass Print 9.1 Control of Recorded Data Number in Multi-Pass Print The invention described in the aforementioned Japanese Patent Application Laid-open No. 6-22106 (1994) has an object of making the ink covering ratio on the paper face on which ink lands in respective scan equal as much as possible, considering that the color irregularity provoked by the difference of recording scan direction depends on the ink covering ratios (swell-out ratios) in respective recording scan. And, as means for achieving this object, dots to be recording in the same recording scan were gathered by m×n pixels as collective dot and recorded. However, the object to equalize the covering ratio can also be achieved by controlling the number of recording data in respective recording scan, without using the collective dot. There, a visually agreeable mask of less low frequency components and high dot dispersion may be applied, for controlling the number of recording data, and such embodiment will be described below.

First, as the premise thereof, the control of recording data number will be described.

The multi-pass printing method was described taking a configuration where an image is completed by 2 times of recording scan (2-pass) as example, using FIG. 49, and now, a multi-pass print of 8-pass will be described first. The color irregularity appears scarcely for many recording media event when the bi-directional printing is performed, by executing a multi-pass printing of the order of 8-pass. However, it may appear according to the nature of recording medium and is evaluated severely for the mode requiring especially an image of best quality.

In a method dividing recording data equally for respective scan, a recording by the duty of 12.5% per respective pass is performed in case of 8-pass print. On the other hand, in case of printing using a head with 1200 DPI resolution shown in FIG. 11, one pixel on the paper face has an area of about 21 $\mu$m square, while one drop of ink ejected from the head used in this embodiment is about 41 pl and forms a circular dot of about 45 $\mu$m in diameter on the paper face. At this time, the area of one dot will be 1570 $\mu m^2$, becoming larger by far than 21×21=441 $m^2$ of one pixel area. If the conventional random mask method is adopted for performing the 8-pass print using such a head, the ink covering ratio at the first pass becomes 12.5%×1570/441≈45% and near the half of the whole paper face will be filled. Next, in the second pass, 12.5% of data equivalent to the first pass will be recorded; however, on the paper face, it results in 45% in the remaining 100−45=55%, giving 55×45/100≈25.0%, which is a considerably reduced value as covering ratio, for the same data recording ratio of 12.5%. According to this, the covering ratio of the third pass and thereafter reduces further.

The inventors of the present invention paid attention to the fact that since the covering ratio reaches 45+25.0=70% in the first and second passes, namely, the first two multiple scanning, the prioritized color in the multi-pass (8-pass) printing is determined almost in the first two passes. In the case of bi-directional printing, the first pass and the second pass are reversed in the printing directions, therefore, if the first pass is forward printing, the first ink printed on the forward way is prioritized, and if the first pass is backward printing, the first ink printed on the backward way is prioritized, respectively. The third to eighth passes take part in the effect only to the remaining 30% blank area of the paper, and have almost nothing to do with color irregularity. Namely, deterioration in image quality already occurs in the first two passes, in other words, if the color irregularity in these first two passes can be controlled, it is possible to remarkably reduce the harmful effect on the entire image caused by color irregularity.

While fixing the sum of the data printing ratios in the first and second passes to 12.5×2=25%, the inventors carried out an experiment so as to decrease the printing data in the first pass and increase that in the second pass by the decreased quantity in order to equalize both covering ratios in the first and second passes to each other. Since the covering ratio up to the second pass is 70% in the calculation, the data printing ratio in the first pass should be controlled so that the covering ratio becomes a half of it, namely, 35%. In this case, if inversely calculated, a data printing ratio is 35×441/ 1570=9.8%, therefore, the data printing ratio may be made to 10% in the first pass, and 25−10=15% in the second pass. However, it is assumed in this calculation that dots to be printed in a same printing pass are not adjacent to each other.

FIG. 35 shows evaluation results of color irregularity in the case of experiments carried out by varying the data printing ratios in the first and second passes by 1% steps. Although these are the results of the experiment using a printing medium on which color irregularity is easily noticeable, the color irregularity becomes almost insignificant with 9–10% data printing ratio in the first pass, and the result did not show any problem with 10%. This is an answer which almost coincides with the calculated value.

Figure 36:
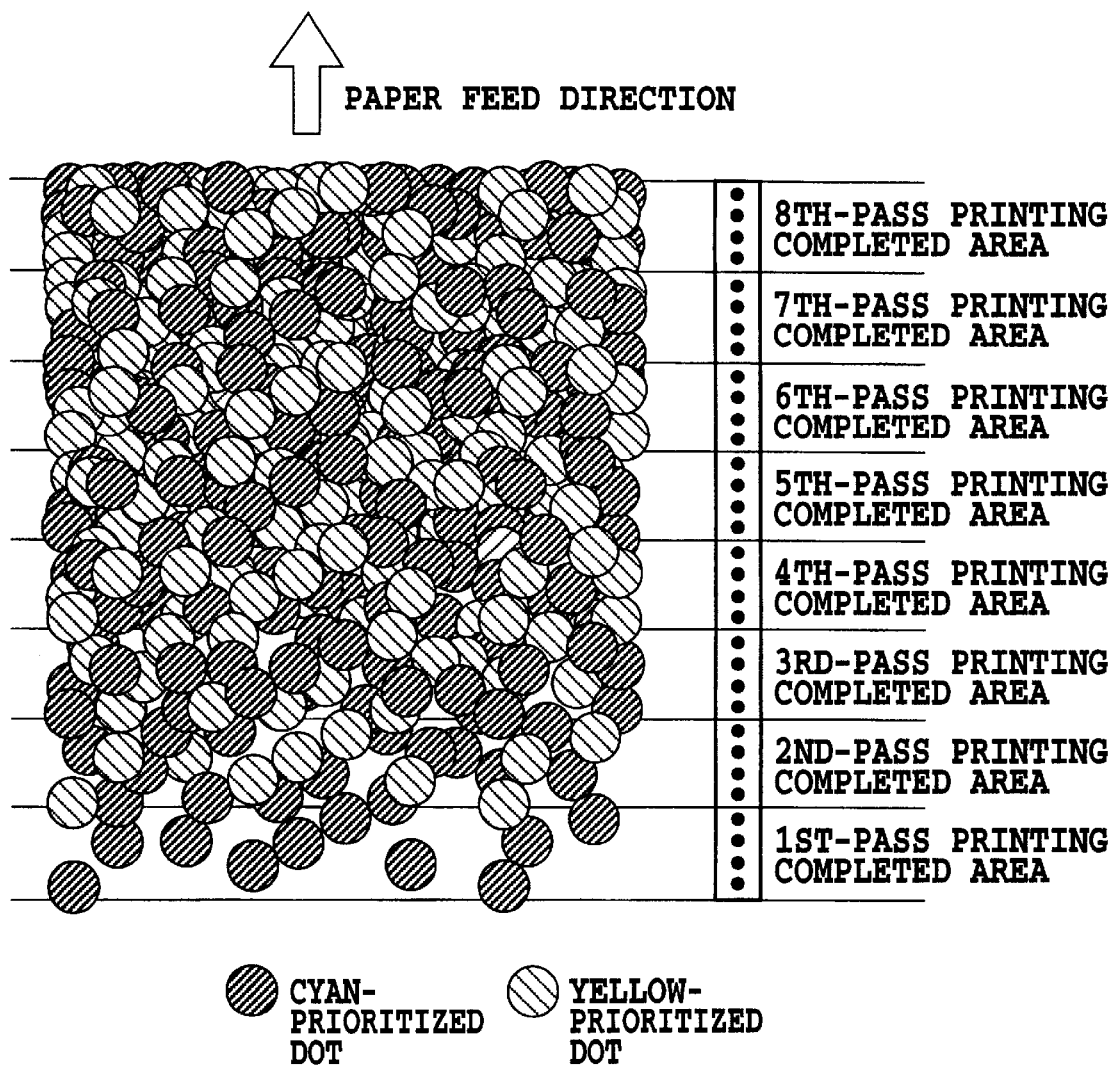
FIG. 36 is a diagram for illustrating an embodiment where a mask with pseudo periodical data arrangement is applied when the number of recording data is controlled for each pass in order to reduce color irregularity.

FIG. 36 illustrates the result of printing by 8-pass printing performed by applying the above-described contents. A printing head used for this embodiment has in practice 256 nozzles for each color as described above, however, for simplicity, an embodiment in which a green image composed of cyan and yellow is printed with 32 nozzles will be explained here.

Since this embodiment is of 8-pass printing, a total of 32 pixel areas printable by a single print-scanning are divided into printing areas with 4 pixels each, to complete an image by print-scanning at eight times concerning each printing area. In any image area, dots are printed firstly by the four nozzles for the first pass printing area. While 12.5% pixels in a printing area are printed on the forward way or the backward way in the commonly used 8-pass printing, the data printing ratio is reduced to 10% in the first pass printing area in this embodiment. FIG. 36 illustrates the state of a printed image at the time when print-scanning is ended for a forward way. In a first pass printing completed area, 10% pixels of the entire image data are dot-printed in cyan-prioritized color. The covering ratio is about 35% at this stage.

In the adjacent second pass printing completed area, 15% of pixel data are newly printed. In this area, about 10% of dots landed in the previous backward print-scanning are already printed, and these are yellow-prioritized dots. When the newly printed 15% of dots are overlapped with those precedently printed, the former sink behind the latter, and the first pass dot color is prioritized. As is evident from the results of the printing described up to here, the cyan-prioritized dots and the yellow-prioritized dots are evenly distributed about half-and-half, and also most of the image area is filled up with dots at the stage of the second pass printing and earlier.

12.5% of data are printed in each printing area of the third pass or hereafter, and a color to be prioritized sinks behind the back according to the above-described regularity. In the third pass and hereafter, the remaining 30% blank area is to be covered with dots, however, since most of the dots sink behind the back of the dots landed in the passes up to the second one, they hardly influence prioritized colors of a whole image, whichever the color to be prioritized is cyan or yellow.

Next, a case where the number of recording data is controlled in the 4-pass print will be described. As mentioned above, as recording data is divided equally for respective scan in the method of the related art, a recording by the 25% duty is performed in case of 4-pass print. Here, if the conventional random mask method is adopted, the ink covering ratio of the first pass is 25%×1570/441≈89% and almost whole the paper face will be filled. Next, in the second pass, 25% of data equivalent to the first pass will be recorded; however, on the paper face, it results in 89% in the remaining 100−89=11%, giving 11%×89%≈10%, which is a considerably reduced as covering ratio, for the same data recording ratio of 25%. According to this, the covering ratio of the third pass and thereafter reduces further.

Then, in case of 4-pass print, as the covering ratio of the first pass and the second pass, namely, first two passes becomes 89+11=99%, the prioritized color for the 4-pass printing is almost determined by the first two passes. On the other hand, in case of performing the bi-directional printing, as the recording direction is inverted for the first pass and the second pass, the ink recorded first in the forward direction if the first pass is the forward printing, and the ink recorded first in the backward direction if the first pass is the backward printing become respectively the prioritized color similarly as mentioned above. There, the third and fourth passes affect only the remaining about 1% of blank area and concerns scarcely the color irregularity. That is, the image quality deterioration due to the color irregularity is generated in the first and second passes and, in other words, the perturbation of the whole image due to the color irregularity can be reduced remarkably, if the color irregularity can be controlled in these first two passes.

Therefore, in case of 4-pass print, the recording data of the first pass shall be reduced and the recording data of the second pass shall be increased as much, in view of equalizing approximately the covering ratio of the first pass and the covering ratio of the second pass, while fixing the sum of data recording ratios of the fist pass and the second pass to 25×2=50%. As the covering ratio up to the second pass is 99%, in the calculation, the data recording ratio may be controlled so that the covering ratio be 49.5%, half of the same, in the first pass. In the case, the reverse computation giving 49.5×441/1570=13.9%, the data recording ratio may be about 14% for the first pass and 50−14=36% in the second pass.

9.2 Application of Pseudo Periodical Mask

For the control of the number of recording data in the multi-pass printing as mentioned above, in an embodiment, a pseudo periodical mask arranging record prohibiting pixels and record permitting pixels in a visually agreeable state is introduced.

For instance, the pseudo periodical mask of the embodiment described for FIG. 12 to FIG. 20 may be applied, as follows.

That is, in case of performing the multi-pass printing by four scans for the same recording area, and controlling the number of recording data for each scan, the pseudo periodical mask may be applied to each scan by partially modifying the procedures of FIG. 20.

The mask data is quantized into the number of times of scan for the multi-pass, in respect to a configuration where the master mask is of 16 square pixels and the respective mask data value has a value from "0" to "255". In the aforementioned 4-pass printing, as the number of record permitting pixel was equalized in respective recording scan, the respective mask value from "0" to "63" was allocated to the first pass, the mask value from "64" to "127" to the second pass, the mask value from "128" to "191" to the third pass, and the mask value from "192" to "255" to the fourth pass in the step S50.

However, in this embodiment, in order to equalize the ink covering ratio on the recording paper between the first pass and the second pass, as mentioned before, the number of record in the first pass is made 14% of the whole, the record permitting pixel of the second pass 36% of the whole, and 25% respectively for the third pass and the fourth pass. Therefore, in the processing of the step S50, the mask value from "0" to "35" may be allocated to the first pass, the mask value from "36" to 127 to the second pass, the mask value from "128" to "191" to the third pass, and the mask value from "192" to "255" to the fourth pass.

According to such embodiment, first and basically, as thinning pattern in the multi-pass printing method, a mask pattern is generated from a pseudo periodical data arrangement of high dot dispersion making the arrangement of record permitting pixel and record prohibiting pixel visually agreeable after binarized at an arbitrary level, the following functions and effects is deployed: in the aforementioned configuration, as the master mask data of pseudo periodical data arrangement has less low frequency components compared to the uniform random digits, it serves to avoid the generation of repeated pattern and the increase of granularity. That is, the use of the master mask data having pseudo periodical data arrangement presenting a high dot dispersion, prevents the generation of repeated pattern in case of using random digits of short cycle and the increase of granularity generating in case of using a mask by the uniform random digits.

As the foregoing, the intended object is also achieved by differentiating the recording duty between respective recording scans, not only by dividing the number of recording data equally by 25% (making the recording duty even) in all recording scan for the 4-pass printing as in the aforementioned embodiment.

Incidentally, it is considered that the present invention is effective in the case of performing divided printing at least with four passes or more. The reason is that although, even 2-pass printing has of course a theoretical effect on color irregularity, another purpose of the divided printing, namely, the effects of eliminating unevenness of density caused by variation in nozzles and making stripes of connection inconspicuous can be obtained by equalizing data printing ratios in each print-scanning as much as possible. When the present invention is embodied in the 2-pass printing, most printing can hardly be performed in the first pass, but may be performed in the second pass. If so, the essential effects of the divided printing are offset.

In contrast with this, if multiple pass printing with about 4 passes or more is applied, even if an imbalance of the printing ratios occurs a little between the first pass and the second pass, no problem will arise as far as dots are equally divided in the remaining plural passes. It is possible to give a meaning thereto that in the first and second passes, print-scanning is performed for reducing color irregularity, and in the third pass and after, print scanning is a countermeasure for eliminating unevenness in density and stripes of connection due to variation in nozzles, and from these improvements combined, a sufficient effect is expected to achieve a high quality photographic image. The effect of the present invention is significant in such a case as a dot area practically printed is larger than one pixel area as adopted in this embodiment.

Moreover, the more passes multiple pass printing uses, the more image quality is improved, while it takes more time for printing. Therefore, it is possible to change over a printing mode as necessary from 1-pass mode in which multiple pass printing is not performed, to one of 2 to 8 multiple pass modes, according to the kind of a printing medium and the purpose.

Moreover, a specification of a printing data ratio for each pass, a quantizing processing for making the mask data into the number of times of scan for the multi-pass (step S50) in practical printing operation may not only be provided as software of CPU E1001 (FIG. 8A) but also be provided beforehand as proper hardware, for example, a part of a circuit configuration such as ASIC E1006 (FIG. 8B).

For example, in FIG. 9, printing data ratios of each pass or the data for quantization are stored beforehand in the development data buffer E2016 concerning selectable modes, and the print data development DMA controller E2015 manages the pass numbers according to the progress in printing operation, and it is thereby possible to mask the printing data developed in the print buffer E2014 with a mask pattern according to the number.

10. Application of Pseudo Periodical Mask to the Control of the Number of Recording Data and Collective Pixel Mask Next, an embodiment applying the pseudo periodical mask to the control of the number of recording data and, at the same time, taking the effect of the collective dot mask described in the aforementioned Japanese Patent Application Laid-open No. 6-22106 will be described.

It should be appreciated that the 4-pass printing using the pseudo periodical mask is performed here too, and a collective dot of 4 dots in the transversal direction×1 dot in the longitudinal direction as shown in FIG. 28 shall be used. In addition, in case of establishing a pseudo periodical mask, the contents of the master mask size are also divided into a grid of 4 pixels in length and 1 pixel in width. The mask is established by the potential for each grid, supposing one grid has one potential.

If it is assumed that plural dots adjoin each other like this, the overlapping areas of each dot are offset in the calculation of the covering ratio and thus, the covering ratio value becomes smaller. If a printing apparatus similar to the one used in the aforementioned embodiment is used also in this embodiment, the covering ratio of one collective dot is 64%. However, it is assumed here that each collective dot unit of m×n=4×1 does not adjoin each other. The first pass can be increased in the data printing ratio by the decrease in the covering ratio.

If data are equally divided in 4-pass printing, the printing ratio is 25% in each print-scanning. If printing is carried out by using the collective dot unit of 4×1 dots, the covering ratio is 64% in the first pass, and is 23% in the second pass. And the covering ratio up to the second pass reaches 87%, and color irregularity is decisive in the first two passes after all.

In order to equalize this covering ratio, the data printing data ratio in the first pass is set to 16%, while that in the second pass to 34%.

Figure 37:
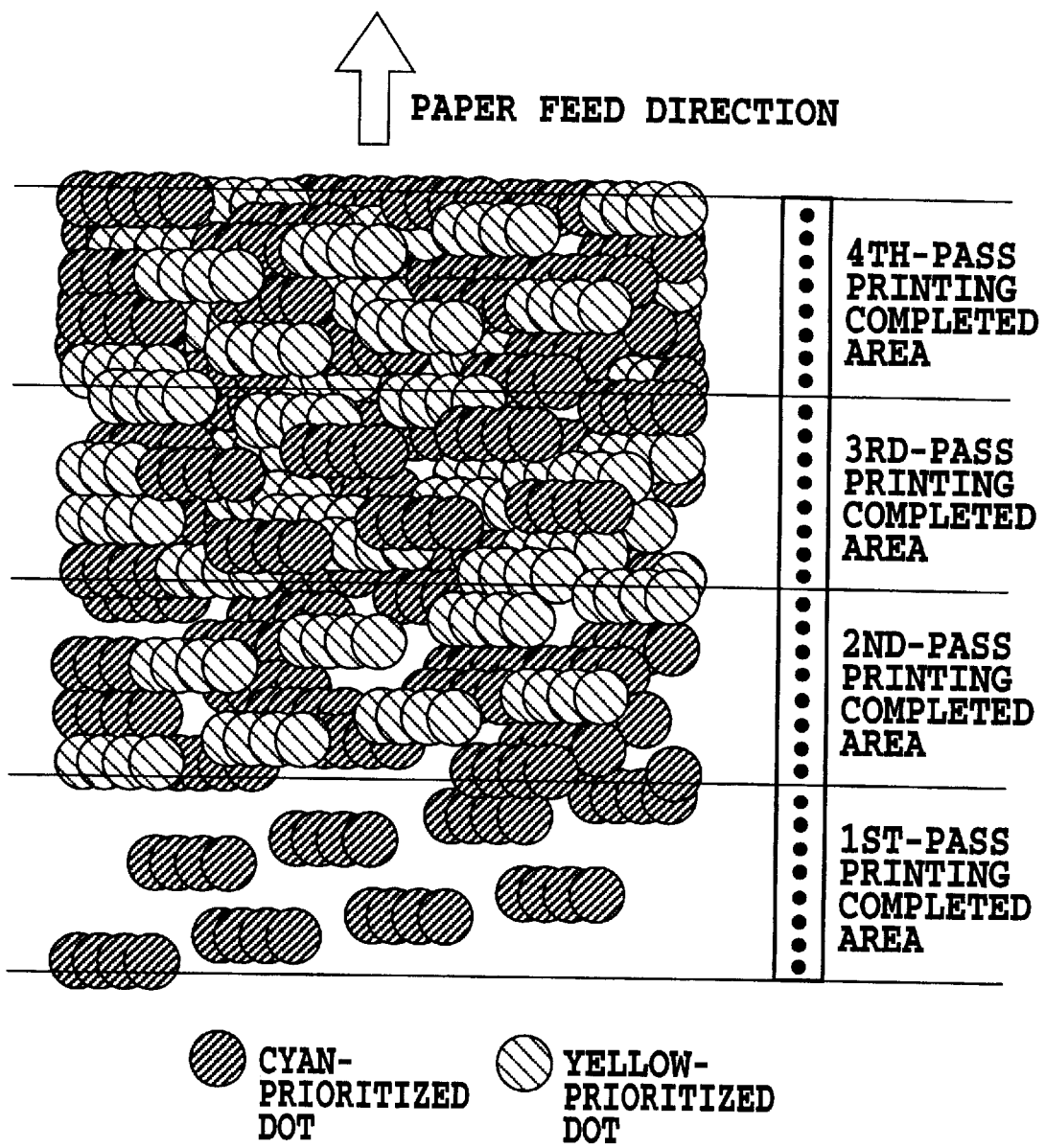
FIG. 37 is a diagram for illustrating another embodiment where a mask with pseudo periodical data arrangement is applied when the number of recording data is controlled for each pass in order to reduce color irregularity.

FIG. 37 is a schematic view of the printing carried out according to this regularity. The head used in this embodiment is shown in FIG. 11. However, for simplicity also here, a state for printing a green image composed of cyan and yellow with 32 pieces of nozzles will be described below.

Since this embodiment is of 4-pass printing, a total of 32-pixel areas printable by a single print-scanning are divided into printing areas with 8 pixels each, to complete an image by print-scanning at four times concerning each printing area. In any image area, dots are printed firstly by the eight nozzles on the first pass printing area. While 25% pixels in a printing area are printed on the forward way or the backward way by the conventional 4-pass printing, the data printing ratio is reduced to 16% in the first pass printing area in this embodiment. FIG. 37 illustrates the state of a printed image at the time when print-scanning is ended for a forward way. In a first pass printing completed area, 16% pixels of the entire image data are dot-printed in cyan-prioritized color. The covering ratio is about 44% at this stage.

In the adjoining second pass completed printing area, 34% of pixel data are newly printed. In this area, about 16% of dots landed in the previous backward print-scanning are already printed, and these are yellow-prioritized dots. When the newly printed 34% of dots are overlapped with those precedently printed, the former sink behind the latter, and the first pass dot color is prioritized. In the third pass printing area and hereafter, 25% of data are printed on each of them, and colors to be prioritized sink behind the backside according to the regularity as mentioned above.

As is evident from the results of this printing, most of the image areas are filled up with dots at the stage of the second pass printing and earlier. Therefore, it hardly influences prioritized colors of a whole image, whichever the color to be prioritized in the third pass area and thereafter is cyan or yellow. Thus, although a collective dot printing method is used as in a conventional embodiment, while applying the pseudo periodical mask to the control of the number of recording data, it becomes possible to realize bi-directional printing without color irregularity.

In other words, according to the present embodiment, it has become possible to form a smooth image without color irregularity or texture by controlling the data printing ratios in the first and second passes and thereby carrying out bi-directional printing while using a pseudo periodical mask for collective dot unit.

FIG. 38 shows a relationship between each collective dot arrangement and data printing ratios when 4-pass printing is adopted and covering ratios are equalized in the first pass and second pass. If color irregularity is tried to be prevented from occurring only by the collective dot method with the data printing ratio in each print scanning kept at 25%, the size of the collective dot becomes considerably large. On the contrary, the 4-pass printing is performed by controlling only the data printing ratio as in the first embodiment, the data printing ratio in the first pass becomes 14%, and a control effect of striped inconsistency tends to decrease.

In the photographic image quality realized by the present invention and this embodiment, the granular impression and the striped inconsistency is out of a resolution range recognizable by human eyes. In other words, a higher resolution does not need to be required. It is sufficient if the resolution is out of the visual resolution. As already described, by increasing the size of collective dot unit, a covering ratio can be set smaller, and further the multiple passes arranged for the purpose of preventing color irregularity from occurring can also be decreased in the number, therefore, it is effective from the view point of improving a throughput of printing. Namely, if the effects of the multi-pass printing can sufficiently be obtained by setting a data printing ratio properly, while a composition unit of dot concentration is set to a degree that is visually unrecognizable, bi-directional printing is possible without color irregularity and with the number of divided printing kept at the minimum.

In the above, a mask for collective dot unit of 4×1 pixels is used for each print-scanning, however, such the mask for collective dot may be used only in the first pass (or odd-numbered passes), while using a random mask of one dot unit in the remaining three passes (or even-numbered passes). Only in the first pass (or odd-numbered passes in which a prioritized color appears), a covering area of printing dots has to be made small, and in the second pass or thereafter (or even numbered passes), the covering ratio is rather recommended to be set large. In such a manner, the collective dots actually printed are decreased in the number, and a whole image can be expected to be smoother.

Moreover, it is possible to constitute a composite method adopting the methods each illustrated in the above embodiments. Namely, for example, the method can be provided with an 8-pass mode (first mode) performing printing like that in FIG. 36 and a 4-pass mode (second mode) using collective dot like that in the second embodiment. And, it becomes possible to properly obtain a desired printed material by changing over each mode in accordance with a user's desire, so that the modes can selectively be used, for example, by selecting the 8-pass mode in the case of giving priority to image quality, and selecting the 4-pass mode using the dot concentration in the case of giving priority to a printing speed.

Further, the mask may be applied so that the thinning ratio varies in respective recording area, by dividing into several areas not only in the respective recording scan, but also within the same recording scan.

Figure 39A:
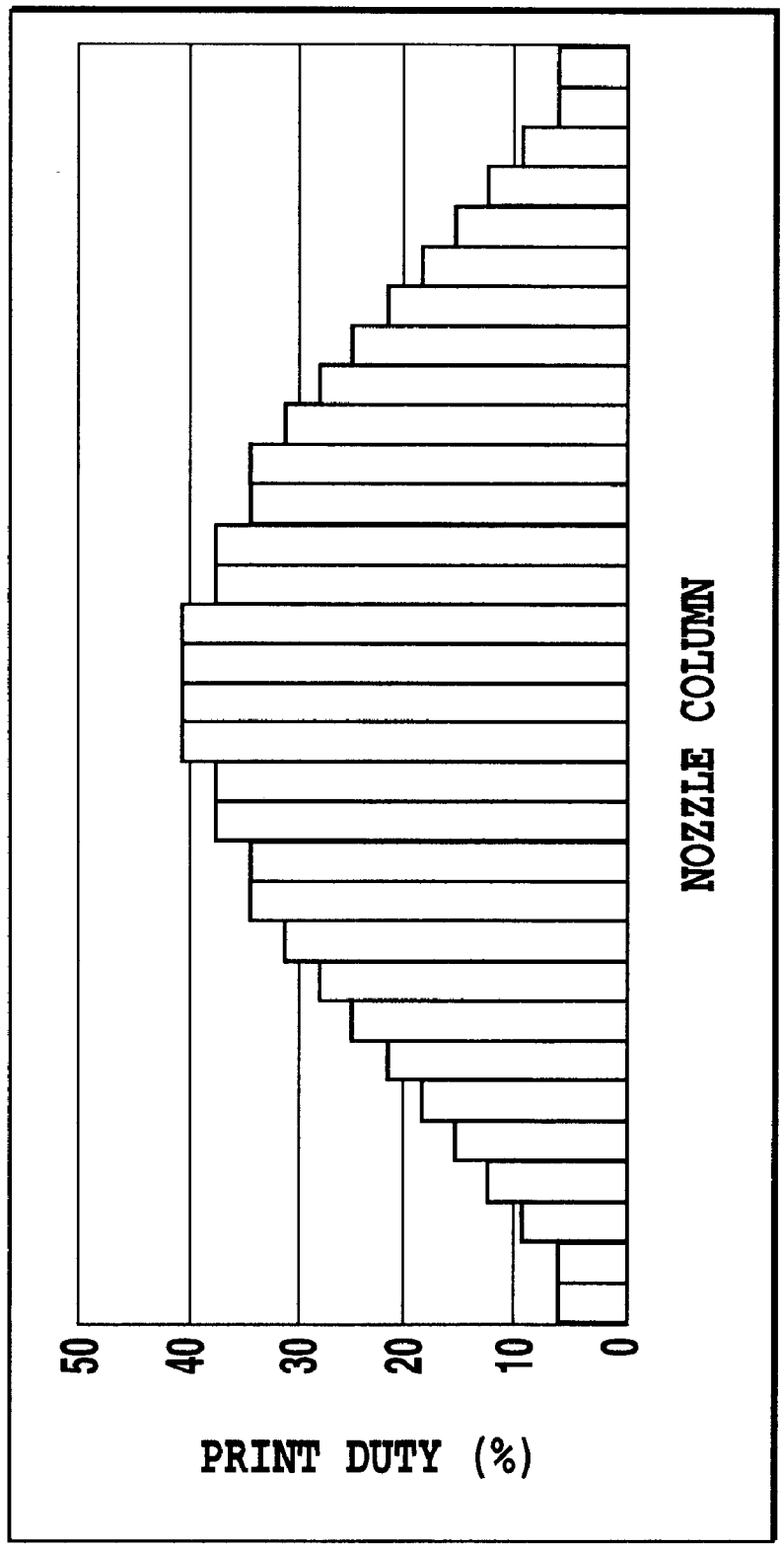
FIGS. 39A and 39B illustrate an embodiment where a mask with pseudo periodical data arrangement is applied when a same recording scan is divided into several areas, and the thinning rates of the areas are made differentiate in addition to respective recording scans.
Figure 39B:
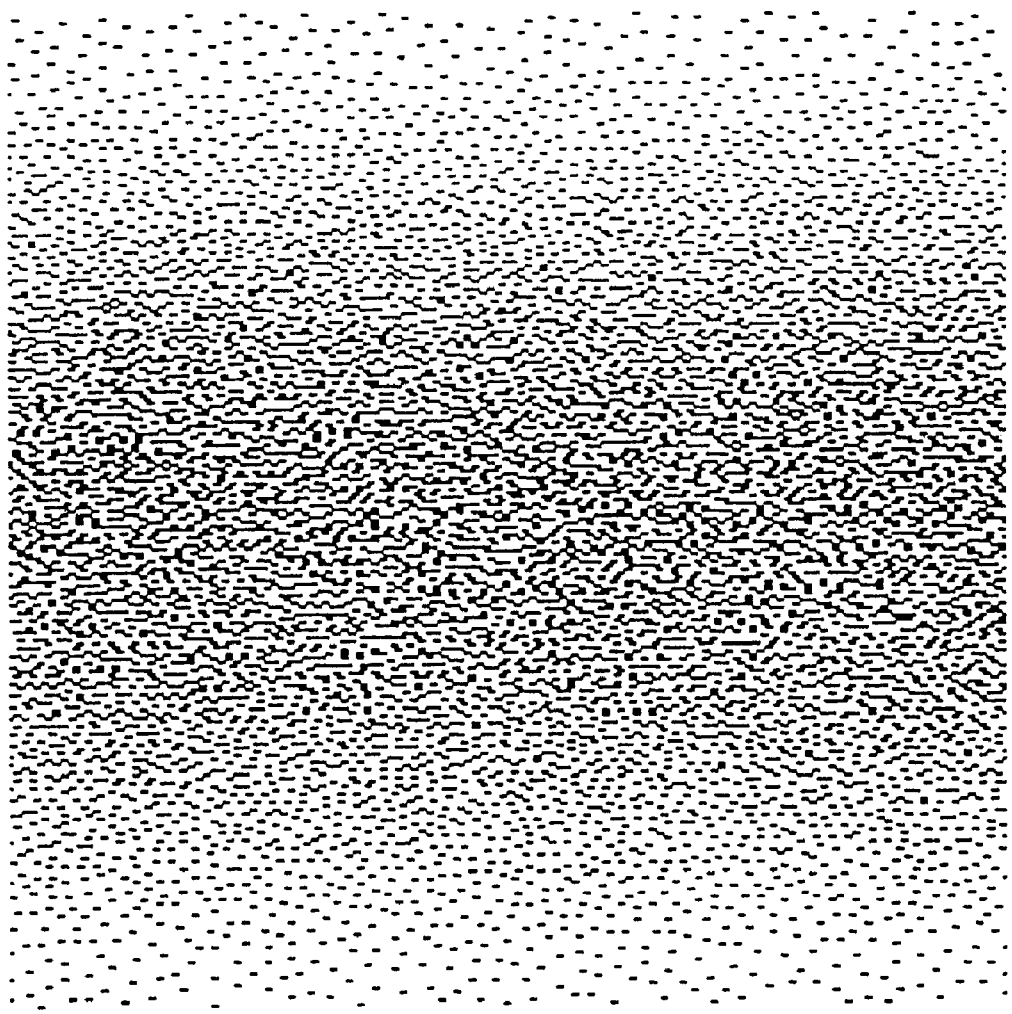

FIGS. 39A and 39B illustrate an example thereof. Here, a collective pixel of 2×1 is used, a transversal deviation is applied, and respective area of 4 passes is further divided by 8, and the recording duty value of respective one is differentiated. The recording duty state of respective area is shown in FIG. 39A and the mask arrangement established according to this in FIG. 39B.

The basic configuration of thus graduation mask is described in the Patent Application 2000-252938 by the Applicant. It is disclosed that this graduation mask concerns an application of random mask, and is effective to the white lines appearing on a printing medium corresponding to an edge portion of a recording head of the configuration providing a number of nozzles especially for ejecting droplets of ink of small diameter.

In case of applying the pseudo periodical arrangement to such a graduation mask, the mask may be established by the procedures explained for FIG. 21 and FIG. 29, by setting an upper limit for the number of record permitting pixels in respective area of the mask to be established, and performing a masking to remaining pixels on the area when the number of record permitting pixels is reached to the limit value.

Next, a variant of the embodiment described for FIG. 33 will be explained. This example is a recording apparatus for realizing the photographic image quality, and an image is formed with 6 colors including light inks of light cyan (LC) and light magenta (LM), in addition to dark inks of cyan, magenta, yellow and black, using a head as shown in FIG. 11.

Figure 40:
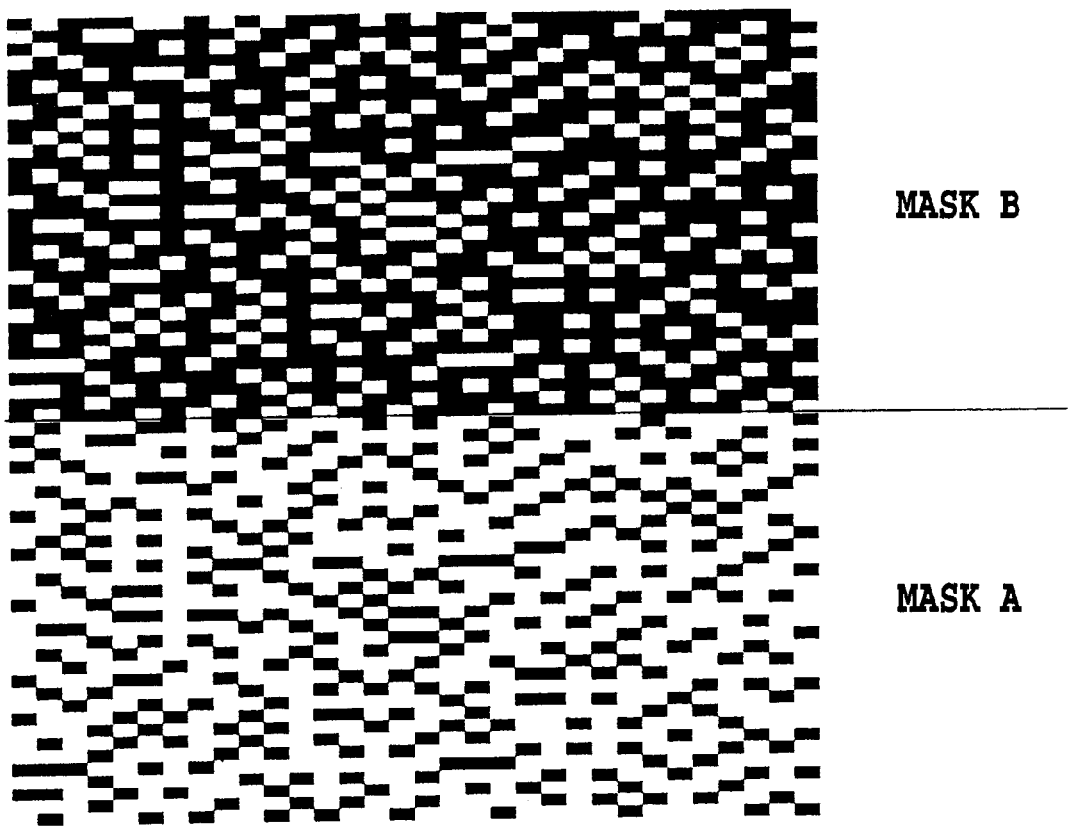
FIG. 40 shows a mask applied to a dark colored dot, according to a variant of the embodiment illustrated in FIG. 33.
Figure 41:
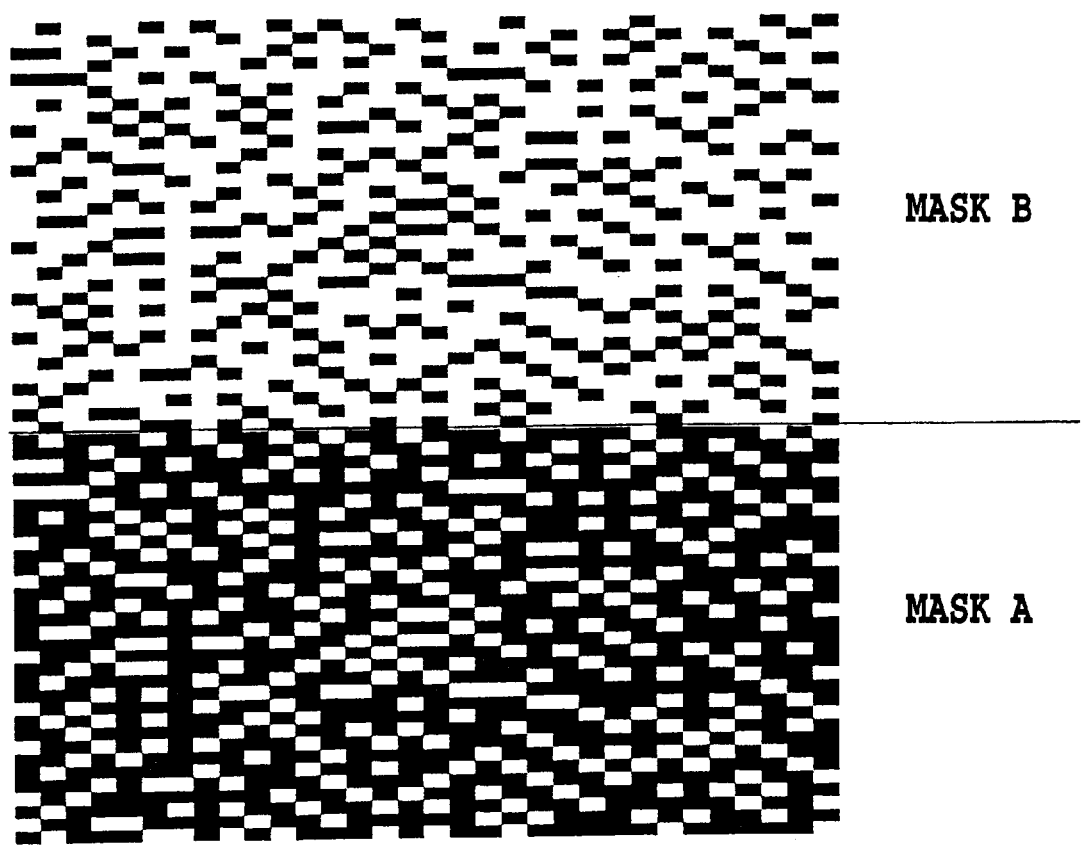
FIG. 41 shows a mask applied to a light colored dot, according to a variant of the embodiment illustrated in FIG. 33.

FIG. 40 and FIG. 41 show masks used in this example. In this example, the mask shown in FIG. 40 is used for three colors of cyan, magenta and black, and the mask shown in FIG. 41 for light cyan, light magenta and yellow. In FIG. 40, the print duty of the first pass is lower that the second pass, and in FIG. 41, on the contrary, the duty of the second pass is lower.

Concerning the already explained color irregularity, as the difference of covering ratio between the first pass and the second pass is an important factor, the color irregularity is further reduced, by setting previously low the print duty of the first pass whose covering ratio tends to increase in case where the effect to the color irregularity is insufficient by a simple use of 8×4 collective pixel. Consequently, the mask of FIG. 40 is used only for dark inks (cyan, magenta, black) whose color irregularity is more striking.

Light ink or yellow ink have generally far more recording dots compared to the other three colors. In this case, before the problem of color irregularity, the difference of recording interval between the first pass and the second pass makes a problem. As the 2-pass bi-directional printing is to be performed, at the right and left ends of a print medium, inevitably areas having a long interval and a short interval from the first pass to the second pass exist alternately for each sub scan direction. In this case, it has been confirmed that a longer time interval result in higher density than the shorter one even if the same recording mask is applied and the same recording method is used for printing. As this density is difference is more important the higher is the print duty, it appears more evidently for the light ink having more recording dots than the dark ink.

In order to reduce this irregularity due to the difference of intervals, it is effective to reduce the number of dots to be recorded in the second pass and limiting the effect the difference of intervals. Consequently, this embodiment is configured to increase the recording ratio of the first pass only for yellow, light cyan and light magenta whose recording duty is high, and to reduce the second pass as much as possible.

However, this embodiment is not limited to this duty distribution. As the appearing perturbations are different according to each print mode and each color ink, this embodiment is effective, even when masks of different print duty appropriate for each of them are installed independently, so long as each one uses a visually agreeable pseudo periodical mask. That is, the prominence of collective dot and the prominence of the color irregularity itself are different according to the nature of recording medium and recording image. Consequently, even in a print mode in view of forming a high quality photographic image, the collective dot size and the data recording ratio may be adjusted conveniently for respective conditions of recording medium or others.

Anyway, according to this embodiment, it has become possible to form a smooth image without color irregularity at a high speed by controlling the data printing ratios in the first and second passes and thereby carrying out bi-directional printing while using a mask for collective dot unit.

11. Application of Pseudo Periodical Mask to Interlace Recording Method

Next, the embodiment for applying the mask pattern of pseudo periodical data arrangement to a serial printer configured to complete the image by interlace recording.

As the technology disclosed in U.S. Pat. No. 4,920,355 or Japanese Patent Application Laid-open No. 7-242025, some technology realizes a high resolution recording, by setting the paper feed amount between respective recording scans to a predetermined number of pixels equal or inferior to the nozzle column width, while setting the multi-nozzle arrangement composition to the low resolution. Such a recording method is called interlace recording method.

This interlace recording method will be described briefly using FIG. 42. Here, an image of 1200 DPI is to be completed using a head H having ejection openings arranged with 300 DPI. To simplify, the number of ejection openings is supposed to be 9 and the paper feed amount per each recording scan is by 9 pixels for 1200 DPI. The raster of forward recording is represented by solid line, and the raster of backward recording by broken line, and it can be understood that they are formed alternately.

Here, an example where the paper is fed by a fixed amount of 9 pixels each time was cited, but the interlace recording is not limited to this configuration. Any configuration for completing an image of pitch finer that the inherent arrangement pitch of ejection openings may be said to be an interlace recording method even if the paper feed amount is not always fixed, and anyhow, the image is recorded with a resolution higher that the inherent arrangement resolution of ejection openings.

The same line of such interlace recording may sometimes completed by a single scan, but a better image can be formed by further performing the divided printing. Consequently, it is also possible to apply the pseudo periodical mask to this. In this case, dot arrangement on the printing medium to be recorded by a single scan should be a pseudo periodical data arrangement, in order to obtain the intended effects; consequently, a mask as established by a technique described for the foregoing embodiments can not be applied to respective recording elements.

The mask establishment method of this embodiment will be described, taking the recording apparatus of FIG. 42 as example.

Figure 43:
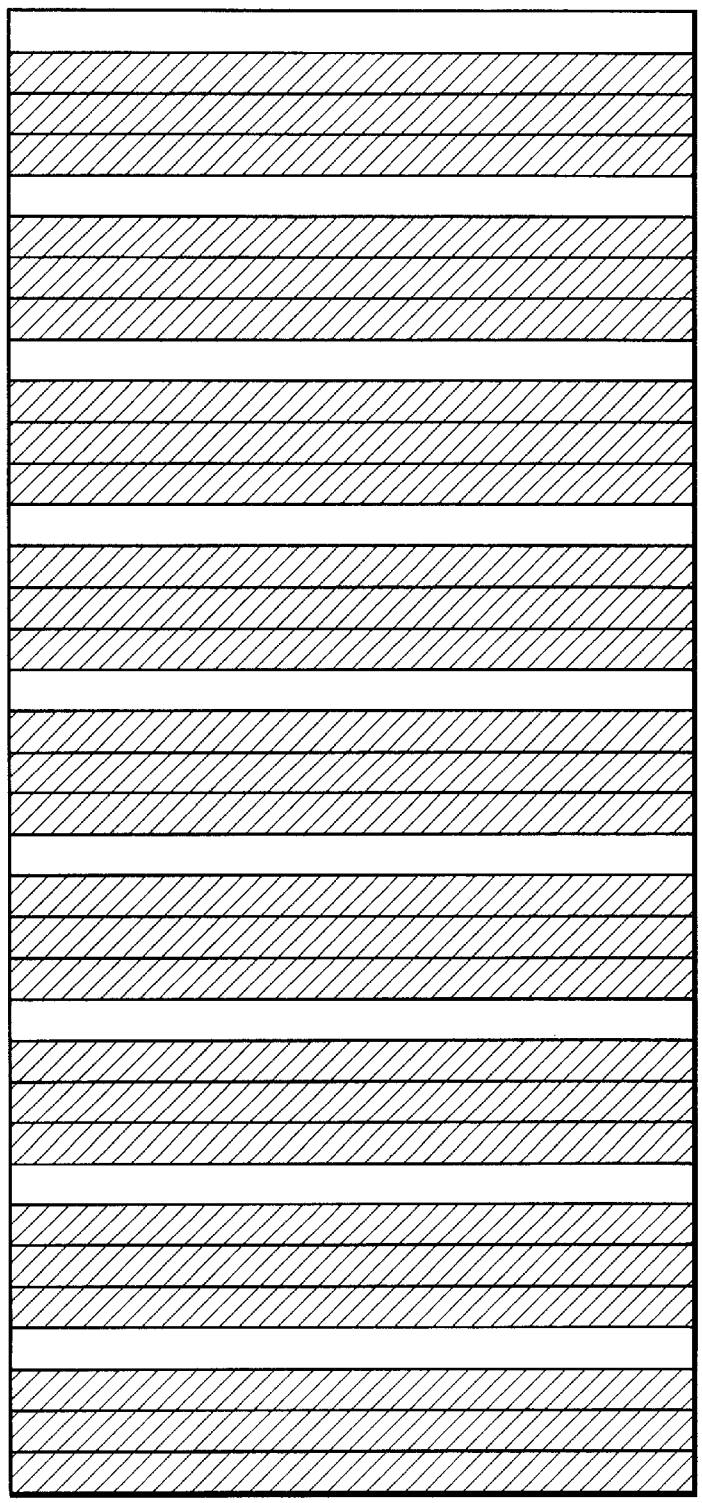
FIG. 43 illustrates a mask establishment method in case of applying the mask with pseudo periodical data arrangement to the interlace recording method of FIG. 42.

As shown in FIG. 43, here, a mask having 36 pixels in the longitudinal direction shall be established. Respective pixels are supposed to be arranged with 1200 DPI pitch, and the recording position of respective recording elements exist every four rasters. In case of establishing a mask to be used in a certain recording scan, rasters other than that where the recording element is placed are masked previously (hatched portion). In this state, the repulsive potential as described for the aforementioned embodiments is calculated, and the record permitting pixel position is determined.

Figure 42:
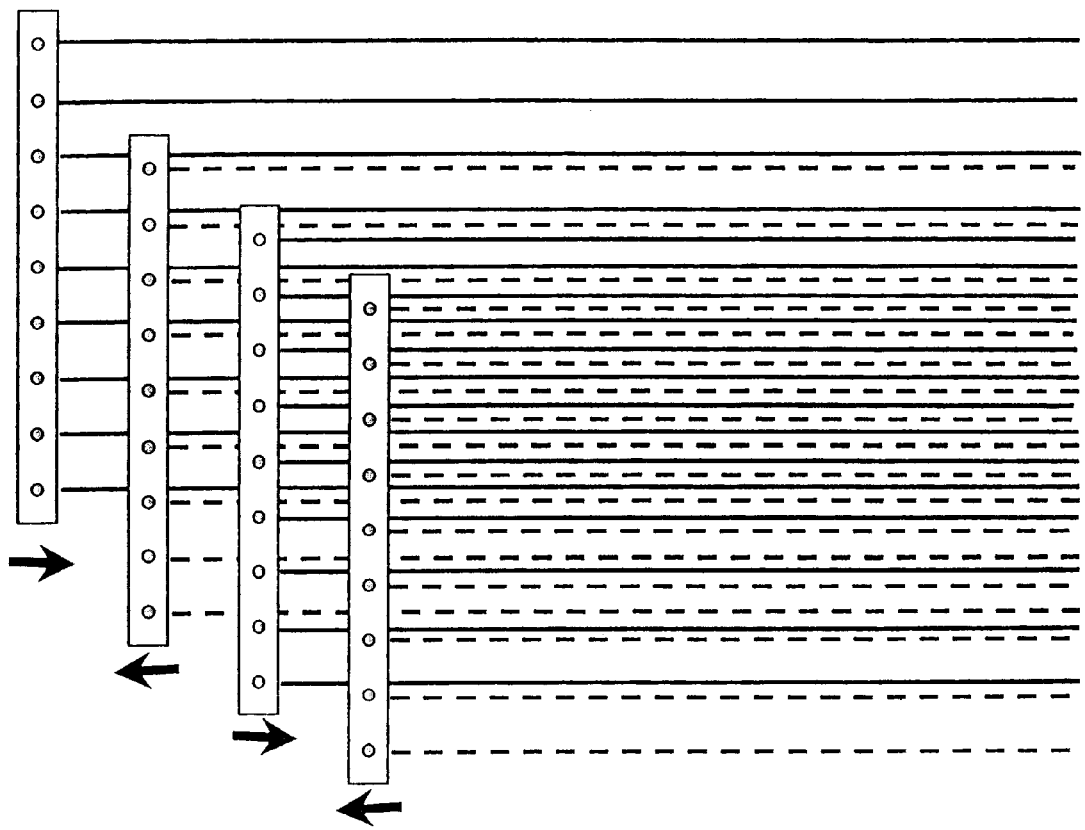
FIG. 42 illustrated an interlace recording method.

By doing this, it becomes possible to make the dot position for each recording scan a pseudo periodical data arrangement, even for a recording apparatus of the configuration as shown in FIG. 42, and the deviation for each recording scan less prominent as much as possible.

12. Others

Incidentally, one form of the head to which the present invention can be effectively applied is the one that utilizes thermal energy produced by an electrothermal transducer to cause film boiling in liquid thereby generating bubbles.

Besides, the program for performing the processing of this embodiment mentioned above is not necessarily the one to be installed previously in the printing apparatus, but it may be the one to be supplied conveniently from the printer driver of a host computer side for supplying the printing apparatus with image data.

Moreover, the scope of the present invention also includes a print system in which program codes of software or printer driver that realize the function of the above embodiment are supplied to the computer in a machine or system to which various devices including the printing apparatus are connected, and in which the program code stored in the computer in the machine or system are executed to operate a variety of devices, thereby realizing the function of the above-described embodiment.

In this case, the program codes themselves realize a novel function of the present invention and therefore the program codes themselves and means for supplying the program codes to the computer through communication or storage media etc., are also included in the scope of this invention.

Figure 44:
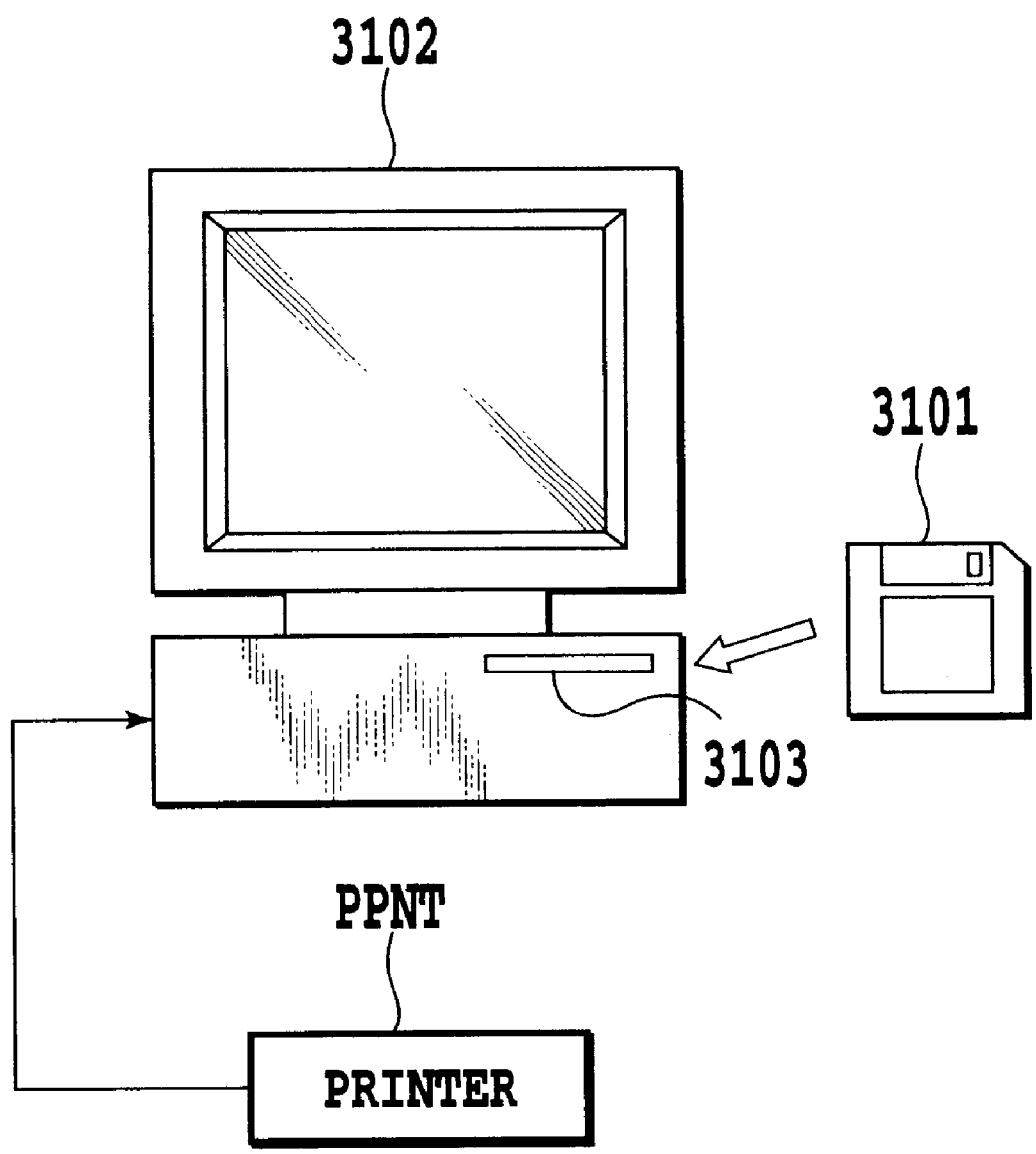
FIG. 44 is a schematic diagram showing an example of supply of the program and related date for executing the method of the present invention from the storage medium to the apparatus.

FIG. 44 shows a schematic example of supply of the program and related date for executing the method of the present invention from the storage medium to the apparatus. The program and related date for executing the method of the present invention is supplied by inserting a storage medium 3101 such as a flexible disk, CD-ROM or the like into a storage medium drive insert slot 3103 disposed on an apparatus 3102 constituting the host in respect to the printer PRNT. Thereafter, the program and related date can be executed by installing once the program and related date from the storage medium 3101 body into a hard disk, and loading them on a RAM from the hard disk, or loading them directly on the RAM without installing into the hard disk.

The storage media to supply the program codes include, for example, flexible disks, hard disks, optical disks, magneto-optical disks, CD-ROMs, CD-Rs, magnetic tapes, nonvolatile memory cards and ROMs or the like.

The scope of this invention includes not only a case where the function of the above-described embodiment is realized by executing the program codes read by the computer but also a case where an operating system running on the computer performs, according to directions of the program codes, a part or all of the actual processing and thereby realizes the function of this embodiment.

Further, the scope of this invention includes a case where the program codes read from a storage medium are written into a memory in a function expansion board inserted in the computer or into a memory in a function expansion unit connected to the computer, after which, based on directions of the program codes, a CPU in the function expansion board or function expansion unit executes a part or all of the actual processing and thereby realizes the function of this embodiment.

As explained above, according to the present invention, in a serial type ink jet printing apparatus using a print head where a plurality of ink ejection openings are arranged and completing an image on a printing medium by performing a bi-directional print scanning in a direction perpendicular to the arrangement direction of the plurality of ink ejection openings, while feeding paper successively in a direction parallel to said plurality of ink ejection openings, even when a longitudinal or transversal deviation of ink landing position occurs, a stable image without granular impression can be obtain, by applying a divided printing method for completing an image on a printing medium by a plurality of printing scans using a plurality of pixel arrangements where pixel arrangements made of print permitting pixels and print prohibiting pixels are in a mutual complementary relation, wherein the pixels arrangement printed on the print medium by a single print scan is made to become visually agreeable arrangements (for example, pseudo periodical arrangement). Here, a stable image with little granularity is obtained more rapidly, by applying the bi-directional printing to a plurality of print scans.

In addition, according to the present invention, it has become possible to record a smooth image without color irregularity at a higher speed by setting a data recording rate in the first pass to a certain area smaller than the data recording ratio in the second pass and thereafter, while using a mask of the aforementioned arrangement.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing method using a print head on which a plurality of ejection openings for ejecting inks are arranged, said method comprising the steps of:
    an image forming step, said image forming step comprising:
        a scanning step, for scanning the print head in a main scan direction, the main scan direction being different from the arranging direction of the plurality of ejection openings, to execute printing of pixels obtained by a thinning process according to a mask pattern, and
        a transporting step, for, subsequent to said scanning step, transporting the printing medium in a sub-scan direction perpendicular to the main scan direction by the quantities less than the arranging width of the plurality of ejection openings,
        wherein said image forming step repeats said scanning step and said transporting step to make the arrangements of pixels printed according to respective mask patterns in respective said scanning steps complemental arrangements to each other, so that an image for a same image area on the printing medium is formed by a plural times of said scanning steps; and
    an applying step, for applying the mask pattern to said image forming step corresponding to each of the plurality of said scanning steps, each of the applied mask patterns being a pattern so that a distance between the pixels printed according to the mask pattern in each scanning step is longer than a predetermined value and the pixels are dispersed.

2. The printing method as claimed in claim 1, wherein the mask pattern has a pseudo periodical data arrangement.

3. The printing method as claimed in claim 2, further comprising the step of generating the pseudo periodical data arrangement in a mask pattern area having an extension of the predetermined number of pixels, said generating step having a first step of setting at random an initial print permitting pixel in the mask pattern area; a second step of affording a predetermined repulsive potential to all of set print permitting pixel positions; a third step of setting the pixel on a position in the mask pattern area where the sum of the potentials becomes minimum as a new printable pixel; and a fourth step of reiterating said second step and said third step until pixels on all positions in the mask pattern area become print permitting pixels.

4. The printing method as claimed in claim 3, wherein the repulsive potential is expressed by a function attenuating according to a distance from the print permitting pixel.

5. The printing method as claimed in claim 2, wherein the data arrangement has blue noise characteristics.

6. The printing method as claimed in claim 2, wherein the data arrangement applied at least to a first main scan among the plurality of times of main scans is specified in a collective pixel having a size of m pixel(s) in the main scan direction and n pixel(s) in the sub scan direction (m and n are integrals, provided that at least one of them is equal or superior to 2) as unit.

7. The printing method as claimed in claim 6, wherein the data arrangement is a pseudo periodical data arrangement of the collective pixels.

8. The printing method as claimed in claim 7, wherein the m is an integer equal or superior to 2, and the collective pixels are arranged adjacent to each other, so as to overlap in the sub scan direction in a range equal or superior to 1 pixel and less than m pixels.

9. The printing method as claimed in claim 7, wherein the n is an integer equal or superior to 2, and the collective pixels are arranged adjacent to each other, so as to overlap in the main scan direction in a range equal or superior to 1 pixel and less than n pixels.

10. The printing method as claimed in claim 1, further comprising the step of generating the pseudo periodical data arrangement in a mask pattern area having an extension of the predetermined number of pixels, said generating step having a first step of dividing the mask pattern area into a plurality of areas in correspondence to the main scan to be performed the plurality of times; a second step of setting at random at least one initial print permitting pixel in at least one the area; a third step of setting pixel of the other area positionally corresponding to the set all print permitting pixels as print prohibiting pixel; a fourth step of affording a predetermined repulsive potential to the positions of all of set print permitting pixels; a fifth step of setting the pixels on a position in the mask pattern area where the sum of the potentials becomes minimum as a new print permitting pixel, except for that set as the print prohibiting pixel; and a sixth step of reiterating said third step to said fifth step until the quotient of the number of pixel in the mask pattern area divided by the number of the areas become print permitting pixels.

11. The printing method as claimed in claim 10, wherein the repulsive potential is expressed by a function attenuating according to a distance from the print permitting pixel.

12. The printing method as claimed in claim 1, wherein the plurality of ejection openings are arranged for a plurality of inks having a different color tone, and a data arrangement applied to one time of the main scan is differentiated according to the color tone.

13. The printing method as claimed in claim 1, wherein at least two times of the main scan are performed respectively in the forward and backward directions for the same image area, in said image forming step, a sum of data arrangements applied to the at least two times of main scan in the forward direction, and/or a sum of the mask pattern arrangements applied to the at least two times of main scan in the backward direction are arrangements presenting low frequency components and high dispersion, and having a visually agreeable arrangement of print permitting pixels and print prohibiting pixels.

14. The printing method as claimed in claim 1, wherein at least two times of the main scan are performed respectively in the forward and backward directions for the same image area, in said image forming step, a sum of the mask pattern arrangements applied to the at least two times of main scan in the forward direction, and/or a sum of the mask pattern arrangements applied to the at least two times of main scan in the backward direction are pixel arrangements specified by a collective pixel having a size of m pixel(s) in the main scan direction and n pixel(s) in the sub scan direction (m and n are integrals, provided that at least one of them is equal or superior to 2) as unit.

15. The printing method as claimed in claim 14, wherein a sum of the data arrangements applied to the at least two times of main scan in the forward direction, and/or a sum of the data arrangements applied to the at least two times of main scan in the backward direction are also arrangements presenting low frequency components and high dispersion, and having a visually agreeable arrangement of print permitting pixels and print prohibiting pixels.

16. The printing method as claimed in claim 1, wherein a data arrangement does not synchronize with the mask pattern arrangement of the time when an image input as printing object is binarized.

17. The printing method as claimed in claim 1, wherein the plurality of ejection openings are arranged on the print head in the sub scan direction with an interval of the transport pitch multiplied by an integer, said image forming step performs the image formation by performing the plurality of times of main scan and the transport, and said applying step applies a visually agreeable data arrangement of low frequency components and high dispersion, to a pixel arrangement to be printed by one time of the main scan.

18. The printing method as claimed in claim 1, further comprising the step of controlling, in said image forming step, so that a sum of ratios of data print quantity in the main scan of odd-number of order among the plurality of main scans to the total data print quantity for the same image area be smaller than a sum of ratios of data print quantity in the main scan of even number of order among the plurality of main scans.

19. The printing method as claimed in claim 18, wherein the ratio of data print quantity in the first main scan among the plurality of main scans is made smaller than the ratio of data print quantity in the second main scan.

20. The printing method as claimed in claim 18, wherein the main scan is performed three times or more for the same image area, the ratio of data print quantity in a third main scan and thereafter is made larger than the ratio of data print quantity in the first main scan, and smaller than the ratio of data print quantity in the second main scan.

21. The printing method as claimed in claim 20, wherein a sum of covering ratio of the print medium by dots formed in the first main scan and the second scan is made larger than 50%.

22. The printing method as claimed in claim 18, wherein the data arrangement applied at least to the first main scan among the plurality of times of main scan is specified taking a collective pixel having a size of m pixel(s) in the main scan direction and n pixel(s) in the sub scan direction (m and n are integrals, provided that at least one of them is equal or superior to 2) as unit.

23. The printing method as claimed in claim 1, further comprising the step of controlling, in said image forming step, so that a sum of ratios of data print quantity in a first main scan among the plurality of main scans be smaller than the ratio of data print quantity in a second main scan, and a sum of covering ratio of the print medium by dots formed in the first main scan and the second scan be larger than 50%.

24. The printing method as claimed in claim 23, wherein the covering ratios of the print medium by dots formed in the first main scan and the second scan are made approximately equal.

25. The printing method as claimed in claim 1, further comprising:
a first control step of controlling, in said image forming step, so that a sum of ratios of data print quantity in the main scan of odd number of order among the plurality of main scans to a total data print quantity for the same image area be smaller than the sum of ratios of data print quantity in the main scan of even number of order among the plurality of main scans; and a second control step of performing a control similar to said first control step for a plurality of times of main scans less than said first control step, and specifying an arrangement pixel in at least the first main scan among the plurality of times of main scan taking a pixel group of m pixel(s) in the main scan direction and n pixel(s) in the sub scan direction (m and n are integrals, provided that at least one of them is equal or superior to 2) as unit.

26. The printing method as claimed in claim 25, wherein a changeover selection of said first control step and the second control step is made possible.

27. The printing method as claimed in claim 1, wherein the plurality of times of main scan for forming an image on the print medium includes the main scan in the forward direction and the main scan in the backward direction.

28. The printing method as claimed in claim 1, wherein the print head has a plurality of columns of the plurality of ejection openings, in correspondence to inks having a different color tone, juxtaposed in the direction of the main scan.

29. The printing method as claimed in claim 1, wherein the print head has heating elements to generate thermal energy for causing film boiling in ink as an energy for ejecting ink from the ejection openings.

30. A printing apparatus using a print head on which a plurality of ejection openings for ejecting inks are arranged, said apparatus comprising:
an image forming means comprising:
a scanning means for scanning the print head in a main scan direction, the main scan direction being different from the arranging direction of the plurality of ejection openings, to execute printing of pixels obtained by a thinning process according to a mask pattern, and
a transporting means, for, subsequent to said scanning means, transporting the printing medium in a sub-scan direction perpendicular to the main scan direction by the quantities less than the arranging width of the plurality of ejection openings,
wherein said image forming means repeats said scanning means and said transporting means to make the arrangements of pixels printed according to respective mask patterns in respective said scanning means complemental arrangements to each other, so that an image for a same image area on the printing medium is formed by a plural times of said scanning means; and
an applying means for applying the mask pattern to said image forming means corresponding to each of the plurality of said scanning means, each of the applied mask patterns being a pattern so that a distance between the pixels printed according to the mask pattern in each scanning means is longer than a predetermined value and the pixels are dispersed.

31. The printing apparatus as claimed in claim 30, wherein said mask pattern has a pseudo periodical data arrangement.

32. The printing apparatus as claimed in claim 31, further comprising means for generating said pseudo periodical data arrangement in a mask pattern area having an extension of said predetermined number of pixels, said generating means having a first means for setting at random an initial print permitting pixel in said mask pattern area; a second means for affording a predetermined repulsive potential to all of set print permitting pixel positions; a third means for setting the pixel on a position in said mask pattern area where the sum of the potentials becomes minimum as a new printable pixel; and a fourth means for reiterating the processing by said second means and the processing by said third means until pixels on all positions in said mask pattern area become print permitting pixels.

33. The printing apparatus as claimed in claim 32, wherein said repulsive potential is expressed by a function attenuating according to a distance from the print permitting pixel.

34. The printing apparatus as claimed in claim 31, wherein said data arrangement has blue noise characteristics.

35. The printing apparatus as claimed in claim 31, wherein said data arrangement applied at least to a first main scan among said plurality of times of main scans is specified in a collective pixel having a size of m pixel(s) in said main scan direction and n pixel(s) in said sub scan direction (m and n are integrals, provided that at least one of them is equal or superior to 2) as unit.

36. The printing apparatus as claimed in claim 35, wherein said data arrangement is a pseudo periodical data arrangement of said collective pixels.

37. The printing apparatus as claimed in claim 36, wherein said m is an integer equal or superior to 2, and said collective pixels are arranged adjacent to each other, so as to overlap in said sub scan direction in a range equal or superior to 1 pixel and less than m pixels.

38. The printing apparatus as claimed in claim 36, wherein said n is an integer equal or superior to 2, and said collective pixels are arranged adjacent to each other, so as to overlap in said main scan direction in a range equal or superior to 1 pixel and less than n pixels.

39. The printing apparatus as claimed in claim 30, further comprising means for generating said pseudo periodical data arrangement in a mask pattern area having an extension of said predetermined number of pixels, said generating means having a first means for dividing said mask pattern area into a plurality of areas in correspondence to said main scan to be performed said plurality of times; a second means for setting at random at least one initial print permitting pixel in at least one said area; a third means for setting pixel of the other area positionally corresponding to the set all print permitting pixels as print prohibiting pixel; a fourth means for affording a predetermined repulsive potential to the positions of all of set print permitting pixels; a fifth means for setting the pixels on a position in said mask pattern area where the sum of the potentials becomes minimum as a new print permitting pixel, except for that set as said print prohibiting pixel; and a sixth means for reiterating the processing by said third means to the processing by said fifth means until the quotient of the number of pixel in said mask pattern area divided by the number of said areas become print permitting pixels.

40. The printing apparatus as claimed in claim 39, wherein said repulsive potential is expressed by a function attenuating according to a distance from the print permitting pixel.

41. The printing apparatus as claimed in claim 30, wherein a plurality of said ejection openings are arranged for a plurality of inks having a different color tone, and said data arrangement applied to one time of said main scan is differentiated according to said color tone.

42. The printing apparatus as claimed in claim 30, wherein at least two times of said main scan are performed respectively in the forward and backward directions for said same image area by said image forming means, the sum of said data arrangements applied to said at least two times of main scan in the forward direction, and/or the sum of said mask pattern arrangements applied to said at least two times of main scan in the backward direction are also arrangements presenting little low frequency components and a high dispersion, and having a visually agreeable arrangement of print permitting pixels and print prohibiting pixels.

43. The printing apparatus as claimed in claim 30, wherein at least two times of said main scan are performed respectively in the forward and backward directions for said same image area by said image forming means, the sum of said mask pattern arrangements applied to said at least two times of main scan in the forward direction, and/or the sum of said mask pattern arrangements applied to said at least two times of main scan in the backward direction are pixel arrangements specified by a collective pixel having a size of m pixel(s) in said main scan direction and n pixel(s) in said sub scan direction (m and n are integrals, provided that at least one of them is equal or superior to 2) as unit.

44. The printing apparatus as claimed in claim 43, wherein the sum of said data arrangements applied to said at least two times of main scan in the forward direction, and/or the sum of said data arrangements applied to said at least two times of main scan in the backward direction are also arrangements presenting little low frequency components and a high dispersion, and having a visually agreeable arrangement of print permitting pixels and print prohibiting pixels.

45. The printing apparatus as claimed in claim 30, wherein said data arrangement does not synchronize with a mask pattern arrangement of the time when an image input as printing object is binarized.

46. The printing apparatus as claimed in claim 30, wherein said plurality of ejection openings are arranged on said print head in said sub scan direction with an interval of said transport pitch multiplied by an integer, said image forming means performs said image formation by performing said plurality of times of main scan and said transport, and said application means applies a visually agreeable data arrangement of little low frequency components and high dispersion, to said pixel arrangement to be printed by one time of said main scan.

47. The printing apparatus as claimed in claim 30, further comprising means for controlling, in said image forming means, the sum of ratios of data print quantity in the main scan of odd-number of order among said plurality of main scans to the total data print quantity for said same image area to be smaller than the sum of ratios of data print quantity in the main scan of even number of order among said plurality of main scans.

48. The printing apparatus as claimed in claim 47, wherein said ratio of data print quantity in the first main scan among said plurality of main scans is made smaller than said ratio of data print quantity in the second main scan.

49. The printing apparatus as claimed in claim 47, wherein said main scan is performed three times or more for said same image area, said ratio of data print quantity in the third main scan and thereafter is made larger than said ratio of data print quantity in the first main scan, and smaller than said ratio of data print quantity in the second main scan.

50. The printing apparatus as claimed in claim 49, wherein the sum of covering ratio of said print medium by dots formed in said first main scan and said second scan is made larger than 50%.

51. The printing apparatus as claimed in claim 47, wherein said data arrangement applied at least to the first main scan among said plurality of times of main scan is specified taking a collective pixel having a size of m pixel(s)

in said main scan direction and n pixel(s) in said sub scan direction (m and n are integrals, provided that at least one of them is equal or superior to 2) as unit.

52. The printing apparatus as claimed in claim 30, further comprising means for controlling, in said image forming means, the sum of ratios of data print quantity in the first main scan among said plurality of main scans to be smaller than said ratio of data print quantity in the second main scan, and the sum of covering ratio of said print medium by dots formed in said first main scan and said second scan to be larger than 50%.

53. The printing apparatus as claimed in claim 52, wherein said covering ratios of said print medium by dots formed in said first main scan and said second scan are made approximately equal.

54. The printing apparatus as claimed in claim 30, further comprising:
   a first control mode for controlling, in said image forming means, a sum of ratios of data print quantity in the main scan of odd number of order among said plurality of main scans to a total data print quantity for said same image area to be smaller than the sum of ratios of data print quantity in the main scan of even number of order among said plurality of main scans; and
   a second control mode for performing a control similar to said first control means for a plurality of times of main scans less than the first control means, and for specifying the arrangement pixel in at least the first main scan among the plurality of times of main scan taking a pixel group of m pixel(s) in said main scan direction and n pixel(s) in said sub scan direction (m and n are integrals, provided that at least one of them is equal or superior to 2) as unit.

55. The printing apparatus as claimed in claim 54, wherein a changeover selection of said first control mode and the second control mode is made possible.

56. The printing apparatus as claimed in claim 30, wherein said plurality of times of main scan for forming an image on said print medium includes the main scan in the forward direction and the main scan in the backward direction.

57. The printing apparatus as claimed in claim 30, wherein said print head has a plurality of columns of said plurality of ejection openings, in correspondence to inks having a different color tone, juxtaposed in the direction of said main scan.

58. The printing apparatus as claimed in claim 30, wherein said print head has heating elements to generate thermal energy for causing film boiling in ink as an energy for ejecting ink from said ejection openings.

59. A printing system comprising a printing apparatus using a print head on which a plurality of ejection openings for ejecting inks are arranged, and a host apparatus for supplying image data to said printing apparatus, said printing apparatus having:
   an image forming means comprising:
      a scanning means for scanning the print head in a main scan direction, the main scan direction being different from the arranging direction of the plurality of ejection openings, to execute printing of pixels obtained by a thinning process according to a mask pattern, and
      a transporting means, for, subsequent to said scanning means, transporting the printing medium in a sub-scan direction perpendicular to the main scan direction by the quantities less than the arranging width of the plurality of ejection openings,
   wherein said image forming means repeats said scanning means and said transporting means to make the arrangements of pixels printed according to respective mask patterns in respective said scanning means complemental arrangements to each other, so that an image for a same image area on the printing medium is formed by a plural times of said scanning means; and
   an applying means for applying the mask pattern to said image forming means corresponding to each of the plurality of said scanning means, each of the applied mask patterns being a pattern so that a distance between the pixels printed according to the mask pattern in each scanning means is longer than a predetermined value and the pixels are dispersed.

60. A storage medium storing a control program for making a printing apparatus perform a printing method, said printing apparatus using a print head on which a plurality of ejection openings for ejecting inks are arranged, and said printing method comprising:
   an image forming step, said image forming step comprising:
      a scanning step, for scanning the print head in a main scan direction, the main scan direction being different from the arranging direction of the plurality of ejection openings, to execute printing of pixels obtained by a thinning process according to a mask pattern, and
      a transporting step, for, subsequent to said scanning step, transporting the printing medium in a sub-scan direction perpendicular to the main scan direction by the quantities less than the arranging width of the plurality of ejection openings,
   wherein said image forming step repeats said scanning step and said transporting step to make the arrangements of pixels printed according to respective mask patterns in respective said scanning steps complemental arrangements to each other, so that an image for a same image area on the printing medium is formed by a plural times of said scanning steps; and
   an applying step, for applying the mask pattern to said image forming step corresponding to each of the plurality of said scanning steps, each of the applied mask patterns being a pattern so that a distance between the pixels printed according to the mask pattern in each scanning step is longer than a predetermined value and the pixels are dispersed.

61. A control program for making a printing apparatus perform a printing method, said printing apparatus using a print head on which a plurality of ejection openings for ejecting inks are arranged, and said printing method comprising:
   an image forming step, said image forming step comprising:
      a scanning step, for scanning the print head in a main scan direction, the main scan direction being different from the arranging direction of the plurality of ejection openings, to execute printing of pixels obtained by a thinning process according to a mask pattern, and
      a transporting step, for, subsequent to said scanning step, transporting the printing medium in a sub-scan direction perpendicular to the main scan direction by the quantities less than the arranging width of the plurality of ejection openings,
   wherein said image forming step repeats said scanning step and said transporting step to make the arrangements of pixels printed according to respective mask patterns in respective said scanning steps complemental arrangements to each other, so that an image for a same image area on the printing medium is formed by a plural times of said scanning steps; and an applying step, for applying the mask pattern to said image forming step corresponding to each of the plurality of said scanning steps, each of the applied mask patterns being a pattern so that a distance between the pixels printed according to the mask pattern in each scanning step is longer than a predetermined value and the pixels are dispersed.

* * * * *

UNITED STATES PATENT AND TRADEMARK OFFICE
CERTIFICATE OF CORRECTION

PATENT NO. : 6,601,939 B2
DATED : August 5, 2003
INVENTOR(S) : Miyuki Fujita et al.

It is certified that error appears in the above-identified patent and that said Letters Patent is hereby corrected as shown below:

Title page,
Item [57], ABSTRACT,
Line 9, "can" should read -- can be --.

Column 3,
Line 31, "purpose" should read -- purpose of --;
Line 40, "synchronized" should read -- synchronize --;
Line 62, "deteriorated" should read -- deteriorates --.

Column 4,
Line 2, "makes" should read -- makes it --.

Column 5,
Line 7, "carries" should read -- carried --.

Column 6,
Line 1, "only" should read -- only in the --;
Line 50, "does not" should read -- do not --.

Column 7,
Line 13, "referred" should read -- referred to --;
Line 42, "(pico-litters)" should read -- (pico-liters) --;
Lines 42 and 51, "is" should read -- has been --;
Line 54, "recording, however," should read -- recording. However, --.

Column 8,
Line 15, "of" should read -- of the --;
Line 21, "can not" should read -- cannot --;
Lines 40 and 61, "an" should read -- a --.

Column 9,
Lines 16, 38 and 61, "an" should read -- a --;
Lines 24 and 45, "less low" should read -- less or low --.

UNITED STATES PATENT AND TRADEMARK OFFICE
CERTIFICATE OF CORRECTION

PATENT NO. : 6,601,939 B2
DATED : August 5, 2003
INVENTOR(S) : Miyuki Fujita et al.

It is certified that error appears in the above-identified patent and that said Letters Patent is hereby corrected as shown below:

Column 10,
Line 1, "less low" should read -- less or low --;
Line 21, "or means step" should read -- step or means --;
Line 28, "performed the" should read -- performed a --;
Line 31, "the" should be deleted;
Line 31, "pixel" should read -- the pixel --;
Lines 59 and 63, "arranged" should read -- arranged to --.

Column 11,
Lines 12, 30 and 44, "little low" should read -- little or low --;
Line 48, "comprises" should read -- comprise --.

Column 12,
Line 15, "comprises" should read -- comprise: --.

Column 14,
Line 14, "signal" should read -- signals --;
Line 27, "mask;" should read -- the mask; --.

Column 15,
Line 23, "differentiate" should read -- different --;
Line 31, "illustrated" should read -- illustrates --;
Line 39, "showing" should read -- showing a --.

Column 18,
Line 16, "as" should be deleted;
Line 42, "contract" should read -- contact --.

Column 24,
Line 14, "steps" should read -- step --.

Column 25,
Line 29, "area" should read -- area of --;
Line 31, "a" should be deleted;
Line 37, "as a 'pseudo" should read -- to as a pseudo --.

Column 26,
Line 13, "generate" should read -- generates --.

UNITED STATES PATENT AND TRADEMARK OFFICE
CERTIFICATE OF CORRECTION

| | | |
|---|---|---|
| PATENT NO. | : 6,601,939 B2 | |
| DATED | : August 5, 2003 | |
| INVENTOR(S) | : Miyuki Fujita et al. | |

It is certified that error appears in the above-identified patent and that said Letters Patent is hereby corrected as shown below:

Column 27,
Line 14, "a" should read -- an --;
Line 41, "can by" should read -- can be --.

Column 28,
Line 12, "(45 passes)." should read -- (4-passes). --;
Line 66, "an" should read -- a --.

Column 29,
Line 8, "as" should read -- at --;
Line 11, "dot" should read -- dots --.

Column 30,
Lines 21 and 41, "word," should read -- words, --;
Line 54, "respective" should read -- the respective --.

Column 31,
Line 3, "pseudo" should read -- a pseudo --;
Line 9, "times" should read -- time --;
Line 12, "transversal" should read -- the traverse --.

Column 32,
Line 20, "the" should be deleted;
Line 57, "U.S. Pat. No. 2,622,429" should read -- Japanese Patent Application Laid-open No. 2622429 --.

Column 33,
Line 9, "a same" should read -- the same --;
Line 11, "can not" should read -- cannot --;
Line 18, "times," should read -- time, --;
Line 19, "make" should read -- makes --;
Line 20, "granularity," should read -- granular --;
Line 23, "prevent" should read -- prevented --;
Line 30, "make" should read -- makes a --;
Lines 50 and 58, "includes" should read -- include --.

UNITED STATES PATENT AND TRADEMARK OFFICE
CERTIFICATE OF CORRECTION

PATENT NO. : 6,601,939 B2
DATED : August 5, 2003
INVENTOR(S) : Miyuki Fujita et al.

It is certified that error appears in the above-identified patent and that said Letters Patent is hereby corrected as shown below:

Column 34,
Line 1, "cope" should read -- copes --;
Line 7, "due" should read -- due to --;
Line 23, "embodiment" should read -- embodiments --;
Line 26, "U.S. Pat. No. 2,622,429" should read -- Japanese Patent Application Laid-open No. 2622429 --;
Line 61, "similarly" should read -- similar --.

Column 35,
Line 49, "dots" should read -- dots from --;
Line 62, "arrows," should read -- arrow, --;
Line 62, "is" should read -- are --.

Column 36,
Line 34, "to the" should read -- to --.

Column 37,
Line 2, "perform" should read -- performs --;
Line 5, "exist" should read -- exists --;
Line 26, "recording" should read -- recorded --;
Line 37, "described" should read -- described by --;
Line 42, "event" should read -- events --;
Line 56, "m$^2$" should read -- $\mu m^2$ --.

Column 39,
Line 24, "whole" should read -- whole of --;
Line 27, "is a" should be deleted.

Column 40,
Line 27, "127" should read -- "127" --;
Line 36, "is" should read -- are --.

Column 42,
Line 65, "does not need to be" should read -- is not --.

Column 44,
Line 34, "effect" should read -- effect of --.

UNITED STATES PATENT AND TRADEMARK OFFICE
CERTIFICATE OF CORRECTION

PATENT NO. : 6,601,939 B2
DATED : August 5, 2003
INVENTOR(S) : Miyuki Fujita et al.

It is certified that error appears in the above-identified patent and that said Letters Patent is hereby corrected as shown below:

<u>Column 45,</u>
Line 25, "completed" should read -- be completed --;
Line 32, "can not" should read -- cannot --.

<u>Column 48,</u>
Line 22, "the" should be deleted.

Signed and Sealed this

Thirtieth Day of August, 2005

JON W. DUDAS
*Director of the United States Patent and Trademark Office*